United States Patent
Malaviya et al.

(10) Patent No.: US 10,681,122 B2
(45) Date of Patent: Jun. 9, 2020

(54) METHOD AND APPARATUS FOR CONVERTING CONTENT USING CLOUD

(71) Applicant: SAMSUNG ELECTRONICS CO., LTD., Suwon-si (KR)

(72) Inventors: Shubhrangam Malaviya, Noida (IN); Brejesh Lall, Delhi (IN); Santanu Chaudhury, Delhi (IN); Rohit, Noida (IN); Abhinav Gupta, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 480 days.

(21) Appl. No.: 14/964,018

(22) Filed: Dec. 9, 2015

(65) Prior Publication Data

US 2016/0164961 A1 Jun. 9, 2016

(30) Foreign Application Priority Data

Dec. 9, 2014 (IN) ........................... 3607/DEL/2014
Nov. 19, 2015 (KR) ........................ 10-2015-0162843

(51) Int. Cl.
*G06F 15/16* (2006.01)
*H04L 29/08* (2006.01)
*G06F 15/173* (2006.01)

(52) U.S. Cl.
CPC .......... *H04L 67/104* (2013.01); *H04L 67/141* (2013.01); *H04L 67/2823* (2013.01); *H04L 67/10* (2013.01)

(58) Field of Classification Search
CPC .................................................. H04L 67/2823
USPC ................................................. 709/201, 224
See application file for complete search history.

(56) References Cited

U.S. PATENT DOCUMENTS

| | | | | |
|---|---|---|---|---|
| 6,138,156 A | * | 10/2000 | Fletcher | H04L 12/14 709/217 |
| 8,355,592 B1 | | 1/2013 | Shechtman et al. | |
| 8,526,728 B2 | | 9/2013 | Kang et al. | |
| 2011/0125809 A1 | * | 5/2011 | Woods | G06F 16/41 707/809 |
| 2011/0264752 A1 | * | 10/2011 | Lee | H04L 12/2812 709/206 |
| 2011/0285818 A1 | * | 11/2011 | Park | H04N 13/194 348/43 |
| 2012/0246114 A1 | | 9/2012 | Edmiston et al. | |
| 2013/0219072 A1 | * | 8/2013 | Han | H04L 65/60 709/228 |

(Continued)

FOREIGN PATENT DOCUMENTS

CN 103237037 A * 8/2013

OTHER PUBLICATIONS

Communication dated Jun. 17, 2019, issued by the Indian Patent Office in counterpart Indian Application No. 3607/DEL/2014.

*Primary Examiner* — Hee Soo Kim
(74) *Attorney, Agent, or Firm* — Sughrue Mion, PLLC

(57) ABSTRACT

A method of providing content is provided. The method includes: receiving, by a target device, first content from a source device; establishing, by the target device, a connection with a cloud computing device; transmitting, by the target device, the first content and content control information to be used to convert the first content, to the cloud computing device; and receiving, by the target device, second content obtained by converting the first content based on the content control information, from the cloud computing device.

13 Claims, 47 Drawing Sheets

(56) References Cited

U.S. PATENT DOCUMENTS

| | | | |
|---|---|---|---|
| 2013/0254656 A1 | 9/2013 | Florian | |
| 2014/0010448 A1 | 1/2014 | Lischinski et al. | |
| 2014/0258514 A1* | 9/2014 | Julia | H04L 43/0876 709/224 |
| 2014/0344415 A1* | 11/2014 | Liu | H04N 19/162 709/219 |
| 2015/0249714 A1* | 9/2015 | Vedula | H04L 65/4015 709/228 |

* cited by examiner

METHOD AND APPARATUS FOR CONVERTING CONTENT USING CLOUD

CROSS-REFERENCE TO RELATED APPLICATIONS

This application claims priority from Indian Patent Application No. 3607/DEL/2014, filed on Dec. 9, 2014, in the Office of the Controller General of Patents, Designs, and Trademarks, and Korean Patent Application No. 10-2015-0162843, filed on Nov. 19, 2015, in the Korean Intellectual Property Office, the disclosures of which are incorporated herein in their entirety by reference.

BACKGROUND

1. Field

Methods and apparatuses consistent with exemplary embodiments relate to methods and apparatuses for processing information based on a cloud computing system, and more particularly, to methods and apparatuses for providing content converted based on a cloud computing system, and even more particularly, to methods and apparatuses for providing content having suitable quality, wherein quality of content is enhanced or modified based on a cloud computing system.

2. Description of the Related Art

With the development of technology, display screens having large sizes and high resolution have appeared on the market. According to such changes in the market, technology needs to develop to provide optimum viewing environments through technically improved displays. In detail, the quality of content to be displayed on the displays needs to improve. Methods of generating stored content, which are currently used, may vary according to devices. Thus, generating high quality content for a certain device may cause inefficiency in terms of compatibility, transmission rates, and storability. Low quality digital content may be inconvenient for a user. In addition, high quality content may be available but a display device may be unable to display the high quality content due to limitations of the display device. Also, due to other limitations, such as bandwidth limitations, high quality content may not be optimally transmitted to a target device.

Variety, volume, and veracity of available digital content ranging from multimedia, text, device dataset, to satellite data inhibits use of specific set of techniques for content conversion. Hence there is a requirement for a dynamic, extendible, and multimodal system to achieve enhancement or modification of digital content.

U.S. patent application Ser. No. 12/454,661 discloses a method and apparatus for generating a modified image using constraint restricting location or geometrical orientation. U.S. patent application Ser. No. 12/454,661 includes initiating a patch-based optimization algorithm for using a first image to generate a second image. This method includes identifying a first feature, corresponding to a constraint on the first feature, of a first image. The constraint restricts at least one of a location and a geometric orientation in a part of the second image representing the first feature. The method includes identifying content of the second image generated by repeating a patch-based optimization algorithm. In one of the embodiments, image retargeting may be improved. A user-defined constraint may be generated for a patch-based optimization process. Semantics in a source image may be preserved by a user input to mark features in an image. In another embodiment, image modifications may be performed using semantic constraints and without defined constraints. The user may control and guide the constraint by marking the features that are to be stored (preserved).

U.S. patent application Ser. No. 13/936,273 discloses a method and apparatus for enhancing a digital photographic image. U.S. patent application Ser. No. 13/936,273 suggests using a combination of global content and specific operations for enhancing the digital photographic image. Image data is analyzed to detect one or more predefined (e.g. face, sky etc.) content items in the image to be separately enhanced. Then a content-specific enhancement operation is performed on at least one detected content item, separately from the remainder of the image data. For example, in one of the embodiments, face enhancement may be shown and the face may be corrected for sidelight correction, exposure correction, and skin tone correction. For the sidelight and exposure corrections, local tone mapping operators that manipulate luminance of faces may be employed. A weighted least square filter is used to decompose a monochromatic channel for the data into a base layer and a detail layer. The base layer is assumed to capture illumination of a face and hence, both the sidelight and exposure corrections operate on the base layer. In another embodiment, shadowed saliency enhancement may be performed to increase the visibility of details in salient regions of an image while preserving global brightness relationships. The process is similar to the previously described process in that a correction factor is applied to each of a selection of pixels.

U.S. patent application Ser. No. 13/661,984 discloses a system, apparatus, and method involved in downloading electronic content for editing using an application. The electronic content is received from a remote network source accessed through a web browser's connection to the source, and a local editing application is separated from the web browser. An embodiment further involves identifying edits made at the local editing application to the electronic content resulting in a new version of the electronic content. The embodiment further involves uploading the new version of the electronic content through the browser's network connection to the source. U.S. patent application Ser. No. 13/661,984 further discloses storing a temporary file comprising the electronic content locally and opening the temporary file of the electronic content in the local editing application.

U.S. patent application Ser. No. 12/973,922 discloses a system and method for image enhancement that matches images to a matrix having various enhancements of images for group of users. The matrix may define image enhancement settings (e.g. a color temperature, tint, brightness, contrast enhancement, etc.) for the particular images and groups of users and the matching may apply enhancements to a new image that closely matches a user's preferences. New users and new images may be added to this matrix to increase its accuracy.

Such an image enhancement system may be deployed as a cloud service where images may be enhanced as a standalone application or as part of a social network or an image sharing website. In some embodiments, the image enhancement system may be deployed on a personal computer or as a component of an image capture device.

U.S. patent application Ser. No. 13/053,393 discloses a method and apparatus for editing a remotely stored image. A user may browse to a site including an image and a preview version of the image may be loaded to a canvas component of the browser. One or more transformations may be applied to the preview image and recorded, and the edited version of the preview image may be rendered in the canvas component. Once the user commits transformation, a request may be sent to a remote server to remotely edit the image as opposed to requiring multiple bandwidth intensive transfers of the entire image. Despite the aforesaid teachings, it may be said that there is still need to provide for improvements in this area of technology.

SUMMARY

According to an exemplary embodiment, a target device that receives content from a source device, establishes a connection with a cloud computing device, and transfers the content to the cloud computing device. Along with the content, the target device also transfers at least one from among characteristic information of the target device, user interest information in the target device, content characteristic information, characteristic information of the source device, and user interest information in the source device.

According to an exemplary embodiment, the target device generates and transmits a task execution request and the content to the cloud computing device. The task execution request is generated by the target device and is based on at least one from among the characteristic information of the target device, the user interest information in the target device, the content characteristic information, the characteristic information of the source device, and the user interest information in the source device. The task execution request may include information about a type of content conversion to be performed by the cloud computing device.

Additionally, the task execution request may be categorized to identify essential tasks and non-essential tasks. When the task execution request contains only one task request, the one task request may be identified as either essential or non-essential. Once the content has been converted by the cloud computing device, the target device is adapted to receive the converted content from the cloud computing device.

According to an exemplary embodiment, there is provided a method of enhancing or modifying content including an image, a video, audio, a digital file, or a combination thereof. For this purpose, a source device establishes a connection with a cloud computing device and transmits the content to the cloud computing device. Along with the content, the source device may also transmit at least one from among characteristic information of a target device, user interest information in the target device, characteristic information of the source device, and user interest information in the source device.

According to another exemplary embodiment, the source device may generate and transmit a task execution request and the content to the cloud computing device. The task execution request is generated by the source device and is based on at least one of the characteristic information of the target device, user interest information in the target device, content characteristic information, characteristic information of the source device, and user interest information in the source device. The task execution request in itself identifies characteristic information of content conversion which the cloud computing device has to perform. Additionally, the task execution request may be categorized to identify essential tasks and non-essential tasks. When the task execution request contains only one task request, the one task request may be identified as either essential or non-essential. Once the content has been converted by the cloud computing device, the source device receives the converted content from the cloud computing device like the target device.

According to another exemplary embodiment, the source device enables the cloud computing device to transmit the converted content directly to the target device.

According to an exemplary embodiment, the cloud computing device establishes a connection with the source device or the target device; receives at least one from among the characteristic information of the target device, the user interest information in the target device, the content characteristic information, the characteristic information of the source device, and the user interest information in the source device; and generates the task execution list.

According to an exemplary embodiment, the cloud computing device receives the task execution request. The cloud computing device performs at least one task on the content thus received to generate the converted content. Prior to performing a task on the content, the cloud computing device may evaluate at least one condition, which may be pre-set (at least one pre-set (predetermined) condition). When the task execution request identifying essential and non-essential tasks is received, the cloud computing device may, depending upon the at least one pre-set condition, select and perform a task identified as essential. Once the converted content is generated, the cloud computing device transmits the converted content to the source device and/or the target device.

According to an exemplary embodiment, the transmitting of the content and at least one from among the characteristic information of the target device, the user interest information in the target device, the content characteristic information, the characteristic information of the source device, and the user interest information in the source device, from the target device to the cloud computing device is performed upon satisfaction of the at least one pre-set condition. The target device transmits the content to the cloud computing device based on plagiarism confirmation information (confirmation). According to an exemplary embodiment, the characteristic information of the target device further includes at least one from among resolution information and format information of the content.

According to an exemplary embodiment, the characteristic information of the target device include at least one from among network heuristic information of the target device, battery condition information of the target device, detail information related to an offline/online mode of the target device, internet billing cycle information of the target device, display characteristic information of the target devices, 3-dimensional (3D) viewing capability information, hardware component status information of the target device, hardware configuration information of the target device, application information operated on the target device, sensor information related to the target device, ambient information, orientation information, and multiview-related information, and includes display characteristic information of the target device including at least one from among resolution information, display size information, and color number information of a display device. Similarly, the characteristic information of the source device includes at least one from among network heuristic information of the source devices, battery condition information of the source device, detail information related to an offline/online mode of the source device, internet billing cycle information of the source device, display characteristic information of the source device, user profile information, 3D viewing capability information, sensor information related to the source device, ambient information, orientation information, and multiview-related information.

According to an exemplary embodiment, hardware component status information may include operation status information of each component of hardware included in a device. The operation status information of each component may include a communication-related status, such as a transmission status or a reception status, and information related to a task execution operation or internet connection (online/offline).

According to an exemplary embodiment, hardware configuration information may include information indicating a type of a component included in a device.

According to an exemplary embodiment, internet billing cycle information may include information indicating a date when an internet bill is charged per month.

According to an exemplary embodiment, user profile information may include personal information related to a user using a device.

According to an exemplary embodiment, sensor information may include an operation status of a sensor of a device and information detected by the sensor.

According to an exemplary embodiment, ambient information may include communication environment status information around a device.

According to an exemplary embodiment, orientation information may include an azimuth of a device or information indicating a data transmission direction of the device.

According to an exemplary embodiment, multiview-related information may include information indicating whether a display of a device provides a multiview function.

According to an exemplary embodiment, user interest information includes language information according to an input, format information, size information, processing time information, aspect ratio information resolution information of content, 2D or 3D format-related information, quality information of the content, and a combination thereof.

According to an exemplary embodiment, for content conversion, at least one task selected from file format conversion; a noise reduction operation; a blur reduction operation; a contrast enhancement operation; a reconstruction operation; a resolution conversion operation; a 2D to 3D conversion operation; an ambient information inclusion operation; an annotation operation; a tagging operation; a sub-title inclusion operation; a text language translation operation; a plagiarism confirmation operation; an audio language translation operation; an audio noise reduction operation; a harmonic fidelity reconstruction operation; or a dynamic gain boost operation, is performed.

An exemplary embodiment may further include a method of storing, by an imaging device, a converted image. For this purpose, a source component generator of the imaging device stores a captured image. A target component generator of the imaging device receives the captured image. Further, a target component establishes a connection with the cloud computing device and transmits the captured image and at least one of characteristic information of the imaging device and user interest information in the imaging device, for conversion of the content by the cloud computing device. In the end, the target component receives modified or enhanced content from the cloud computing device.

Further, an exemplary embodiment may further include a method of transmitting a converted image from the cloud computing device to an electronic device. For this purpose, the cloud computing device receives the content and at least one from among characteristic information of the electronic devices, user interest information in the electronic device, and the content characteristic information. The cloud computing device prepares a task execution list based on at least one from among the characteristic information of the electronic device, the user interest information in the electronic device, and the content characteristic information, wherein the characteristic information of the electronic device include at least one additional display characteristic information, content characteristic information, resolution information of the content, or format information of the content. According to another exemplary embodiment, the cloud computing device receives the task execution request, as prepared by the electronic device.

Based on the task execution list or the task execution request, the cloud computing device performs at least one task on the content to obtain the converted content and transmits the converted content to the electronic device.

In the above method of transmitting the converted content from the cloud computing device to the electronic device, the electronic device transmits, to the cloud computing device, the content and at least one from among the characteristic information of the electronic device, the user interest information in the electronic device, and the content characteristic information for conversion of content, wherein the characteristic information of the electronic device includes at least one from among display characteristic information, content characteristic information resolution information of the content, or format information of the content. According to another exemplary embodiment, the electronic device generates a task execution request based on the aforesaid information and transmits the content along with the task execution request to the cloud computing device. Finally, the electronic device is adapted to receive the converted content from the cloud computing device. Thus, it may be noticed that according to one or more exemplary embodiments, quality of content may improve while transferring content between two system entities.

Also, one or more exemplary embodiments consider characteristic information of a device for selecting an enhancement mode. Furthermore, characteristic information of source and target entities, content characteristic information, or user interest information in a source or target system entity is considered for content enhancement.

According to another exemplary embodiment, there is provided a method of providing content. The method comprises: receiving, by a target device, first content from a source device; establishing, by the target device, a connection with a cloud computing device; transmitting, by the target device, the first content and content control information to be used to convert the first content, to the cloud computing device; and receiving, by the target device, second content obtained by converting the first content based on the content control information from the cloud computing device.

According to yet another embodiment, there is provided a method of providing converted content using a cloud computing device. The method comprises: establishing, by the cloud computing device, a connection with a source device and a target device; receiving, by the cloud computing device, a task execution request and first content from the source device; performing, by the cloud computing device, at least one task on the first content based on the task execution request; and transmitting, by the cloud computing device, second content obtained by converting the first content, to the target device.

According to yet another exemplary embodiment, there is provided a source device for providing converted content. The source device comprises: a connection establishing module configured to establish a connection with a cloud computing device; a communicator configured to transfer content and content control information to the cloud computing device; and at least one processor to control the connection establishing module and the communicator.

According to yet another exemplary embodiment, there is provided a target device for providing converted content. The target device comprises: a connection establishing module configured to establish a connection with a cloud computing device; a controller configured to generate a task execution request; a transmitter configured to transmit the task execution request and a content to the cloud computing device; and a receiver configured to receive the content from the cloud computing device.

According to yet another exemplary embodiment, there is provided a cloud-based computing device for providing converted content. The cloud-based computing device comprises: a connection establishing module configured to establish a connection with a source device and a connection with a target device; a receiver configured to receive content and content control information used to convert the content; a processor configured to generate a task execution list based on the content control information, wherein the processor performs at least one task on the content according to the task execution list to obtain converted content; and a transmitter configured to transmit the converted content to the target device.

BRIEF DESCRIPTION OF THE DRAWINGS

To further clarify features of the present disclosure, a more particular description of the present disclosure will be rendered by reference to specific exemplary embodiments thereof, which is illustrated in the appended drawings. It is appreciated that these drawings depict only exemplary embodiments of the present disclosure and are therefore not to be considered limiting of its scope. The present disclosure will be described and explained with additional specificity and detail with the accompanying drawings in which.

DETAILED DESCRIPTION

Figure 1:
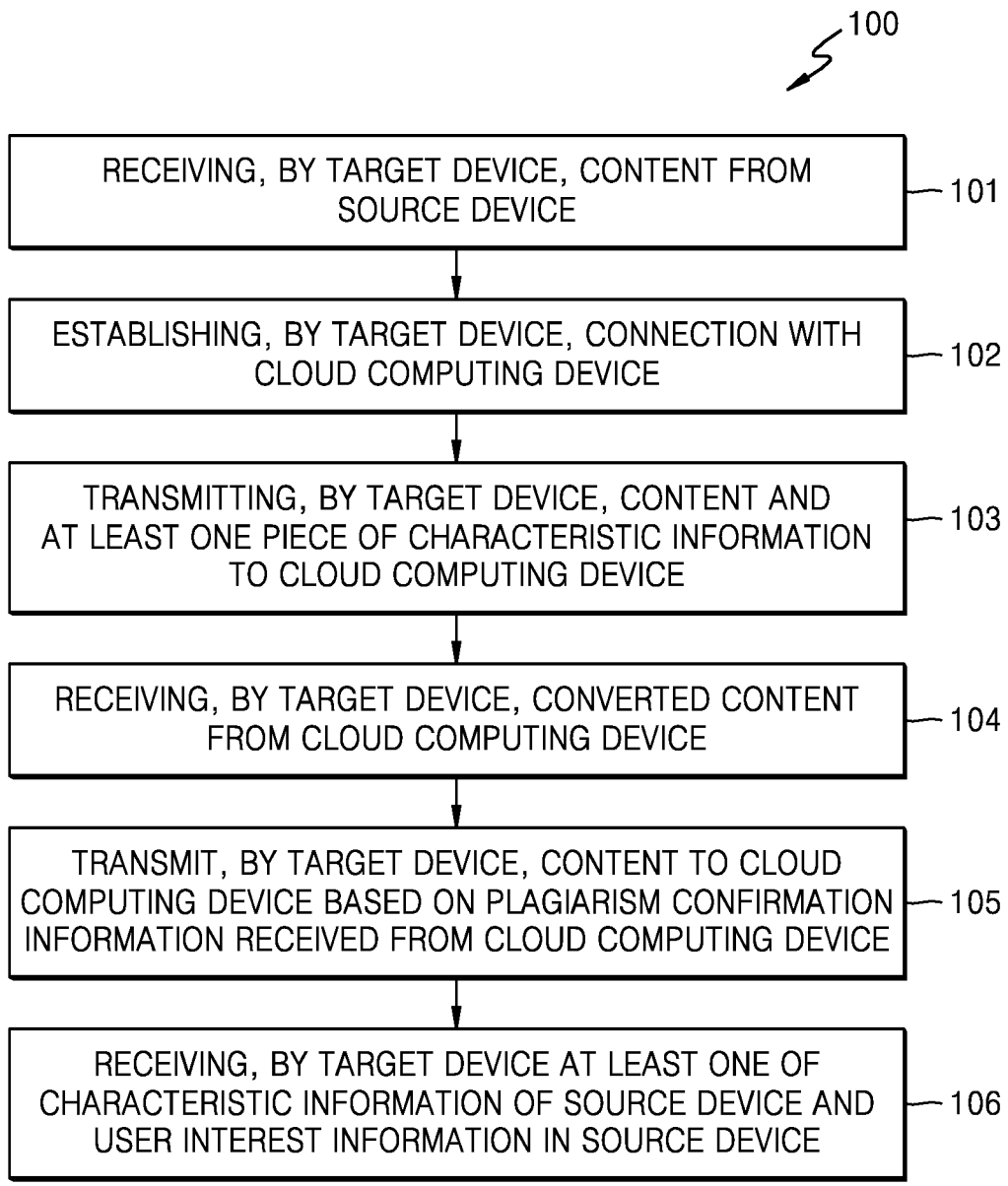
FIG. 1 is a flowchart of a method implemented by a target device for conversion of content, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Terms used herein may be interpreted in similar terms replaceable by one of ordinary skill in the art or commonsensically.

Thus, the term "an embodiment" may refer not only to one exemplary embodiment but also to at least one exemplary embodiment or to all exemplary embodiments.

The terminology and structure employed herein is for describing, teaching and illuminating some exemplary embodiments and their specific features and elements and does not limit, restrict or reduce the spirit and scope of the claims or their equivalents.

More specifically, any terms used herein such as but not limited to "includes," "comprises," "has," "consists," and grammatical variants thereof do not specify an exact limitation or restriction. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

As used herein, the term "and/or" includes any and all combinations of one or more of the associated listed items. Expressions such as "at least one of," when preceding a list of elements, modify the entire list of elements and do not modify the individual elements of the list.

FIG. 1 is a flowchart of a method 100 of providing converted content, which is implemented by a target device, according to an exemplary embodiment. The method 100 according to an exemplary embodiment may include: receiving, by the target device, content from a source device (operation 101); establishing, by the target device, a connection with a cloud computing device (operation 102); transferring, by the target device, to the cloud computing device the content and at least one piece of characteristic information (operation 103); and receiving, by the target device, converted content from the cloud computing device (operation 104). The at least one piece of characteristic information may include characteristic information of the target device, user interest information in the target device, content characteristic information of the content, characteristic information of the source device, and user interest information in the source device.

The converting of the content according to an exemplary embodiment may include modifying and/or enhancing of the content.

According to another exemplary embodiment the characteristic information of the target device may include at least one of display characteristic information of the target device, the content characteristic information, resolution information of the content, and format information of the target device, and may further include information related to the characteristic information of the target device.

According to another exemplary embodiment, the characteristic information of the target device may include at least one of network heuristic information of the target device, battery condition information of the target device, detail information related to an offline/online mode of the target device, detail information related to an internet billing cycle of the target device, display characteristic information of the target device, 3D view capability information, hardware component status information of the target device, hardware configuration information of the target device, application information operated on the target device, sensor information related to the target device, ambient information, orientation information, and multiview-related information. Here, the display characteristic information of the target device may include at least one of resolution information, size information of a display, and color number information of a display device.

According to another exemplary embodiment, the display characteristic information of the target device may include at least one of resolution-related information, information related to a display size, and information related to a color number of a display device.

According to another exemplary embodiment, the method 100 may further include transmitting the content, by the target device, to the cloud computing device based on plagiarism confirmation information received from the cloud computing device (operation 105). According to another exemplary embodiment, the content may include includes an image, a video, audio, a digital file, or a combination thereof.

According to another exemplary embodiment, the method 100 may further include receiving, by the target device, at least one of the characteristic information of the source device and the user interest information in the source device (operation 106). According to another exemplary embodiment, the characteristic information of the source device may include at least one of network heuristic information of the source device, battery condition information of the source device, detail information related to an offline/online mode of the source device, detail information related to an internet billing cycle of the source device, display characteristic information of the source device, user profile information, 3D view capability information, sensor information related to the source device, ambient information, orientation information, and multiview-related information.

According to another exemplary embodiment, user interest information may include at least one of language information regarding an input, format information, size information, processing time information, aspect ratio information, resolution information of content, 2D or 3D format-related information, quality information of content, and a combination thereof. According to another exemplary embodiment, the target device may transmit, to the cloud computing device, the content and at least one of the characteristic information of the target device, the user interest information in the target device, the content characteristic information, the characteristic information of the source device, and the user interest information in the source device. Such transmission may be performed when at least one pre-set condition is satisfied.

According to another exemplary embodiment, the at least one pre-set condition may be related to one or more parameters, for example, as listed in Table 1 below.

TABLE 1

Decision on Enhancement based on Device Status

| Parameter | Status | |
|---|---|---|
| Internet Connection Type | Low speed internet e.g. 2G, 3G | High speed internet e.g. broadband, Wi-Fi |
| Network Heuristics Conditions | Network not available: Contents are transmitted, without conversion, directly from source system entity to target system entity | Network available: Contents are transmitted with or without conversion from source system entity to target system entity via cloud depending on internet connection type |
| User Selected Network Mode | Offline: Contents are transmitted, without conversion, directly from source system entity to target system entity | Online: Contents are transmitted with or without conversion from source system entity to target system entity via cloud depending on internet connection type |
| Battery Conditions | Low battery conditions: Contents are transmitted, without conversion, directly from source system entity to target system entity | Sufficient battery available: Contents are transmitted with or without conversion from source system entity to target system entity via cloud depending on internet connection type |
| Internet Billing Cycle | Paid usage: Contents are transmitted, without conversion, directly from source system entity to target system entity | Free usage: Contents are transmitted with or without conversion from source system entity to target system entity via cloud depending on internet connection type |
| User Profile | Enhancement decision as per pre-defined setting done by user | |

According to another exemplary embodiment, content may be converted in various types. Table 2 shows examples of various types of conversion.

TABLE 2

Various Conversion Capabilities for Different Types of Content

| Content Type | Capabilities of Target System Entity | Activity Tasks | Optional Parameters* | Mandatory Parameters* |
|---|---|---|---|---|
| Image | 1. Ability to display file format of original | 1. File format conversion 2. Content enhancement, i.e. | 1. 2D to 3D conversion 2. Content | 1. File format conversion |

TABLE 2-continued

Various Conversion Capabilities for Different Types of Content

| Content Type | Capabilities of Target System Entity | Activity Tasks | Optional Parameters* | Mandatory Parameters* |
|---|---|---|---|---|
| | content<br>2. Ability to display original content on target device<br>3. Ability to display original content in ambience target device is located<br>4. 3D viewing | denoising, deblurring, contrast enhancement, reconstruction, etc.<br>3. Resolution modification<br>4. 2D to 3D conversion<br>5. Ambient information<br>6. Annotation in images and videos for geometric and textual tagging | enhancement, i.e., denoising, deblurring, contrast enhancement, reconstruction, etc.<br>3. Ambient information<br>4. Annotation in images and videos for geometric and textual tagging | 2. Resolution modification as per display characteristic information of target device |
| Video | 1. Ability to display file format of original content<br>2. Ability to display original content on target device<br>3. Ability to display original content in ambience target device is located<br>4. 3D viewing | 1. File format conversion<br>2. 2D to 3D conversion<br>3. Content enhancement, i.e., denoising, deblurring, contrast enhancement, reconstruction, etc.<br>4. Resolution modification<br>5. Ambient information<br>6. Subtitle language in video<br>7. Annotation in images and videos for geometric and textual tagging | 1. 2D to 3D conversion<br>2. Content enhancement, i.e., denoising, deblurring, contrast enhancement, reconstruction etc.<br>3. Ambient information<br>4. Subtitle language in video<br>5. Annotation in images and videos for geometric and textual tagging | 1. File format conversion<br>2. Resolution modification as per display characteristic information of target device |
| Text | 1. Ability to display file format of original content<br>2. Ability to display original content on target device<br>3. Support to display various languages | 1. File format conversion<br>2. Text language translation<br>3. Check for plagiarism<br>4. Ambient information | 1. Check for plagiarism<br>2. Ambient information | 1. File format conversion<br>2. Text language translation |
| Audio | 1. Ability to display file format of original content<br>2. Support to display various languages | 1. File format conversion<br>2. Audio language translation<br>3. Audio enhancement, i.e., audio noise reduction, harmonic fidelity reconstruction, dynamic gain boosting | 1. Audio enhancement, i.e., audio noise reduction, harmonic fidelity reconstruction, dynamic gain boosting | 1. File format conversion<br>2. Audio language translation |

Note:
*Optional parameters may be switched to mandatory parameters depending on capabilities of target system entity.

According to another exemplary embodiment, at least one essential parameter of the content may be checked before being transmitted from the target device to the cloud computing device.

Herein, information indicating certain properties, such as characteristic information of a device or content characteristic information, and information required to control content, such as a task execution request or a task execution list, may be included in content control information, and may be commonly referred to as content control information. Herein, characteristic information of a device may denote characteristic information of a target device and/or characteristic information of a source device. Also, characteristic information of a device may include content characteristic information of content processed by the device.

Characteristic information of a target device according to an exemplary embodiment may be referred to as target device-related information. Here, the target device-related information may include at least one of display characteristic information of the target device, content characteristic information, resolution information of content, and format information of the content as described above.

Characteristic information of a source device according to an exemplary embodiment may be referred to as source device-related information. Here, the source device-related information may include at least one of display characteristic information of the source device, content characteristic information, resolution information of content, and format information of the content as described above.

Characteristic information described hereinafter may be understood to include the descriptions above unless otherwise stated.

Figure 2:
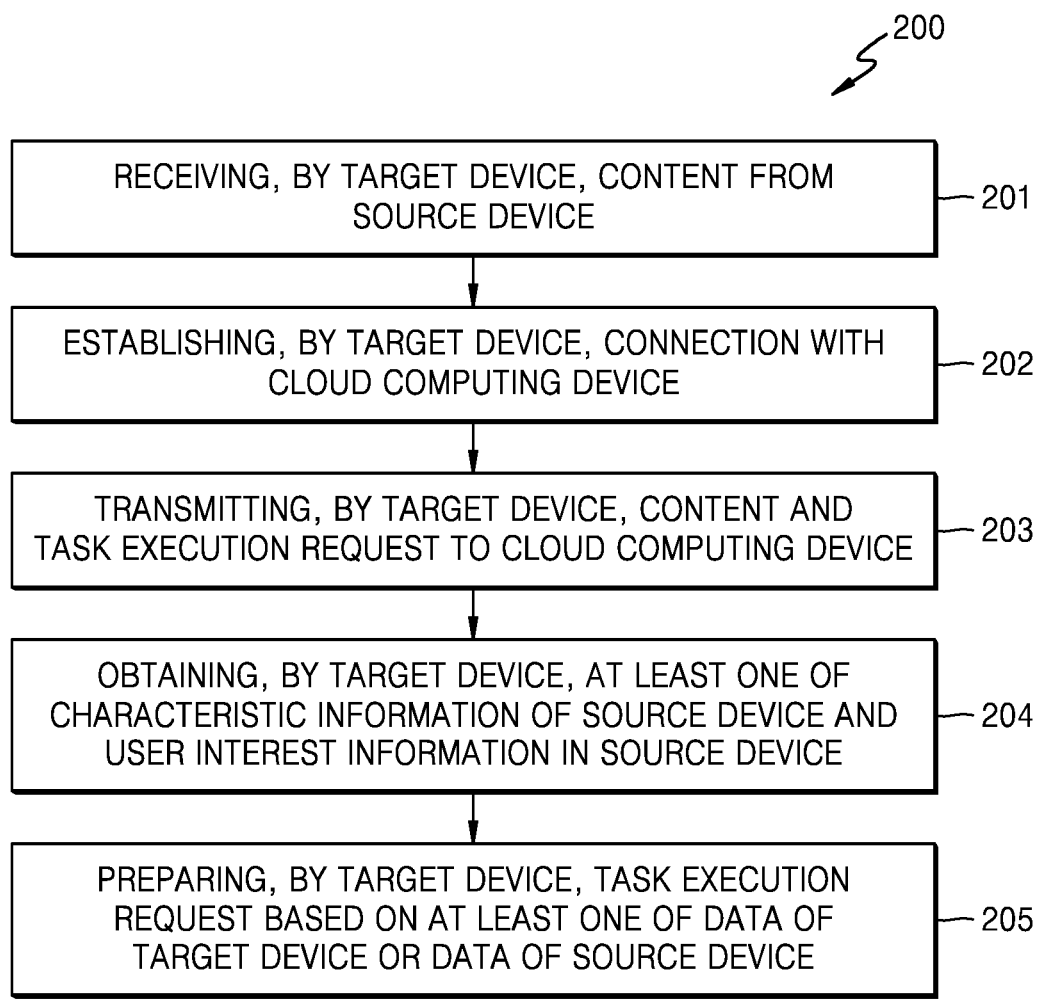
FIG. 2 is a flowchart of a method implemented by a target device for conversion of content, according to another exemplary embodiment.

FIG. 2 is a flowchart of a method 200 of providing converted content, according to another exemplary embodiment. According to an exemplary embodiment, the method may include: receiving, by a target device, content from a source device (operation 201); establishing, by the target device, a connection with a cloud computing device (operation 202); and transmitting, by the target device, a task execution request and the content to the cloud computing device for conversion of the content by the cloud computing device (operation 203). Here, the task execution request is generated based on at least one of characteristic information of the target device, user interest information in the target device, content characteristic information, characteristic information of the source device, and user interest information in the source device.

According to another exemplary embodiment, the characteristic information of the target device may include at least one of resolution information of content and format information of the content.

According to another exemplary, the content characteristic information may include at least one of resolution information of content and format information of the content.

According to another exemplary embodiment, the content includes an image, a video, audio, a digital file, or a combination thereof.

According to another exemplary embodiment, the method 200 may further include obtaining, by the target device, at least one of characteristic information of the source device and user interest information in the source device (operation 204).

According to another exemplary embodiment, the characteristic information of the source device may include at least one of network heuristic information of the source device, battery condition information of the source device, detail information related to an offline/online mode of the source device, detail information related to an internet billing cycle of the source device, display characteristic information of the source device, user profile information, 3D view capability information, sensor information related to the source device, ambient information, orientation information, and multiview-related information.

According to another exemplary embodiment, the method 200 may further include preparing, by the target device, a task execution request based on at least one of target device information, source device information, and user interest information.

Here, the target or source device information may include at least one of the characteristic information of the target or source device, the user interest information in the target or source device, and the content characteristic information.

According to another exemplary embodiment, the characteristic information of the target device may include network heuristic information of the target devices, battery condition information of the target device, detail information related to an offline/online mode of the target device, detail information related to an internet billing cycle of the target device, display characteristic information of the target device, 3D view capability information, hardware component status information of the target device, hardware configuration information of the target device, application information operated on target device, sensor information related to the target device, ambient information, orientation information, and multiview-related information. Here, the display characteristic information of the target device may further include at least one of resolution information, display size information, and color number information of a display device.

According to another exemplary embodiment, user interest information may include language information regarding an input, format information, size information, processing time information, aspect ratio information, resolution information of content, 2D or 3D format related information, quality information of content, and a combination thereof.

According to another exemplary embodiment, transmitting of the content and the task execution request from the target device to the cloud computing device may be performed only when at least one of pre-set conditions including the characteristic information of the target device and the content characteristic information are satisfied.

According to another exemplary embodiment, the task execution request may be categorized to identify an essential task and a non-essential task.

Figure 3:
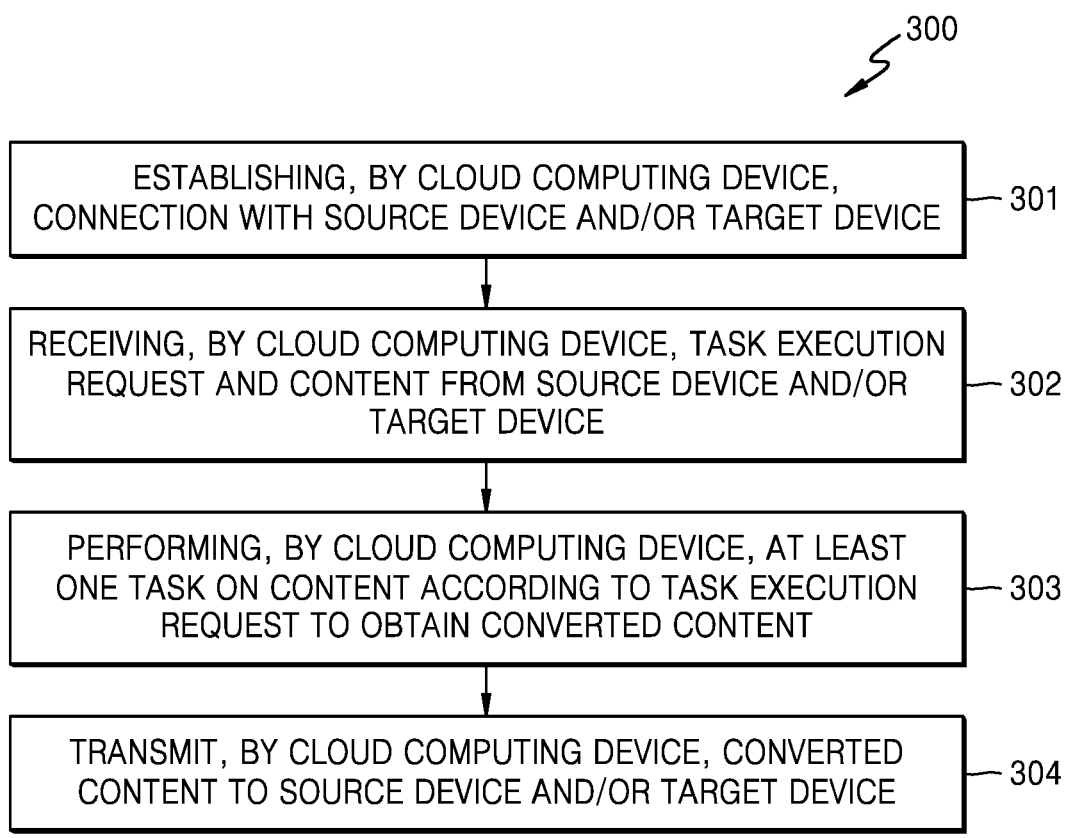
FIG. 3 is a flowchart of a method of converting, by a cloud computing device, content, according to an exemplary embodiment.

FIG. 3 is a flowchart of a method 300 of converting, by a cloud computing device, content, according to an exemplary embodiment. The method 300 according to an exemplary embodiment may include: establishing a connection, by the cloud computing device, with a source device and/or a target device (operation 301); receiving, by the cloud computing device, a task execution request and content from the source device and/or the target device (operation 302); performing, by the cloud computing device, at least one task on the content in accordance with the task execution request, to obtain converted content (operation 303); and transmitting, by the cloud computing device, the converted content to the source device and/or the target device (operation 304). Here, the task execution request may be generated based on at least one of characteristic information of the target device, user interest information in the target device, content characteristic information, characteristic information of the source device, and user interest information in the source device.

According to another exemplary embodiment, the characteristic information of the target device may further include, as well as the display characteristic information of the target device, other pieces of characteristic information.

According to another exemplary embodiment, the content characteristic information may further include, as well as the resolution information or the format information of the content, other pieces of characteristic information.

According to another exemplary embodiment, the characteristic information of the target device may include at least one of network heuristic information of the target device, battery condition information of the target device, detail information related to an offline/online mode of the target device, detail information related to an internet billing cycle of the target device, display characteristic information of the target device, 3D-viewing capability information, hardware component status information of the target device, hardware configuration information of the target device, application information operated on the target device, sensor information related to the target device, ambient information, orientation information, and multiview-related information. Here, the display characteristic information of the target device may further include at least one of resolution information, size information of a display, and color number information of a display device.

According to another exemplary embodiment, the characteristic information of the source device may include at least one of network heuristic information of the source device, battery condition information of the source device, detail information related to an offline/online mode of the source device, detail information related to an internet billing cycle of the source device, display characteristic information of the source device, user profile information, 3D-viewing capability information, sensor information related to the source device, ambient information, orientation information, and multiview-related information.

According to another exemplary embodiment, the content may include an image, a video, audio, a digital file, or a combination thereof.

According to another exemplary embodiment, the performing of the at least one task on the content may include performing at least one of: a file format conversion operation; a noise reduction operation; a blur reduction operation; a contrast enhancement operation; a reconstruction operation; a resolution modification operation; a 2D to 3D conversion operation; an ambient information inclusion operation; an annotation operation; a tagging operation; a sub-title inclusion operation; a text language translation operation; a plagiarism check operation; an audio language translation operation; an audio noise reduction operation; a harmonic fidelity reconstruction operation; or a dynamic gain boost operation.

According to another exemplary embodiment, the performing of the at least one task may further include selecting at least one processing method and selecting at least one quality decision parameter to obtain the converted content.

According to another exemplary embodiment, the cloud computing device may perform the at least one task only when at least one pre-set condition is satisfied.

Figure 4:
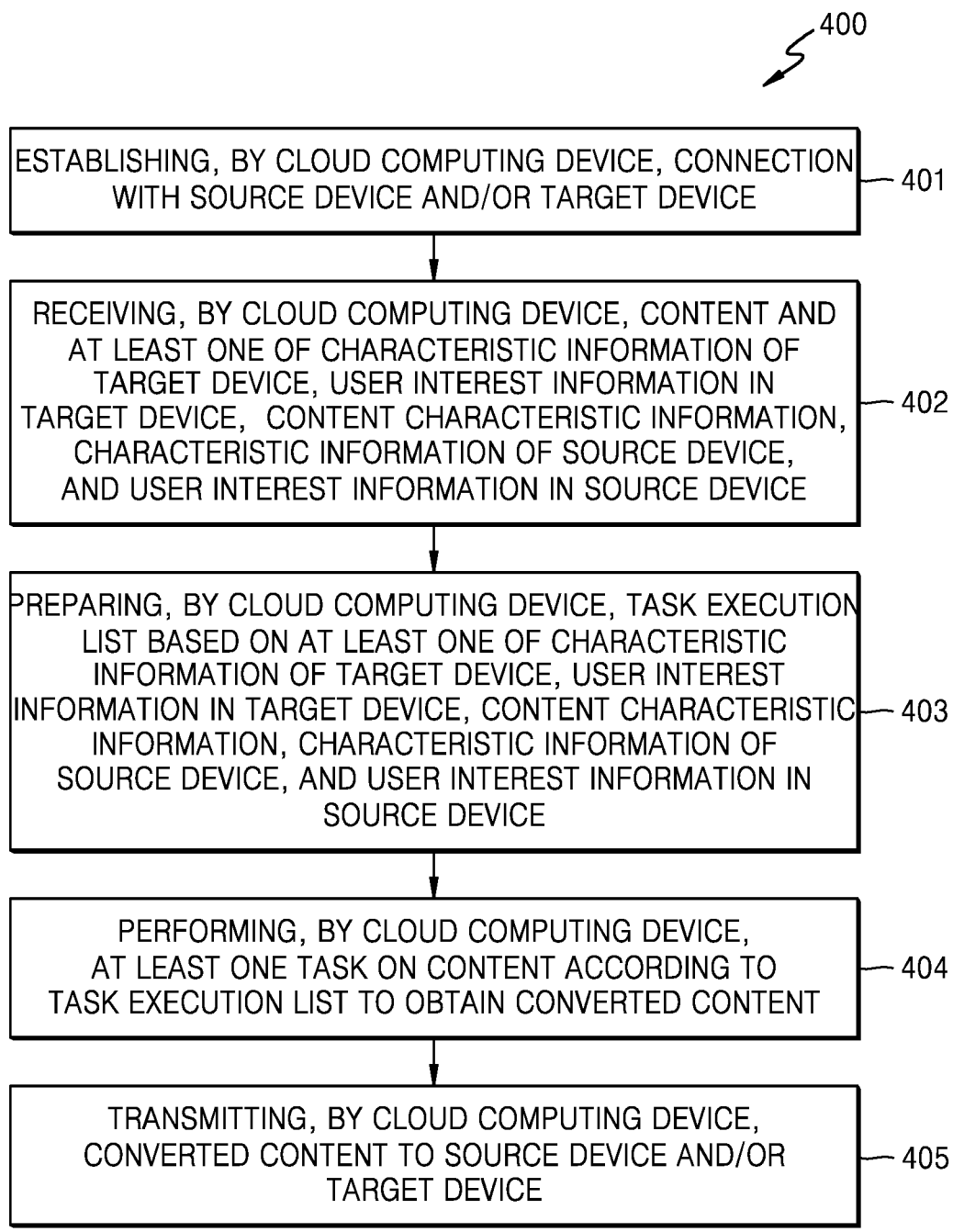
FIG. 4 is a flowchart of a method implemented by a cloud computing device for conversion of content, according to an exemplary embodiment.

FIG. 4 is a flowchart of a method 400 of converting content using the cloud, according to an exemplary embodiment. The method 400 according to an exemplary embodiment may include: establishing a connection, by a cloud computing device, with a source device and/or a target device (operation 401); receiving, by the cloud computing device, content and at least one of characteristic information of the target device, user interest information in the target device, content characteristic information, characteristic information of the source device, and user interest information in the source device (operation 402); preparing, by the cloud computing device, a task execution list based on at least one of the characteristic information of the target device, the user interest information in the target device, the content characteristic information, the characteristic information of the source device, and the user interest information in the source device (operation 403); performing, by the cloud computing device, at least one task on the content according to the task execution list, to obtain converted content (operation 404); and transferring, by the cloud computing device, the converted content to the source device and/or the target device (operation 405).

According to another exemplary embodiment, the characteristic information of the target device may further include at least one characteristic other than or in addition to display characteristic information of the target device.

According to another exemplary embodiment, the content characteristic information may further include at least one characteristic other than or in addition to resolution information or format information of the content.

According to another exemplary embodiment, the characteristic information of the target device may include at least one of network heuristic information of the target device, battery condition information of the target device, detail information related to an offline/online mode of the target device, detail information related to an internet billing cycle of the target device, display characteristic information of the target device, 3D-viewing capability information, hardware component status information of the target device, hardware configuration information of the target device, application information operated on the target device, sensor information related to the target device, ambient information, orientation information, and multiview-related information. The display characteristic information of the target device may include at least one of resolution information, size information of a display, and color number information of a display device.

According to another exemplary embodiment, the characteristic information of the source device may include at least one of network heuristic information of the source device, battery condition information of the source device, information related to an offline/online mode of the source device, detail information related to an internet billing cycle of the source device, display characteristic information of the source device, user profile information, 3D-viewing capability information, sensor information related to the source device, ambient information, orientation information, and multiview-related information.

According to another exemplary embodiment, the content may include an image, a video, audio, a digital file, or a combination thereof.

According to another exemplary embodiment, the performing of the at least one task on the content may include performing at least one of: a file format conversion operation; a noise reduction operation; a blur reduction operation; a contrast enhancement operation; a reconstruction operation; a resolution modification operation; a 2D to 3D conversion operation; an ambient information inclusion operation; an annotation operation; a tagging operation; a sub-title inclusion operation; a text language translation operation; a plagiarism check operation; an audio language translation operation; an audio noise reduction operation; a harmonic fidelity reconstruction operation; and a dynamic gain boost operation.

According to another exemplary embodiment, the performing of the at least one task may further include selecting at least one processing method and selecting at least one quality decision parameter to obtain the converted content.

According to another exemplary embodiment, the task execution list may be categorized to identify an essential task and a non-essential task.

According to another exemplary embodiment, the converted content may be transmitted to the source device and/or the target device based on satisfaction of at least one pre-set condition. In detail, when the at least one pre-set condition is satisfied, the converted content may be transmitted to the source device and/or the target device.

Figure 5:
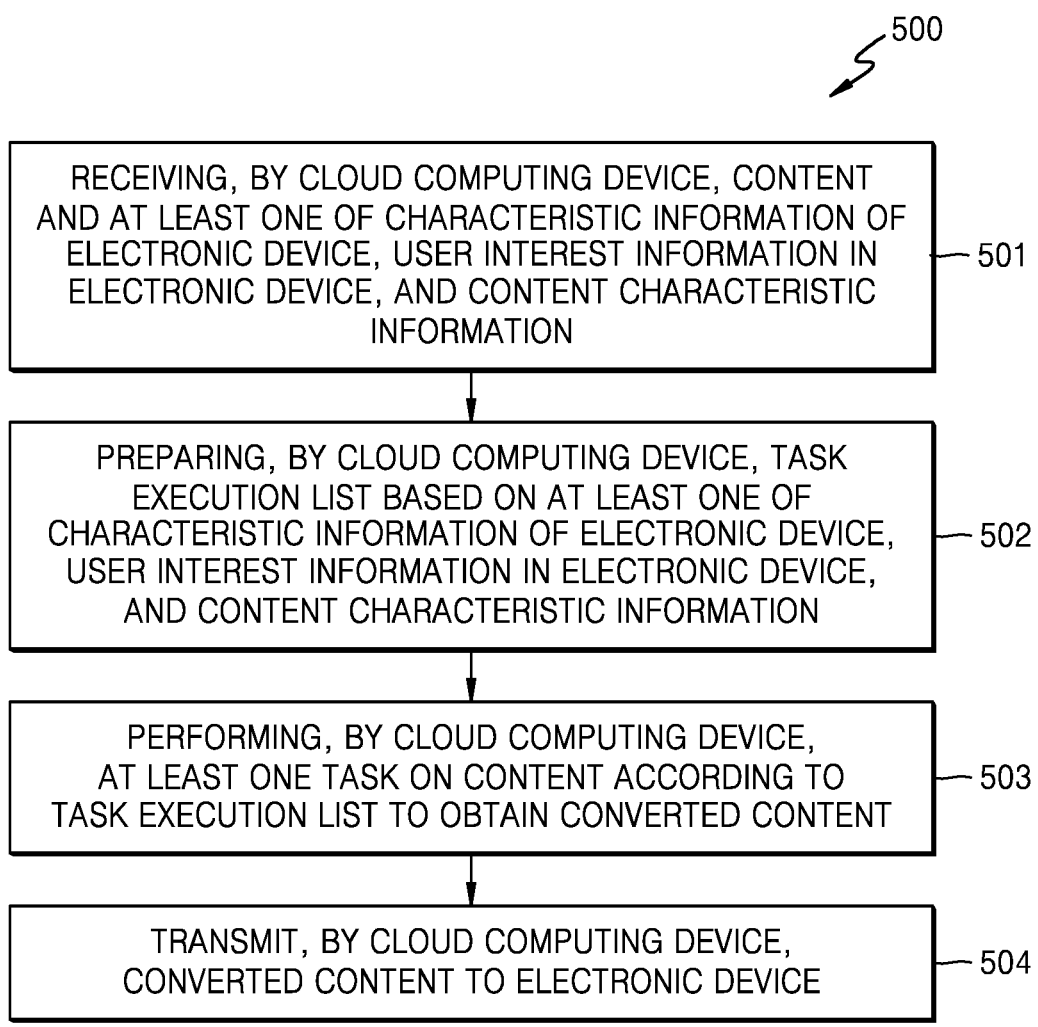
FIG. 5 is a flowchart of a method implemented by a cloud computing device for transmission of converted content, according to an exemplary embodiment.

FIG. 5 is a flowchart of a method 500 of transmitting, by a cloud computing device, converted content to an electronic device, according to an exemplary embodiment. The method 500 according to an exemplary embodiment may include: receiving, by the cloud computing device, content and at least one of characteristic information of the electronic device, user interest information in the electronic device, and content characteristic information (operation 501); preparing, by the cloud computing device, a task execution list based on at least one of the characteristic information of the electronic device, the user interest information in the electronic device, and the content characteristic information (operation 502); performing, by the cloud computing device, at least one task on content according to the task execution list, to obtain converted content (operation 503); and transmitting, by the cloud computing device, the converted content to the electronic device (operation 504). The characteristic information of the electronic device according to an exemplary embodiment may include at least one characteristic other than or in addition to the display characteristic information or the content characteristic information. Similarly, the content characteristic information according to an exemplary embodiment may include at least one characteristic other than or in addition to resolution information or format information of the content.

Figure 6:
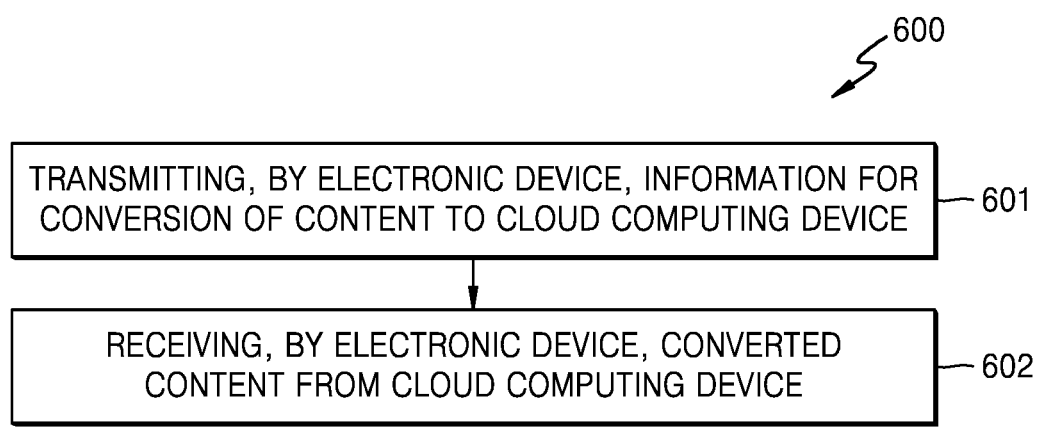
FIG. 6 is a flowchart of a method implemented by an electronic device for reception of converted content, according to an exemplary embodiment.

FIG. 6 is a flowchart of a method 600 of receiving, by an electronic device, converted content from a cloud computing device, according to an exemplary embodiment. The method 600 according to an exemplary embodiment may include: transmitting, by the electronic device, information for conversion of content to the cloud computing device (operation 601); and receiving, by the electronics device, converted content from the cloud computing device (operation 602). The information for conversion of content may include content and at least one of characteristic information of the electronic device, user interest information in the electronic device, and content characteristic information. The characteristic information of the electronic device may include at least one characteristic other than or in addition to display characteristic information or the content characteristic information may include at least one characteristic other than or in addition to resolution information or format information of the content.

Figure 7:
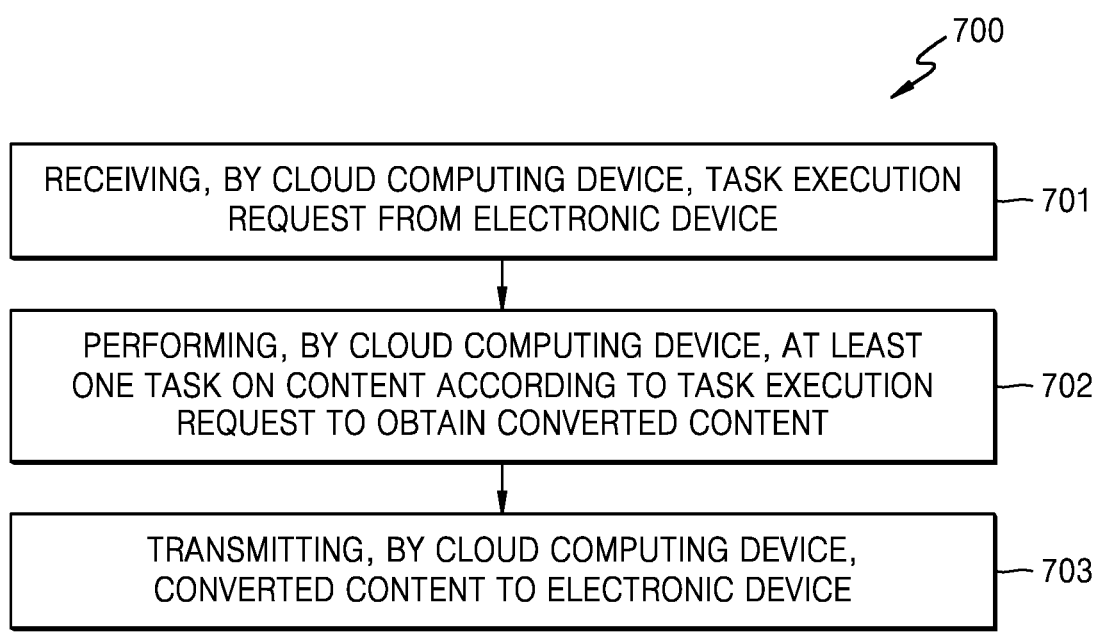
FIG. 7 is a flowchart of a method of transmitting, by a cloud computing device, converted content to an electronic device, according to an exemplary embodiment.

FIG. 7 is a flowchart of a method 700 of transmitting, by a cloud computing device, converted content to an electronic device, according to an exemplary embodiment. The method 700 according to an exemplary embodiment may include: receiving, by the cloud computing device, content and a task execution request from the electronic device (operation 701); performing, by the cloud computing device, at least one task on content according to the task execution request to obtain converted content (operation 702); and transmitting, by the cloud computing device, the converted content to the electronic device (operation 703). The task execution request according to an exemplary embodiment may be based on at least one of characteristic information of a device, user interest information in the device, and content characteristic information, and the characteristic information of the device according to an exemplary embodiment may include at least one characteristic other than or in addition to display characteristic information of the device or the content characteristic information may include at least one characteristic other than or in addition to resolution information or format information of the content.

Figure 8:
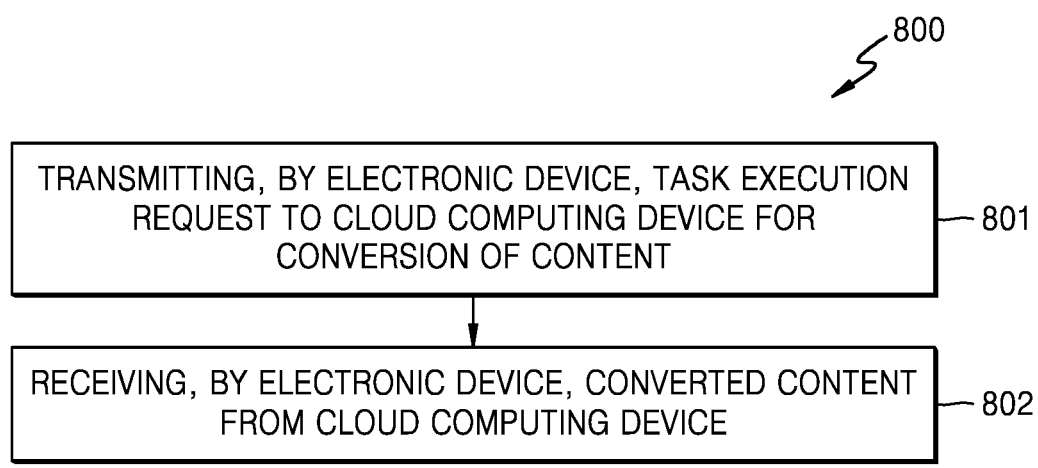
FIG. 8 is a flowchart of a method of receiving, by an electronic device, converted content from a cloud computing device, according to an exemplary embodiment.

FIG. 8 is a flowchart of a method 800 of receiving, by an electronic device, converted content from a cloud computing device, according to an exemplary embodiment. The method 800 according to an exemplary embodiment may include: transmitting, by the electronic device, to the cloud computing device a content and a task execution request for enabling conversion of the content (operation 801); and receiving, by the electronic device, the converted content from the cloud computing device (operation 802). The task execution request according to an exemplary embodiment may include at least one of characteristic information of the electronic device, user interest information in the electronic device, and content characteristic information. The characteristic information of the electronic device may include at least one characteristic other than or in addition to display characteristic information or content characteristic information may include at least one characteristic other than or in addition to format information or resolution information of the content.

Figure 9:
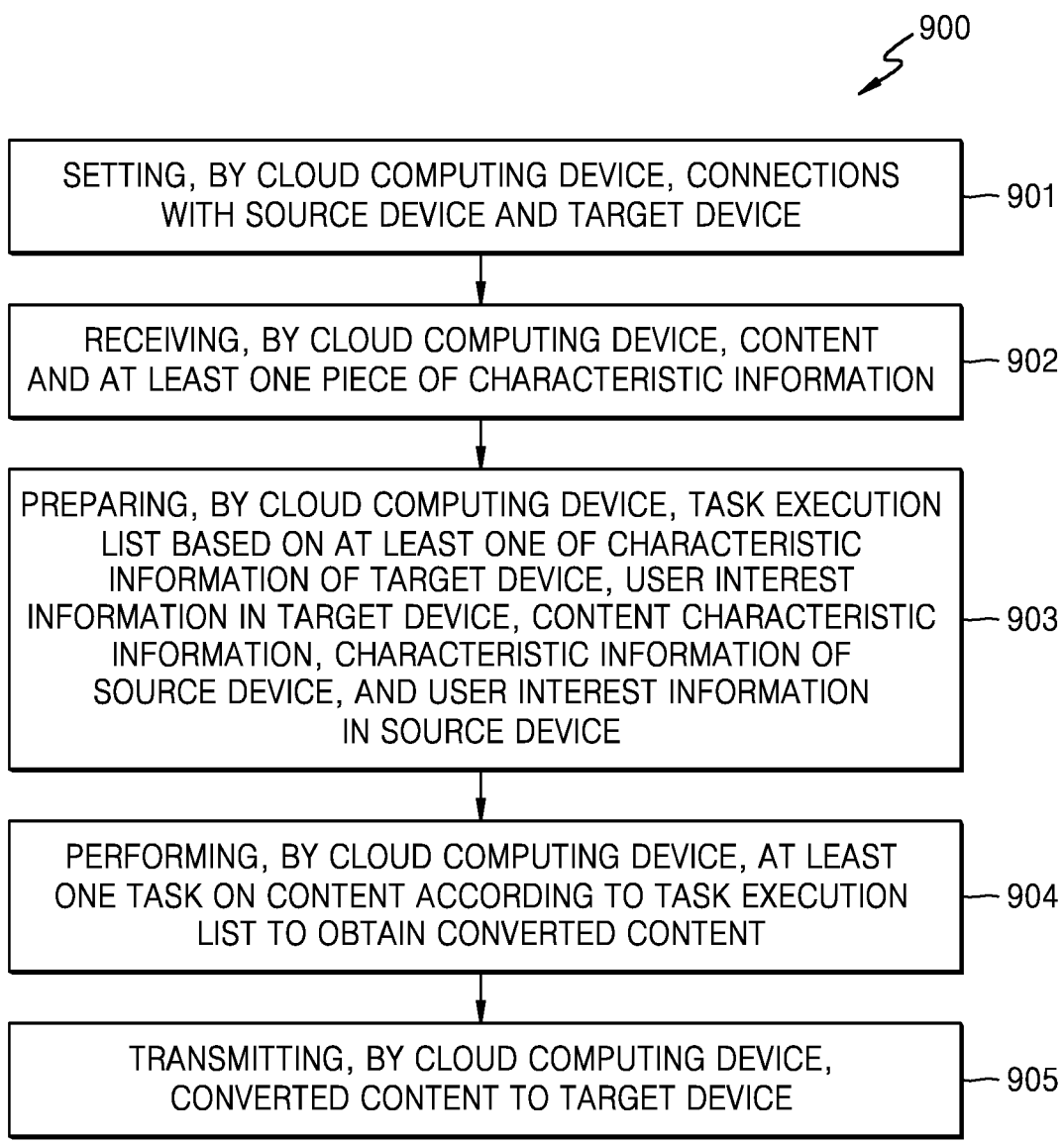
FIG. 9 is a flowchart of a method of converting, by a cloud computing device, content over a cloud, according to an exemplary embodiment.

FIG. 9 is a flowchart of a method 900 of converting, by a cloud computing device, content over a cloud, according to an exemplary embodiment. The method 900 may include: establishing connections, by the cloud computing device, with a source device and a target device (operation 901); receiving, by the cloud computing device, content and at least one characteristic information (operation 902); preparing, by the cloud computing device, a task execution list based on the at least one characteristic information (operation 903); performing, by the cloud computing device, at least one task on the content according to the task execution list to obtain converted content (operation 904); and transmitting, by the cloud computing device, the converted content to the target device (operation 905).

The at least one characteristic information according to an exemplary embodiment may include characteristic information of the target device, user interest information in the target device, content characteristic information, characteristic information of the source device, and user interest information in the source device.

The characteristic information of the target device and the user interest information in the target device, according to an exemplary embodiment, may be received from the target device. Also, the characteristic information of the source device and the user interest information in the source device, according to an exemplary embodiment, may be received from the source device.

The characteristic information of the target device may include at least one characteristic other than or in addition to display characteristic information of the target device or the content characteristic information may include at least one characteristic other than or in addition to resolution information or format information of the content.

Figure 10:
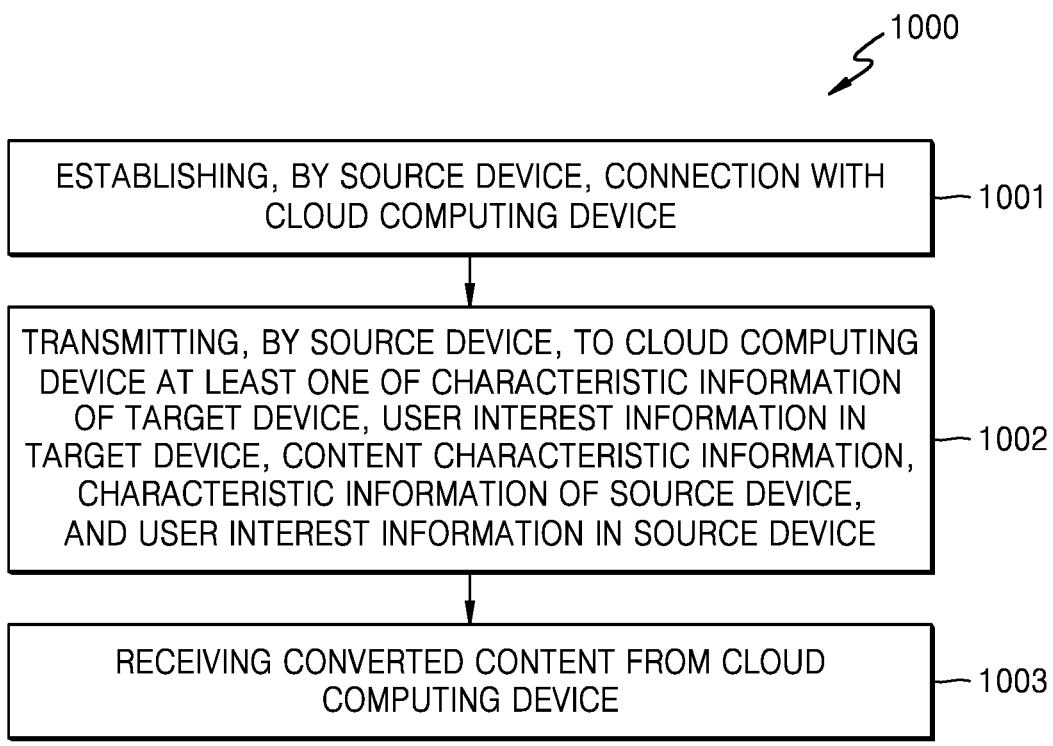
FIG. 10 is a flowchart of a method implemented by a source device for enabling conversion of content, according to an exemplary embodiment.

FIG. 10 is a flowchart of a method 1000 of converting content, according to an exemplary embodiment. The method 1000 may include: establishing, by a source device, a connection with a cloud computing device (operation 1001); transmitting, by the source device, to the cloud computing device at least one piece of characteristic information (operation 1002); and receiving converted content from the cloud computing device (operation 1003).

The at least one piece of characteristic information according to an exemplary embodiment may include characteristic information of the target device, user interest information in the target device, content characteristic information, characteristic information of the source device, and user interest information in the source device.

The characteristic information of the target device according to an exemplary embodiment may include at least one characteristic other than or in addition to display characteristic information of the target device or the content characteristic information may include at least one characteristic other than or in addition to resolution information or format information of the content.

Figure 11:
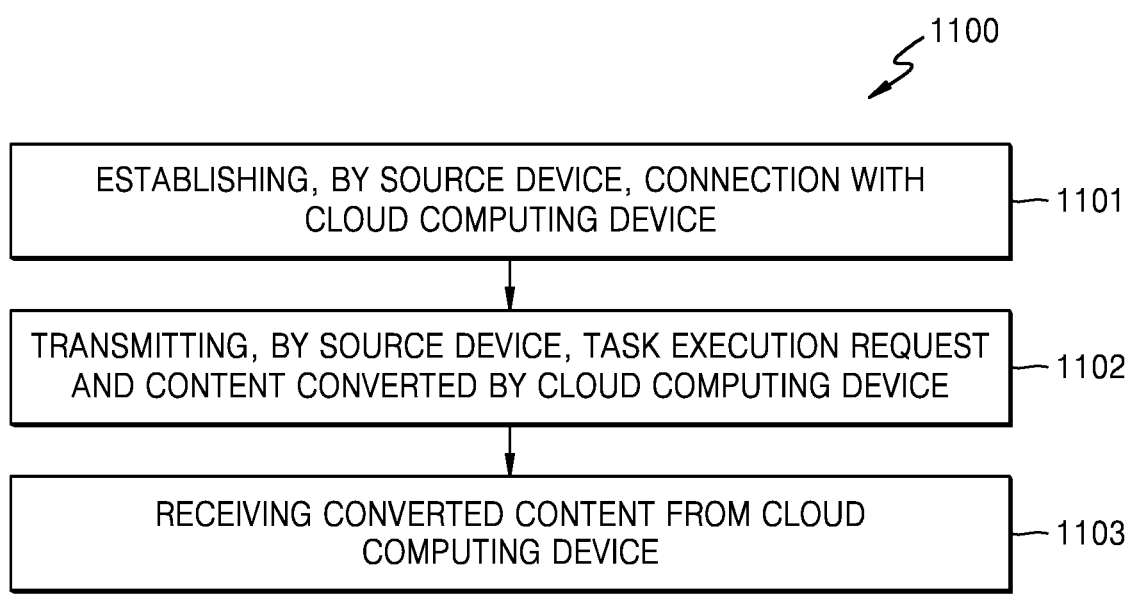
FIG. 11 is a flowchart of a method implemented by a source device for enabling conversion of content, according to another exemplary embodiment.

FIG. 11 is a flowchart of a method 1100 of converting content based on a cloud computing device, according to another exemplary embodiment. The method 1100 according to an exemplary embodiment may include: establishing, by a source device, a connection with the cloud computing device (operation 1101); transmitting, by the source device, a task execution request and content converted by the cloud computing device (operation 1102); and receiving the converted content from the cloud computing device (operation 1103).

The task execution request may be generated based on at least one of characteristic information of the target device, user interest information in the target device, content characteristic information, characteristic information of the source device, and user interest information in the source device. The characteristic information of the target device may include at least one characteristic other than or in addition to display characteristic information of the target device or the content characteristic information may include at least one characteristic other than or in addition to resolution information or format information of the content.

Figure 12:
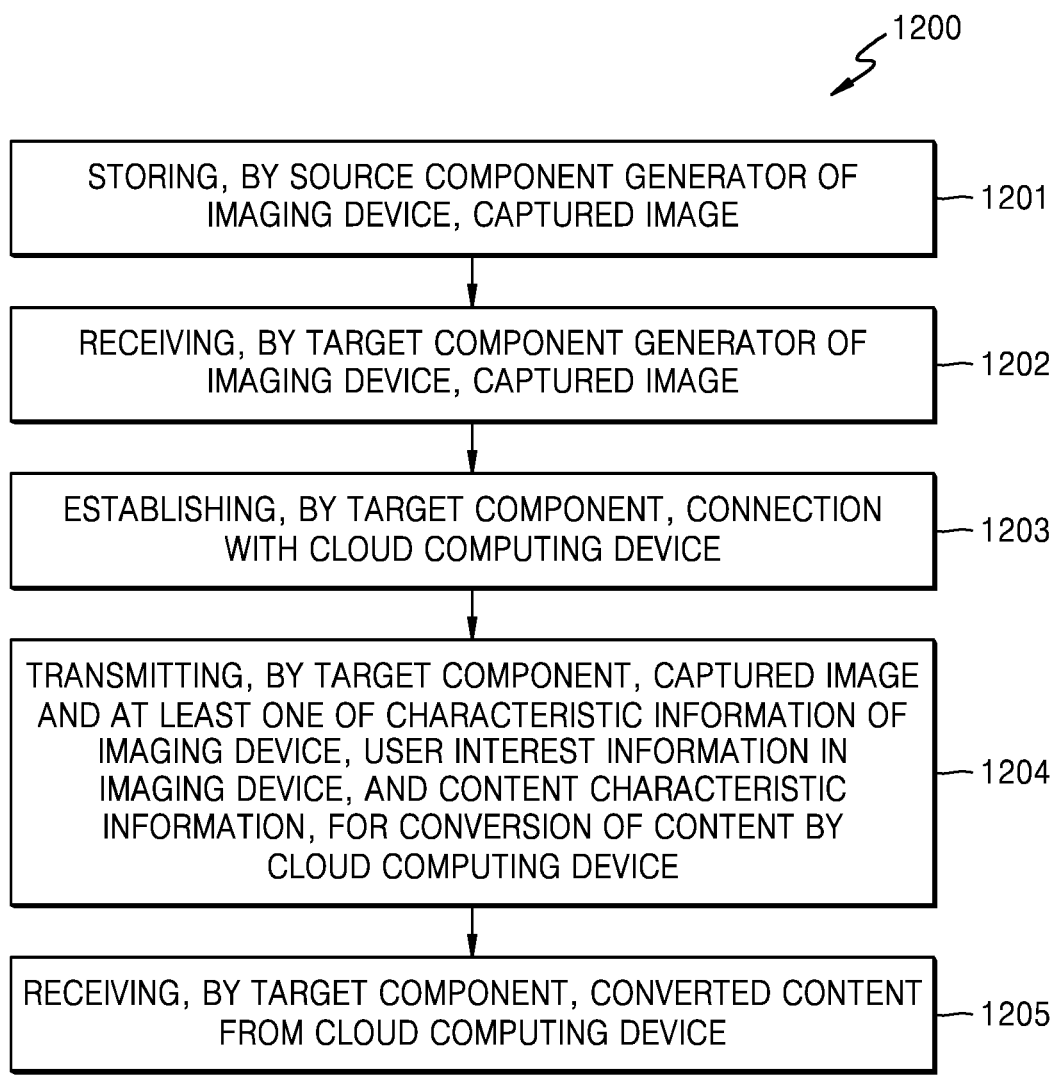
FIG. 12 is flowchart of a method of storing, by an imaging device, converted content, according to an exemplary embodiment.

FIG. 12 is flowchart of a method 1200 of storing, by a source component generator of an imaging device, converted content, according to an exemplary embodiment. In detail, the method 1200 according to an exemplary embodiment may be performed by a source component or a target component included in the imaging device. In detail, the method 1200 according to an exemplary embodiment may include: storing, by the source component generator of the imaging device, a captured image (operation 1201); receiving, by a target component generator, the captured image (operation 1202); establishing, by the target component, a connection with a cloud computing device (operation 1203); transmitting, by the target component to the cloud computing device, the captured image and at least one of characteristic information of the imaging device, user interest information in the imaging device, and content characteristic information, for conversion of the content based on the cloud computing device (operation 1204); and receiving, by the target component from the cloud computing device, the converted content (operation 1205).

According to another exemplary embodiment, the characteristic information of the imaging device may include at least one characteristic other than or in addition to display characteristic information of the imaging device.

According to another exemplary embodiment, the content characteristic information may include at least one characteristic other than or in addition to format information of the content.

Figure 13:
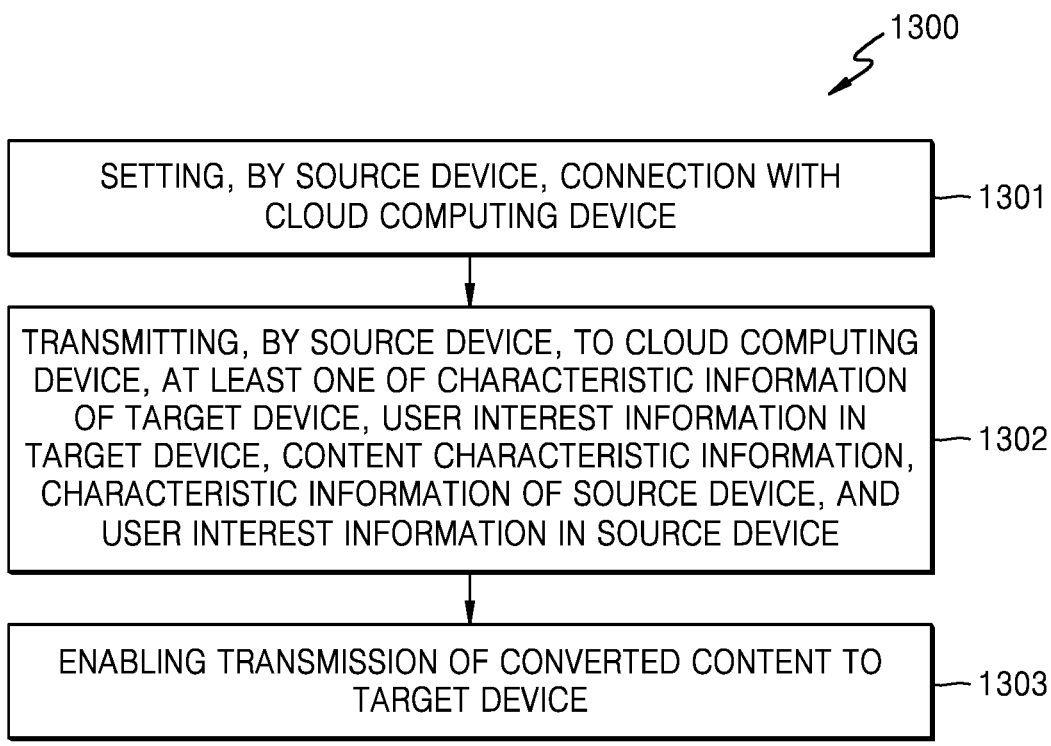
FIG. 13 is a flowchart of a method implemented by a source device for transmitting content after conversion to a target device by using an intermediate cloud computing device, according to an exemplary embodiment.

FIG. 13 is a flowchart of a method 1300 of transmitting enhanced/modified content from a source device to a target device after content is enhanced and/or modified based on a cloud computing device, according to an exemplary embodiment. The method 1300 according to an exemplary embodiment may include: establishing, by the source device, a connection with the cloud computing device (operation 1301); transmitting, by the source device, to the cloud computing device at least one piece of characteristic information (operation 1302); and enabling transmission of converted content to the target device (operation 1303).

The at least one piece of characteristic information according to an exemplary embodiment may include characteristic information of the target device, user interest information in the target device, content characteristic information, characteristic information of the source device, and user interest information in the source device.

The characteristic information of the target device may include at least one characteristic other than or in addition to display characteristic information of the target device or the content characteristic information may include at least one characteristic other than or in addition to resolution information or format information of the content.

Figure 14:
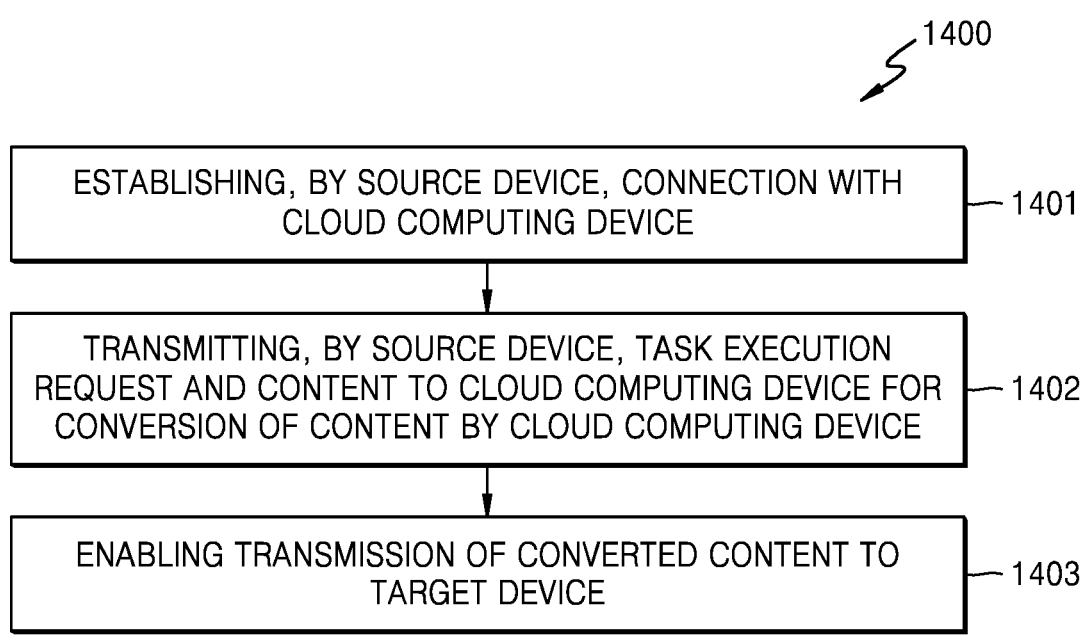
FIG. 14 is a flowchart of a method implemented by a source device for transmitting content after conversion to a target device by using an intermediate cloud computing device, according to another exemplary embodiment.

FIG. 14 is a flowchart of a method 1400 of transmitting content enhanced or modified by a cloud computing device from a source device to a target device, according to an exemplary embodiment. The method 1400 according to an exemplary embodiment includes: establishing, by the source device, a connection with the cloud computing device (operation 1401); transmitting, by the source device, a task execution request and the content to the cloud computing device (operation 1402); and enabling transmission of the converted content to the target device (operation 1403).

According to an exemplary embodiment, the cloud computing device may convert the content as the source device transmits the task execution request and the content to the cloud computing device.

The task execution request may be generated based on at least one of characteristic information of the target device, user interest information in the target device, content characteristic information, characteristic information of the source device, and user interest information in the source device. The characteristic information of the target device may include at least one characteristic other than or in addition to display characteristic information of the target device or the content characteristic information may include at least one characteristic other than or in addition to resolution information or format information of the content.

Figure 15:
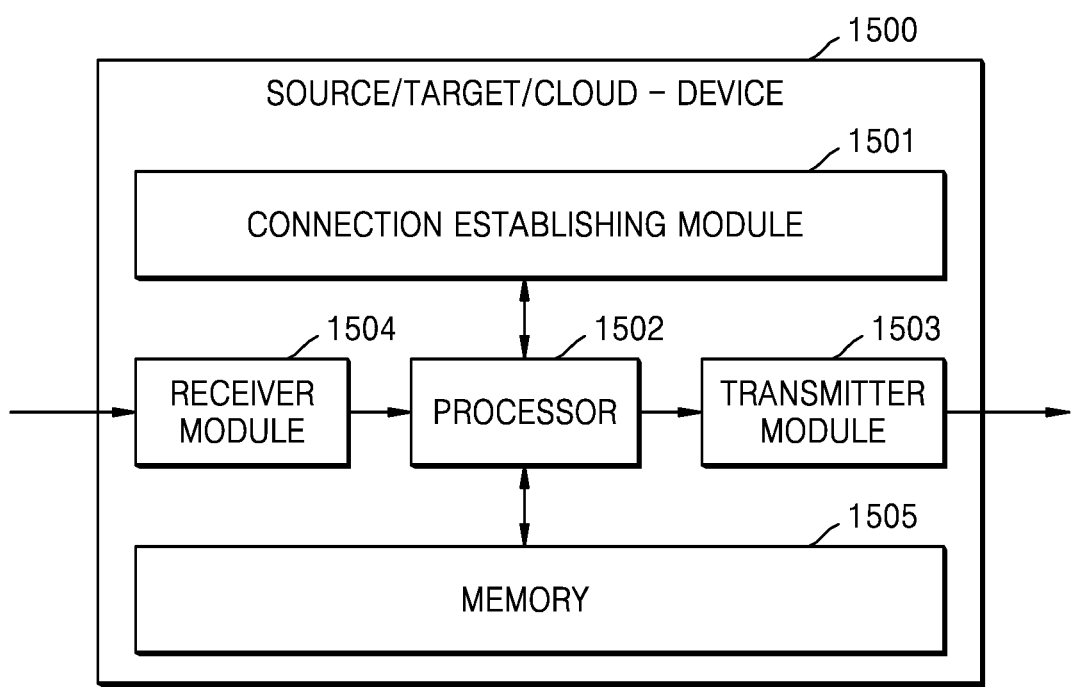
FIG. 15 is a block diagram of a cloud/source/target device for conversion of content, according to an exemplary embodiment.

FIG. 15 is a block diagram of a computing device 1500, according to an exemplary embodiment. The computing device 1500 according to an exemplary embodiment may operate as a source device, a target device, or cloud based computing device. The computing device 1500 may include a connection establishing module 1501, a processor 1502, a transmitter module 1503, a receiver module 1504, and a memory 1505 for storing information. A "module" as used herein may refer to a hardware element, a software element, or an element comprising both a hardware element and a software element.

According to an exemplary embodiment, the computing device 1500 may operate as a source device for converting content. Such a computing device 1500 according to an exemplary embodiment may include the connection establishing module 1501 for establishing a connection with a cloud computing device, and the processor 1502 for transmitting content and at least one of characteristic information of a target device, user interest information in the target device, content characteristic information, characteristic information of a source device, and user interest information in the source device to the target device.

According to an exemplary embodiment, the computing device 1500 for enhancement or modification of content may include: the connection establishing module 1501 for establishing a connection with a cloud computing device; and the processor 1502 for generating a task execution request based on at least one of characteristic information of a target device, user interest information in the target device, content characteristic information, characteristic information of a source device, and user interest information in the source device; and the transmitter module 1503 for transmitting the task execution request and the content to the cloud computing device and transmitting converted content to the target device.

According to an exemplary embodiment, the computing device 1500 for enhancement or modification of a content may include: the connection establishing module 1501 for establishing a connection with a cloud computing device; the transmitter module 1503 for transferring, to the cloud computing device, at least one of characteristic information of a target device, user interest information in the target device, content characteristic information, characteristic information of a source device, and user interest information in the source device; and the receiver module 1504 for receiving, from the cloud computing device, converted content.

The characteristic information of the target device may include at least one characteristic other than or in addition to display characteristic information of the target device, or the content characteristic information may include at least one characteristic other than or in addition to resolution information or format information of the content.

According to an exemplary embodiment, the computing device 1500 for enhancement or modification of content may include: the connection establishing module 1501 for establishing a connection with a cloud computing device; the processor 1502 for generating a task execution request based on characteristic information of at least one of characteristic information of a target device, user interest information in the target device, content characteristic information, characteristic information of a source device, and user interest information in the source device; the transmitter module 1503 for transmitting the task execution request and the content to the cloud computing device; and the receiver module 1504 for receiving from the cloud computing device, converted content.

The characteristic information of the target device may include, as described above, at least one of the characteristic information of the target device, the user interest information in the target device, the content characteristic information, the characteristic information of the source device, and the user interest information in the source device.

The transmitter module 1503 according to an exemplary embodiment may transmit, to the cloud computing device, at least one of the characteristic information of the target device, the user interest information in the target device, the content characteristic information, the characteristic information of the source device, and the user interest information in the source device, for conversion of content based on the cloud computing device.

According to an exemplary embodiment, the target device 1500 may operate as a target device for conversion of content. Such a target device 1500 according to an exemplary embodiment may include: the connection establishing module 1501 for establishing a connection with a cloud computing device; the transmitter module 1503 for transferring at least one of characteristic information of a target device, user interest information in the target device, content characteristic information, characteristic information of a source device, and user interest information in the source device to the cloud computing device; and the receiver module 1504 for receiving converted content from the cloud computing device.

According to an exemplary embodiment, the computing device 1500 for conversion of content may include: the connection establishing module 1501 for establishing a connection with a cloud computing device; the processor 1502 for generating a task execution request based on characteristic information; the transmitter module 1503 for transmitting the task execution request and the content to the cloud computing device; and the receiver module 1504 for receiving converted content from the cloud computing device.

As described above, the characteristic information according to an exemplary embodiment may include at least one of characteristic information of a target device, user interest information in the target device, content characteristic information, characteristic information of a source device, and user interest information in the source device.

The characteristic information of the target device include at least one characteristic other than or in addition to display characteristic information of the target device or the content characteristic information include at least one characteristic other than or in addition to resolution information or format information of the content.

According to an exemplary embodiment, the computing device 1500 may operate as a cloud based computing device for conversion of content. Such a computing device 1500 may include: the connection establishing module 1501 for establishing a connection with a source device and/or a target device; the receiver module 1504 for receiving a task execution request and the content from the source device and/or the target device; the processor 1502 for performing at least one task on the content according to the task execution request to obtain converted content; and the transmitter module 1503 for transmitting the converted content to the source device and/or the target device.

As described above, the task execution request may be based on at least one of characteristic information of the target device, user interest information in the target device, content characteristic information, characteristic information of the source device, and user interest information in the source device. The characteristic information of the target device may include at least one characteristic other than or in addition to display characteristic information of the target device or the content characteristic information may include at least one characteristic other than or in addition to resolution information or format information of the content.

According to an exemplary embodiment, the computing device 1500 for conversion of content may include: the connection establishing module 1501 for establishing a connection with a source device and/or a target device; the receiver module 1504 for receiving at least one of characteristic information of the target device, user interest information in the target device, content characteristic information, characteristic information of the source device, and user interest information in the source device from the source device and/or the target device; the processor 1502 for generating a task execution list based on at least one of the characteristic information of the target device, the user interest information in the target device, the content characteristic information, the characteristic information of the source device, and the user interest information in the source device, wherein the characteristic information of the target device includes at least one characteristic other than or in addition to display characteristic information of the target device or the content characteristic information includes at least one characteristic other than or in addition to resolution information or format information of the content; the processor 1502 being further adapted to performing at least one task on the content according to the task execution list to obtain converted content; and the transmitter module 1503 for transmitting the converted content to the source device and/or the target device.

According to an exemplary embodiment, the computing device 1500 for conversion of content may include: the connection establishing module 1501 for establishing a connection with a source device; the connection establishing module 1501 being further adapted to establishing connection with a target device; the receiver module 1504 for receiving target device-related information, content characteristic information, and source device-related information; the processor 1502 for generating a task execution list based on the target device-related information, the content characteristic information, and the source device-related information and performing at least one task on the content according to the task execution list to obtain converted content; and the transmitter module 1503 for transmitting the converted content to the target device.

The target device-related information according to an exemplary embodiment may be received from the target device, and the content characteristic information and the source device-related information may be received from the source device.

The characteristic information of the target device may include at least one characteristic other than or in addition to display characteristic information of the target device or the content characteristic information may include at least one characteristic other than or in addition to resolution information or format information of the content.

According to an exemplary embodiment, the computing device 1500 for conversion of content may include: the receiver module 1504 for receiving a task execution request and content from an electronic device; the processor 1502 for performing at least one task on the content according to the task execution request; and the transmitter module 1503 for transmitting converted content to the electronic device.

As described above, the task execution request may be based on at least one piece of characteristic information of the electronic device, wherein the characteristic information of the electronic device may include at least one piece of characteristic information as well as display characteristic information of the electronic device, content characteristic information, resolution information, or format information of the content. Hereinafter, above details may be commonly used in operations based on an electronic device.

According to an exemplary embodiment, the computing device 1500 for conversion of content may include: the receiver module 1504 for receiving at least one of characteristic information of the electronic device, user interest information in the electronic device, and content characteristic information; the processor 1502 for preparing a task execution list based on at least one of the characteristic information of the electronic device, the user interest information in the electronic device and the content characteristic information and performing at least one task on content according to the task execution list to obtain converted content; and the transmitter module 1503 for transmitting the converted content to the electronic device.

Figure 16:
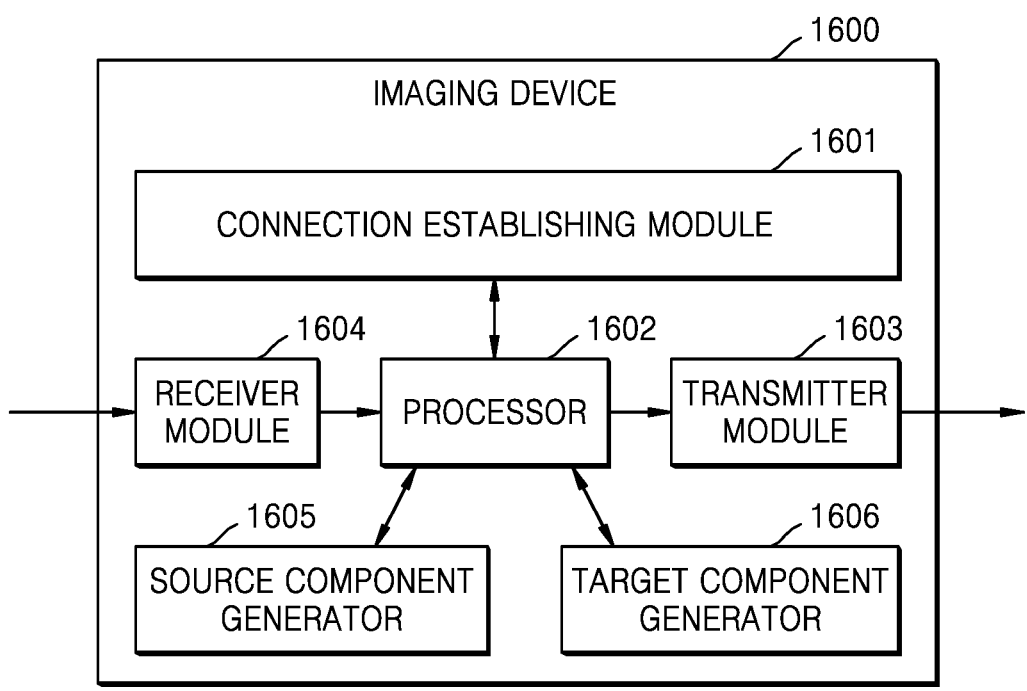
FIG. 16 is a block diagram of an imaging device according to an exemplary embodiment.

FIG. 16 is a block diagram of an imaging device 1600 for storing enhanced or modified content, according to an exemplary embodiment. The imaging device 1600 according to an exemplary embodiment may include: a source component generator 1605 for storing a captured image; a target component generator 1606, wherein a target component may be in operational interconnection with a source device for receiving the captured image; the target component including: a connection establishing module 1601 for establishing a connection between a cloud computing device and the target component; a transmitter module 1603 for transmitting the captured image and at least one of characteristic information of the imaging device, user interest information in the imaging device, and content characteristic information to the cloud computing device for conversion of the content by the cloud computing device, wherein the characteristic information of the imaging device includes at least one characteristic other than or in addition to display characteristic information or content characteristic information includes at least one characteristic other than or in addition to resolution information or format information of the content; and a receiver module 1604 for receiving the converted content from the cloud computing device.

According to an exemplary embodiment, the transmitter module 1603 and the receiver module 1604 are classified according to functions, and thus one communication module may perform receiving or transmitting operation.

According to another exemplary embodiment, the imaging device 1600 may further include a processor 1602 for performing various operations of the imaging device 1600.

In detail, the processor 1602 included in the imaging device 1600 may perform operations similar to the processor 1502 of FIG. 15.

Figure 17:
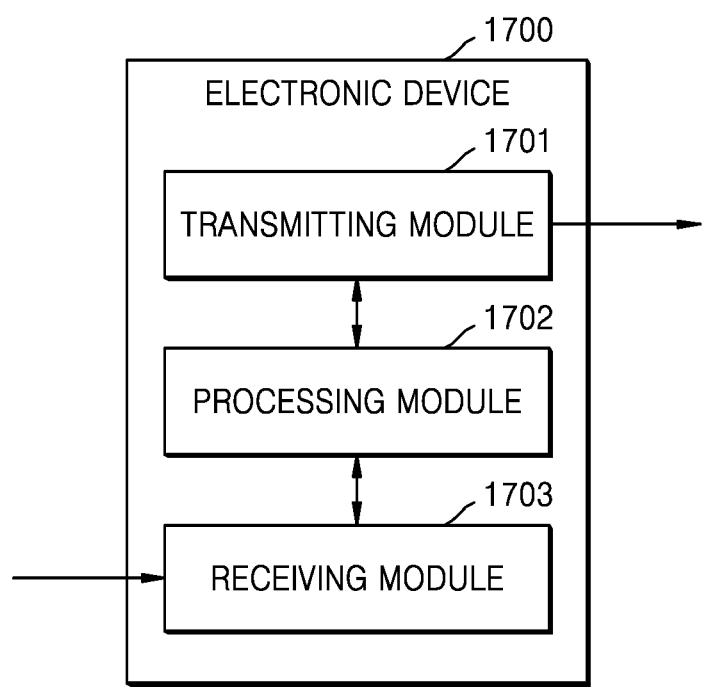
FIG. 17 is a block diagram of an electronic device according to an exemplary embodiment.

FIG. 17 is a block diagram of an electronic device 1700 for receiving converted content from a cloud computing device, according to an exemplary embodiment. The electronic device 1700 according to an exemplary embodiment may include a transmitter module 1701, a processing module 1702, and a receiving module 1703.

In detail, the electronic device 1700 according to an exemplary embodiment may include the transmitting module 1701 for transmitting to the cloud computing device, content and at least one of characteristic information of an electronic device and user interest information in the electronic device, wherein the characteristic information of the electronic device includes at least one characteristic other than or in addition to display characteristic information or the content characteristic information includes at least one characteristic other than or in addition to resolution information or format information of the content; and the receiving module 1703 for receiving enhanced or modified content from the cloud computing device.

According to an exemplary embodiment, the transmitting module 1701 and the receiving module 1703 are classified according to functions, and one communication module may perform a receiving or transmitting operation.

According to another exemplary embodiment, the electronic device 1700 may further include the processing module 1702 for performing various operations of the electronic device 1700.

In detail, the processing module 1702 according to another exemplary embodiment may perform operations similar to the processors 1502 or 1602 described above.

According to an exemplary embodiment, the electronic device 1700 for receiving converted content from a cloud computing device may include: the transmitting module 1701 for transmitting to the cloud computing device content and a task execution request; and the receiving module 1703 for receiving converted content from the cloud computing device.

According to an exemplary embodiment, the task execution request is based on at least one of characteristic information of the electronic device, user interest information in the electronic device, and content characteristic information, wherein the characteristic information of the electronic device include at least one characteristic other than or in addition to display characteristic information, or the content characteristic information includes at least one characteristic other than or in addition to format information or resolution information of the content.

According to another exemplary embodiment, the electronic device 1700 may further include the processing module 1702 for performing various operations of the electronic device 1700.

In detail, the processing module 1702 according to another exemplary embodiment may perform operations similar to the processors 1502 or 1602 of FIG. 15 or 16.

Figure 18:
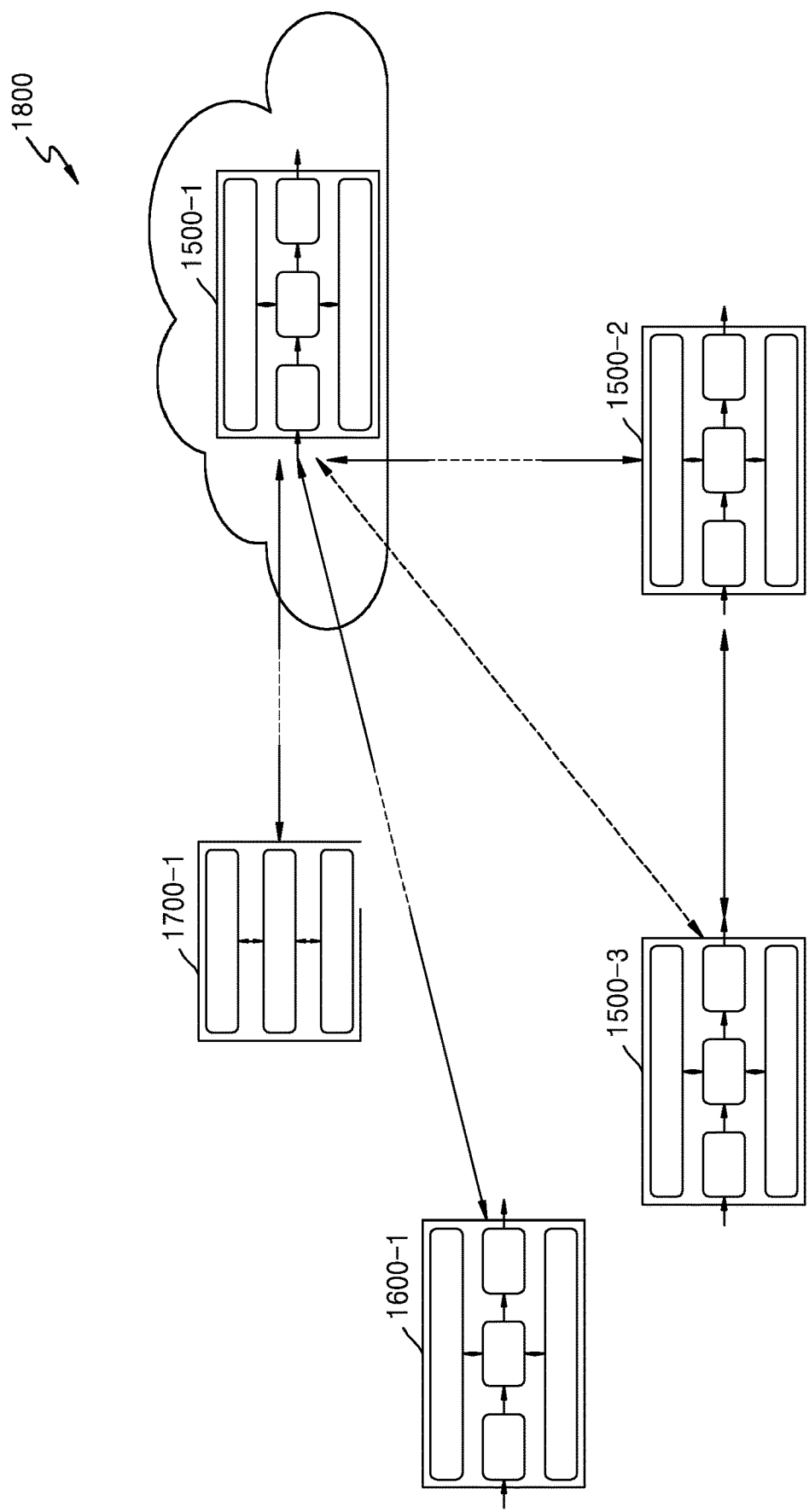
FIG. 18 is a diagram of a network environment of interconnected devices according to an exemplary embodiment.

FIG. 18 is a diagram of a network environment 1800 according to an exemplary embodiment.

The network environment 1800 of interconnected devices may include at least one cloud computing device 1500-1 and at least one target device 1500-2, a source device 1500-3, an imaging device 1600-1, an electronic device 1700-1, etc. In one example, content conversion at the cloud computing device 1500-1 may be offered as a paid service, thus requiring a user to make necessary payment to enjoy converted content.

In a first exemplary scenario, the target device 1500-2 may request the source device 1500-3 to transmit (or provide) content. Alternatively, the source device 1500-3 may transmit the content to the target device 1500-2 voluntarily or upon a user action. The target device 1500-2 may receive the content from the source device 1500-3. Thereafter, the target device 1500-2 may transmit the content and related information to the cloud computing device 1500-1. Here, the related information may be user interest information in source and target devices, content characteristic information, system and display characteristic information of source and target devices. In other words, the related information may be included in the characteristic information described above. In response, the cloud computing device 1500-1 may transmit (or provide) converted content to the target device 1500-2.

In a second exemplary scenario, the target device 1500-2 may request the source device 1500-3 to transmit (or provide) content. Alternatively, the source device 1500-3 may transmit the content to the target device 1500-2 voluntarily or upon a user action. In both the cases, the target device 1500-2 may receive converted content from the source device 1500-3. Before transmitting the content, the source device 1500-3 may transmit the content and related information to the cloud computing device 1500-1. Here, the related information may be user interest information in source and target devices, content characteristic information, system and display characteristic information of source and target devices. In response, the cloud computing device 1500-1 may transmit (or provide) converted content to the source device 1500-3.

In a third exemplary scenario, the target device 1500-2 may request the source device 1500-3 to transmit (or provide) content. Alternatively, the source device 1500-3 may transmit the content to the target device 1500-2 voluntarily or upon a user action. For this purpose, the source device 1500-3 may transmit original content and related information to the cloud computing device 1500-1. Here, the related information may be user interest information in source and target devices, content characteristic information, system and display characteristic information of source and target devices. In response, the cloud computing device 1500-1 may directly transmit (or provide) converted content to the target device 1500-2.

In a fourth exemplary scenario, the imaging device 1600-1 or the electronic device 1700-1 may request the cloud computing device 1500-1 to convert content by providing the content and related information to the cloud computing device 1500-1. Here, related information may be user interest information in a device, content characteristic information, and system and/or display characteristic information of a device. In response, the cloud computing device 1500-1 may transmit (or provide) converted content to the imaging device 1600-1 or the electronic device 1700-1. In FIG. 18, the target device 1500-2 and the source device 1500-3 are shown as two different entities, which may mean that they may be different sub-components of a single entity. It is also possible that the single entity may function as the target device 1500-2 and as the source device 1500-3 at a different point of time. The imaging device 1600-1 and the electronic device 1700-1 are instances of such a single entity. Further, the source device 1500-3 may not be a part of the network environment 1800, i.e., the source device 1500-3 may communicate with the target device 1500-2, but may not with other devices in the network environment 1800.

According to another exemplary embodiment, the source device 1500-3 may be a part of the network environment 1800 and may have capability of directly communicating with the cloud computing device 1500-1. In such a case, the source device 1500-3 may transmit (or provide) content to the target device 1500-2 after conversion of content through the cloud computing device 1500-1. According to another exemplary embodiment, the cloud computing device 1500-1 may directly forward (or transmit) the content received from the source device 1500-1 to the target device 1500-2 after required conversion of the content.

One or more exemplary embodiments provide on-the-fly content conversion through the cloud while transferring content between source and target devices.

Figure 19:
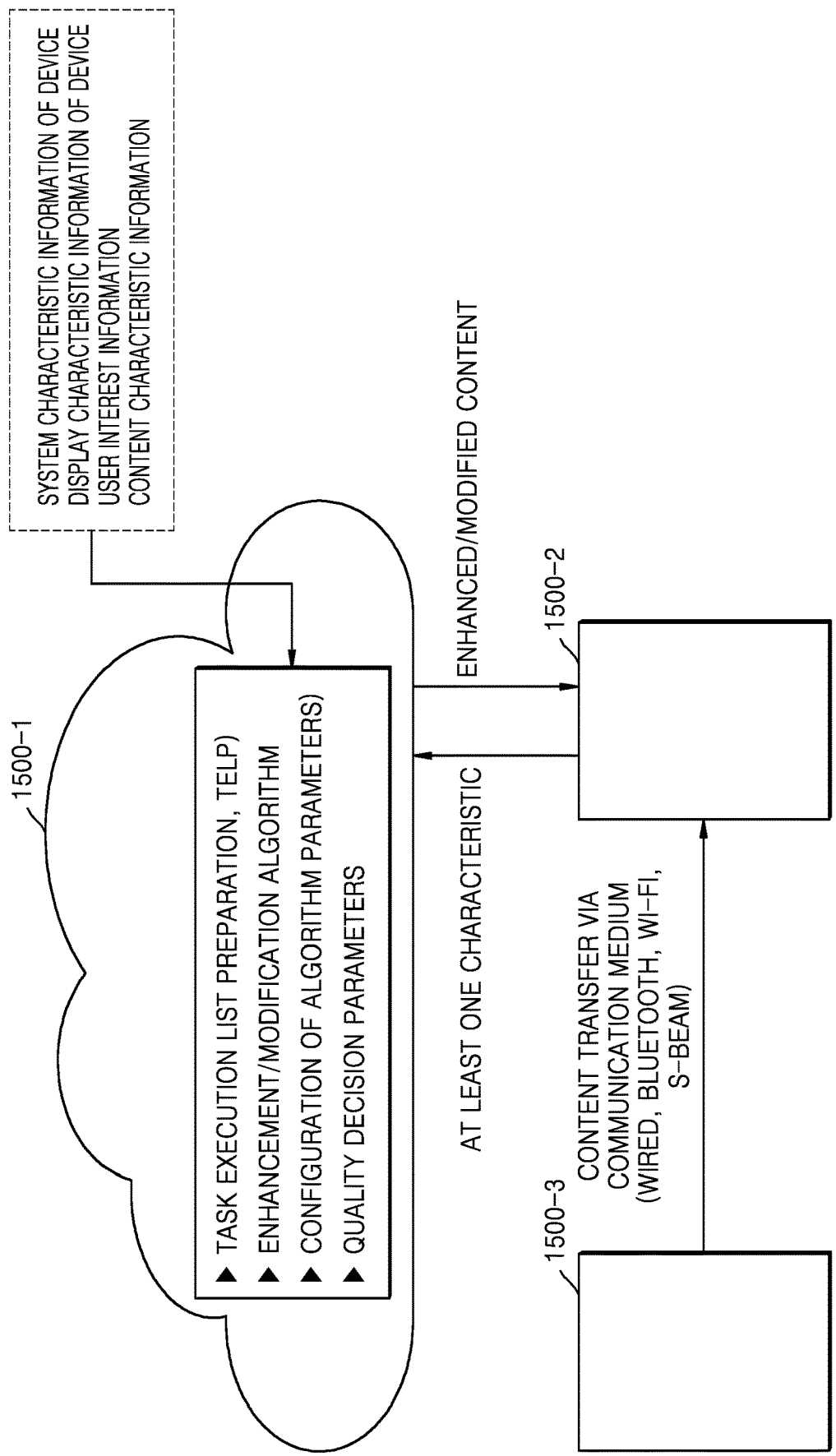
FIG. 19 is a diagram for describing on-the-fly content conversion through the cloud (or cloud device) while content is transferred between a source device and a target device, according to an exemplary embodiment.
Figure 20:
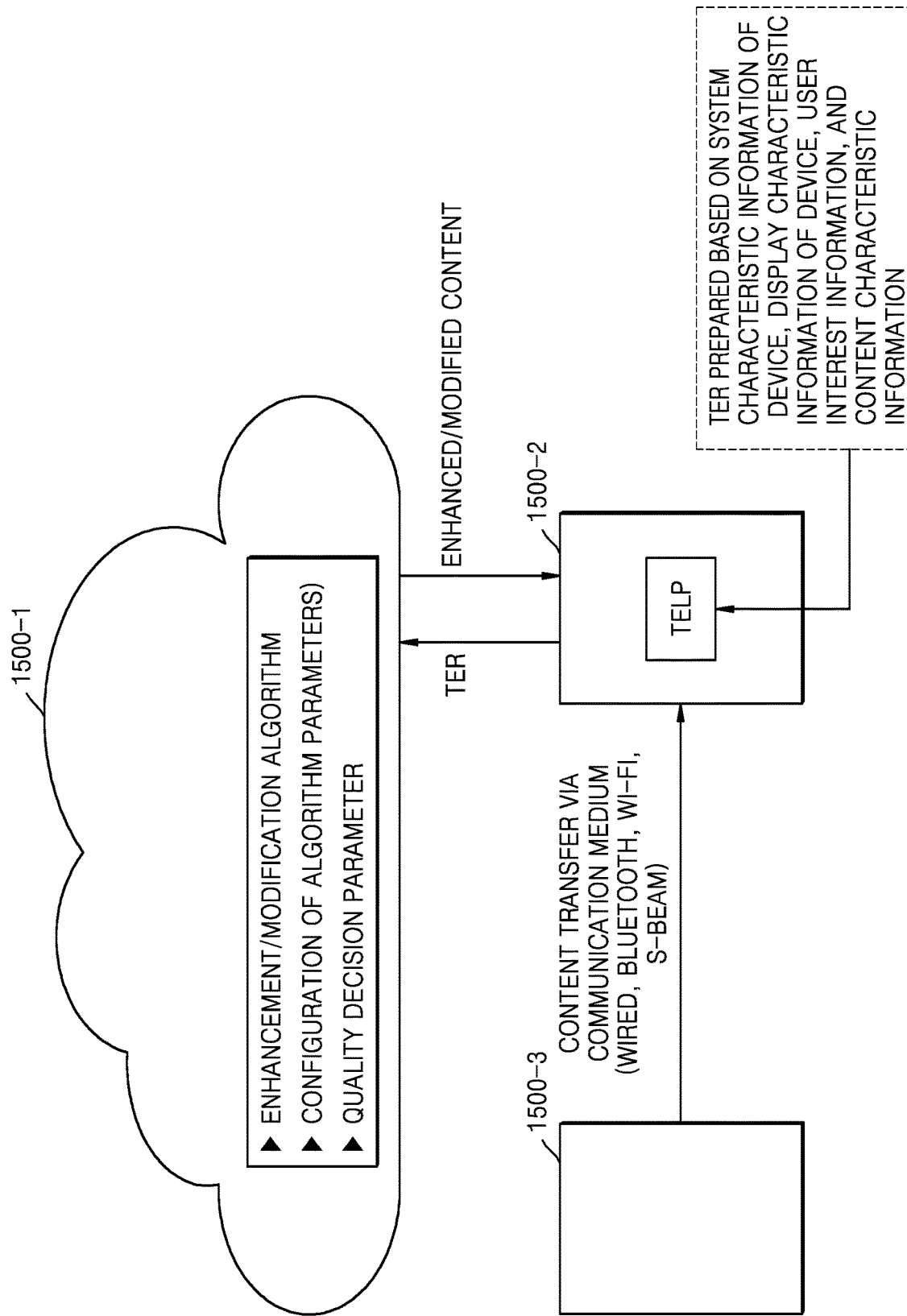
FIG. 20 is a diagram for describing on-the-fly content conversion through the cloud while content is transferred between a source device and a target device, according to another exemplary embodiment.

FIGS. 19 and 20 are diagrams for describing the network environment 1800 according to exemplary embodiments.

The cloud (or the cloud computing device 1500-1) of FIG. 19 according to an exemplary embodiment or a target system/entity or the target device 1500-2 of FIG. 20 according to an exemplary embodiment may decide conversion of content. According to user's selection, captured or stored content may be transmitted from a source system/entity or the source device 1500-3 to a target system/entity or the target device 1500-2. Here, the captured or stored content may be in an original version or in an interpolated version. A content quality converting method (or technique) according to an exemplary embodiment does not take into account a difference between characteristic information of source and target systems/entities or devices. Accordingly, conversion of content according to an exemplary embodiment may be decided by the cloud (the cloud computing device 1500-1), or the target system/entity or the target device 1500-2.

The cloud (or the cloud computing device 1500-1) according to an exemplary embodiment may have algorithms in which best content conversion results are updated frequently. According to an exemplary embodiment, characteristic information of a system/entity or device may include: (a) network heuristic information, such as availability of a network for a cloud connection and high bandwidth availability; (b) battery condition information, such as low battery and discharging; (c) network profile selection by a user of a target system/entity or device, such as online or offline; and (d) internet billing cycle information of a target system/entity or device, such as limited internet usage availability and data available for transfer over the internet. According to an exemplary embodiment, display characteristic information may include: (a) resolution information of source and target systems/entities or devices; (b) orientation information of target system/entity or device; and (c) multiview-related information.

The target device 1500-2 and the source device 1500-3 of FIG. 19 may operate as two arbitrary devices. Accordingly, while content is transferred between the source device 1500-3 and the target device 1500-2 according to an exemplary embodiment of FIG. 19, the content is converted on-the-fly based on the cloud computing device 1500-1. Here, the target device 1500-2 may decide the conversion. When the content is received from the target device 1500-2, the target device 1500-2 may prepare a task execution list (task execution list preparation (TELP)) based on characteristic information, and transmit the content and a task execution request (TER) to the cloud computing device 1500-1.

Based on the received TER, the cloud computing device 1500-1 may prepare an algorithm appropriate to content conversion. The cloud computing device 1500-1 may convert the content and transmit the converted content to the target device 1500-2. In a rest mode, i.e., when there is no preceding task to be executed by the target device 1500-2, the target device 1500-2 may store the content in a memory, and transmit the content and the TER to the cloud computing device 1500-1. In a no enhancement case, original content may be displayed and stored as default attributes in the target device 1500-2. According to an exemplary embodiment, characteristic information transmitting along with the content may be shared with the cloud computing device 1500-1.

The characteristic information according to an exemplary embodiment may include at least one of system characteristic information of a source or target device, display characteristic information, content characteristic information, user interest information in the source or target device, and a conversion mode.

In FIG. 20, the target device 1500-2 according to an exemplary embodiment may determine an enhancement mode based on an on-the-fly or rest mode according to system characteristic information. The cloud computing device 1500-1 may perform TELP based on characteristic information described above and an appropriate algorithm for content conversion. Various appropriate quality decision parameters, such as PSNR, SNR, SSIM, RMSE, NRCQA, and BRISQUE, are available on the cloud computing device 1500-1 to guarantee optimum content quality. Then, converted content may be transmitted to the target device 1500-2. According to an exemplary embodiment, at least one parameter related to the source device 1500-3 or the target device 1500-2 may be stored in the cloud computing device 1500-1 to save a bandwidth for re-connection during an initial connection. Here, the at least one parameter related to the source device 1500-3 or the target device 1500-2 may include a parameter shown in Table 2 above. Unless a parameter stored in the cloud computing device 1500-1 is changed, re-transmission of the stored parameter may not be necessary while establishing a re-connection. All decision parameters for content conversion may be used in the cloud computing device 1500-1 or the target device 1500-2, and may be ignored if a user selects a partial mode or an enhancement type mode. According to another exemplary embodiment, the at least one parameter related to the source device 1500-3 or the target device 1500-2 may include user location information (for example, an office, home, or a tourist spot). The user location information may be obtained from sensor information of a target device. An enhancement mode may be determined based on the at least one parameter related to the source device 1500-3 or the target device 1500-2. The target device 1500-2 and the source device 1500-3 of FIG. 30 may operate as two arbitrary devices. According to an exemplary embodiment, the cloud computing device 1500-1 may determine conversion of content. A content conversion algorithm stored in the cloud computing device 1500-1 may be used to transmit content from the source device 1500-3 to the target device 1500-2 via an arbitrary communication medium. Examples of the arbitrary communication medium may include wireless communication, Bluetooth, Wi-Fi, and S-beam. As shown in FIG. 20, after information transference between the source device 1500-3 and the target device 1500-2 is completed, the target device 1500-2 may transmit the content and characteristic information to cloud. The cloud computing device 1500-1 may perform TELP based on the characteristic information and a suitable algorithm for content conversion described above. Then, the cloud computing device 1500-1 may convert the content and transmit the converted content to the target device 1500-2. In a rest mode, i.e., when there is no preceding task to be performed by the target device 1500-2, the target device 1500-2 may store the content in a memory and transmit the characteristic information to the cloud computing device 1500-1. In a case where there is no enhancement of original content, i.e., when original content is transmitted, the original content may be displayed and/or stored using basic attributes.

Figure 21:
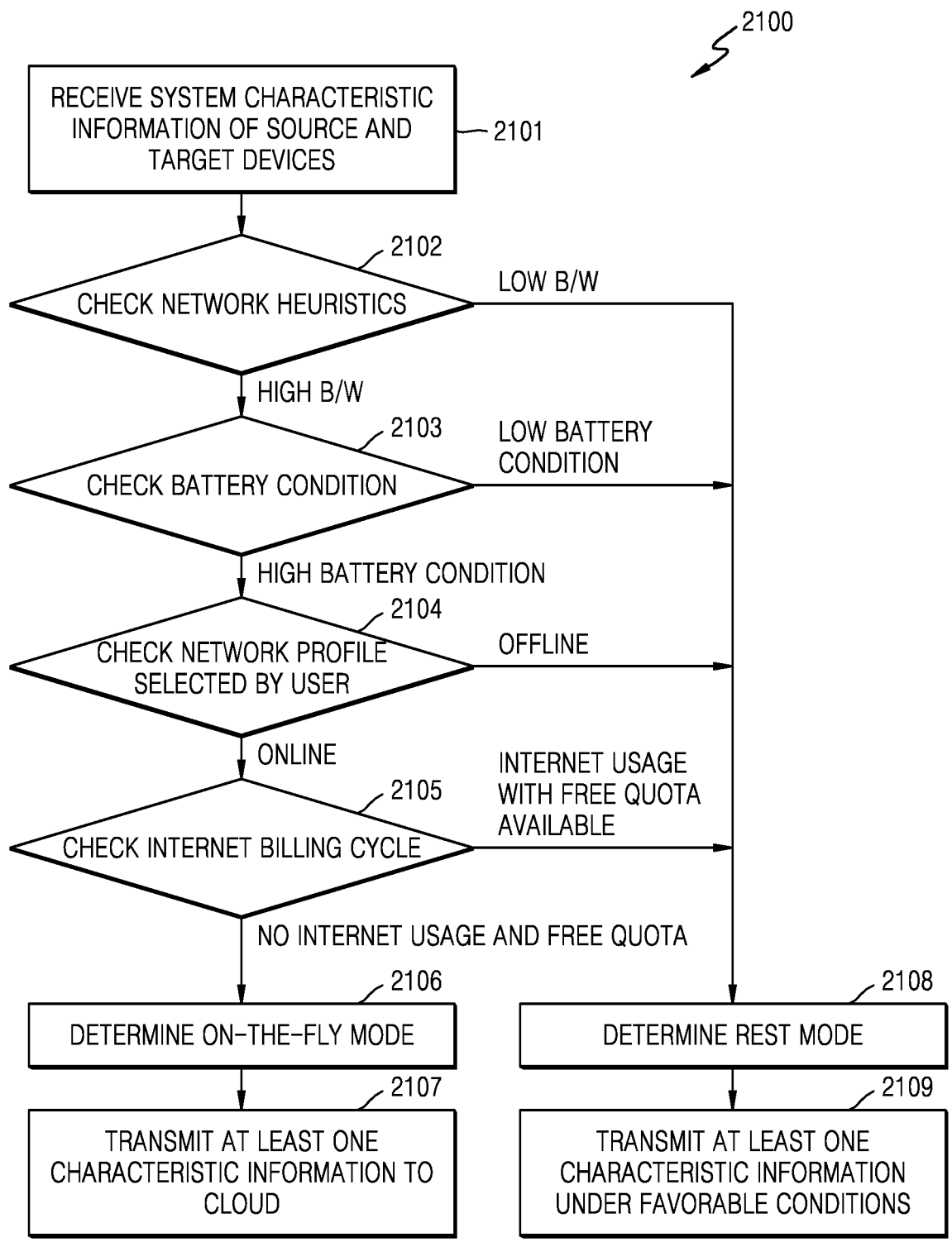
FIG. 21 is a flowchart of a method of selecting a mode of enhancement or modification based on system characteristic information of a device or a conversion decision, which is received from the cloud, according to an exemplary embodiment.

FIG. 21 is a flowchart of a method of selecting a mode of enhancement or modification based on system characteristic information of a device or a conversion decision, which is received from the cloud, according to an exemplary embodiment.

In operation 2101, the cloud computing device 1500-1 receives system characteristic information from the target device 1500-2 and the source device 1500-3. In operation 2102, the cloud computing device 1500-1 checks whether the network heuristics belong to high bandwidth (high B/W) or low bandwidth (low B/W). In operation 2103, the cloud computing device 1500-1 checks whether a battery condition is high or low. In operation 2104, the cloud computing device 1500-1 checks whether a network profile selected by a user is online or offline. In operation 2105, the cloud computing device 1500-1 checks an internet billing cycle, in detail, whether internet usage is a paid service or a free service.

In case of a high bandwidth, a high battery condition, an online network profile, and internet usage with free data transfer available; an on-the-fly mode may be determined for content conversion by the cloud computing device 1500-1 in operation 2106. Subsequently, in operation 2107, content along with display characteristic information of source and target devices, content characteristic information, and user interest information in the source and target devices are also transmitted to the cloud computing device 1500-1.

In case of a low bandwidth, a low battery condition, an offline network profile, and no internet usage and free data transfer being available; a rest mode may be determined for content conversion by the cloud computing device 1500-1 in operation 2108. Subsequently, in operation 2109, content along with display characteristic information of source and target devices, content characteristic information, user interest information in the source and target devices are also transmitted to the cloud computing device 1500-1 under favorable conditions, i.e., with a high bandwidth, a high battery condition, an online network profile, and internet usage with free data transfer available.

According to another exemplary embodiment, when the target device 1500-2 receives content, the target device 1500-2 may prepare a task execution list based on at least one of the display and/or system characteristic information of source and target devices, content characteristic information, or user interest information in the source or target devices and transmit a TER to the cloud computing device 1500-1 along with the content. The target device 1500-2 may determine an enhancement mode (an on-the-fly or rest mode) based on characteristic information of a device. The cloud computing device 1500-1 receives the TER and configures suitable algorithms for content conversion.

Figure 22:
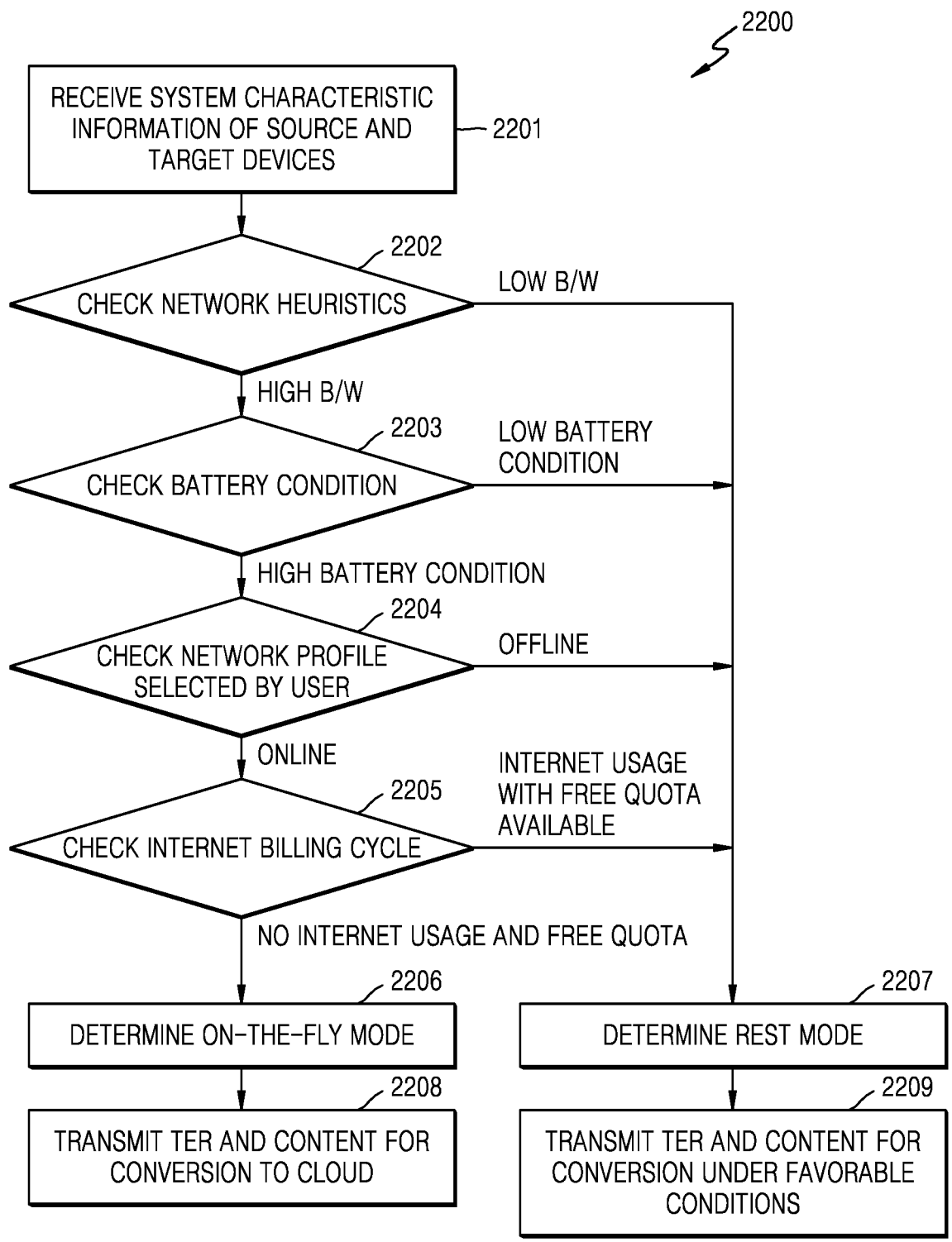
FIG. 22 is a flowchart of a method of selecting a mode of enhancement or modification based on system characteristic information of a device or a conversion decision, which is received from a target device, according to an exemplary embodiment.

FIG. 22 is a flowchart of a method of selecting a mode of enhancement or modification based on system characteristic information of a device or a conversion decision, which is received from a target device, according to an exemplary embodiment.

The method of FIG. 22 corresponds to the method of FIG. 21 except for operations 2208 and 2209. In operation 2208, the TER and the content to be converted are transmitted to the cloud computing device 1500-1. In operation 2209, the TER and the content to be converted are transmitted to the cloud computing device 1500-1 under favorable conditions Examples of the favorable conditions include a high bandwidth, a high battery condition, an online network profile, and internet usage with free data transfer available. Thereafter, the converted content may be re-transmitted to the target device 1500-2. The above exemplary embodiments described above with reference to FIGS. 19 through 22 may be used for cloud based on-the-fly content conversion while transferring content via a communication medium, such as wired communication, Bluetooth, Wi-Fi, S-beam, etc. Additionally, the exemplary embodiments may be used for cloud-based conversion of camera captured images or web-based download. Additionally, the exemplary embodiments may be used for on-the-fly content conversion through cloud during screen mirroring.

Figure 23:
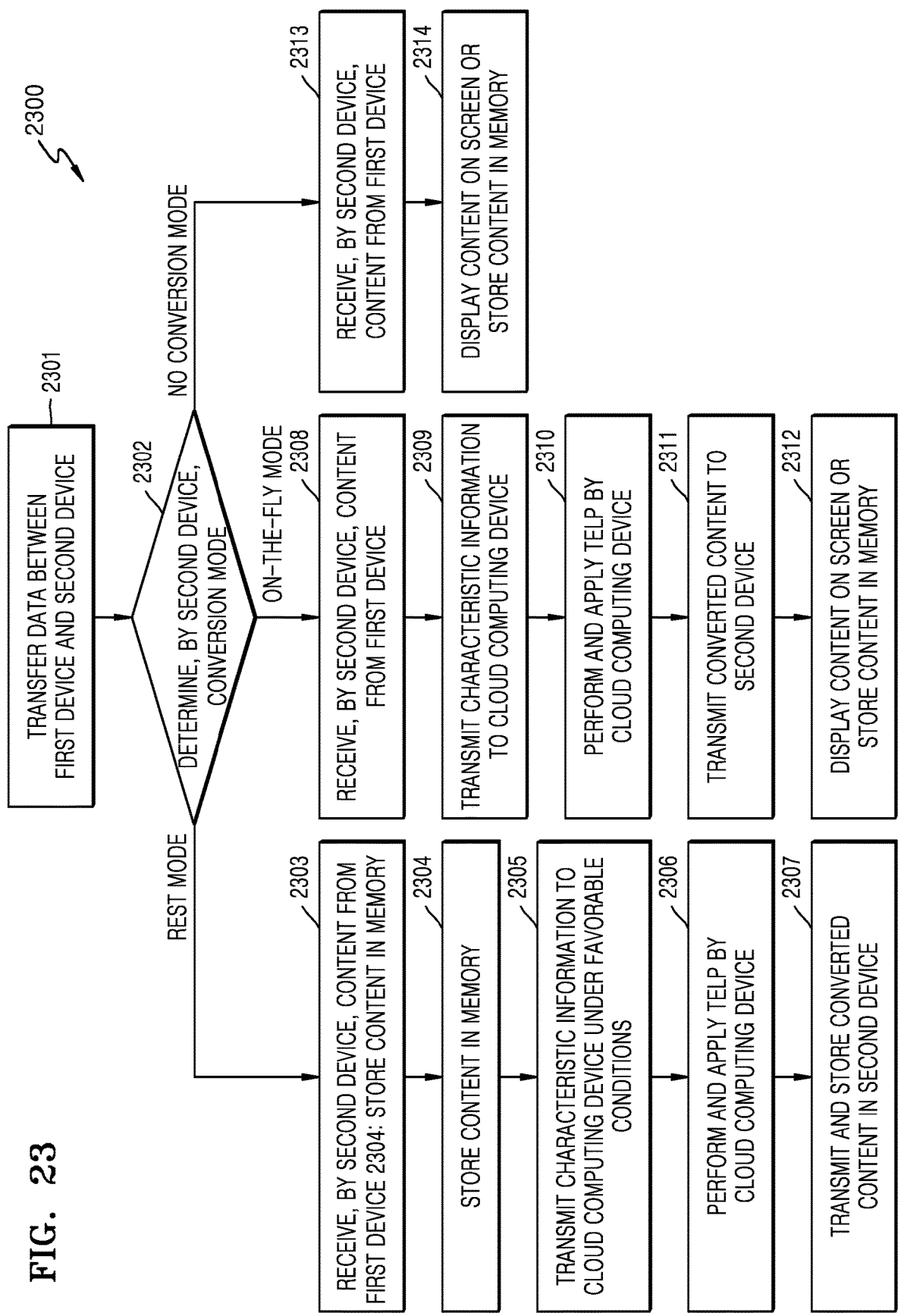
FIG. 23 is a flowchart of on-the-fly content conversion using the cloud while content is transferred between two devices.

FIG. 23 is a flowchart 2300 for describing various conversion modes available while content is transferred (handshake) between two arbitrary devices, according to an exemplary embodiment. In operation 2301, information transfer (handshaking) may be performed between a first device and a second device. In operation 2302, the second device may determine a conversion mode. When a rest mode is determined, operations 2303 through 2307 may be performed. When an on-the-fly mode is determined, operations 2308 through 2312 may be performed. When no conversion mode (no enhancement or modification mode) is determined, operations 2313 and 2314 may be performed.

In the rest mode, in operation 2303, the second device may receive content from the first device. In operation 2304, the second device may store the received content in a memory. In operation 2305, characteristic information along with the content to be converted may be transmitted to a cloud computing device under favorable conditions. In operation 2306, the cloud computing device performs TELP and accordingly applies quality conversion techniques on the content. Then, in operation 2307 the converted content is transmitted to the second device and stored in the memory.

In the on-the-fly mode, in operation 2308, the second device may receive content from the first device. In operation 2309, the first device may transmit characteristic information along with the content to be converted to the cloud computing device. In operation 2310, the cloud computing device may perform TELP and accordingly apply quality conversion techniques on the content. Then, in operation 2311 the converted content is transmitted to the second device. In operation 2312, the converted content may be displayed on the screen or stored in the memory.

In case of the no conversion mode, the second device may receive content from the first device in operation 2313 and either displays the content on screen or stored the content in memory in operation 2314.

Figure 24:
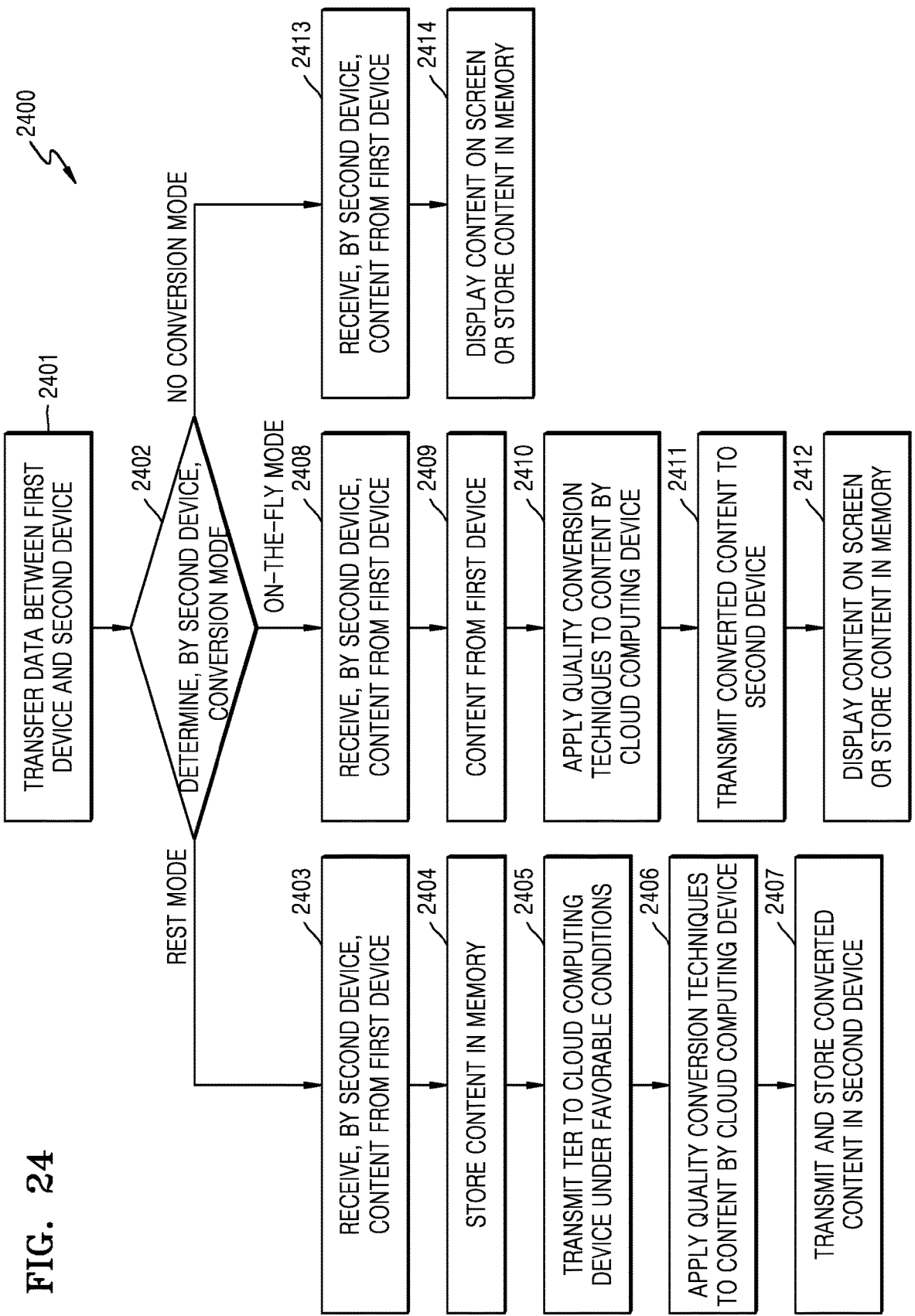
FIG. 24 is a flowchart for describing various conversion modes while content is transferred between two devices.

FIG. 24 is a flowchart 2400 for describing various conversion modes available while content is transferred between two devices, according to another exemplary embodiment. A second device may determine conversion of content. In operation 2401, information transfer (handshaking) may be performed between a first device and the second device. In operation 2402, the second device may determine a conversion mode. When a rest mode is determined, operations 2403 through 2407 may be performed.

When an on-the-fly mode is determined, operations 2408 through 2412 may be performed. When no conversion mode (no enhancement or modification mode) is determined, operations 2413 and 2414 may be performed.

In the rest mode, in operation 2403, the second device may receive content from the first device. In operation 2404, the second device may store the received content in a memory. In operation 2405, TER for a particular type of conversion required may be transmitted to the cloud computing device 1500-1 together with the content under favorable conditions. In operation 2406, the cloud computing device may apply quality conversion techniques on the content based on the TER. In operation 2407, the converted content is transmitted to the second device and stored in the memory.

In the on-the-fly mode, in operation 2408, the second device may receive content from the first device. In operation 2409, the first device may transmit the content and TER to the cloud computing device. In operation 2410, the cloud computing device may apply quality conversion techniques on the content. Then, in operation 2411 the converted content is transmitted to the second device. In operation 2412, the converted content may be displayed on the screen or stored in the memory.

In case of the no conversion mode, the second device may receive content from the first device in operation 2413 and either displays the content on screen or stores the content in memory in operation 2414.

Figure 25:
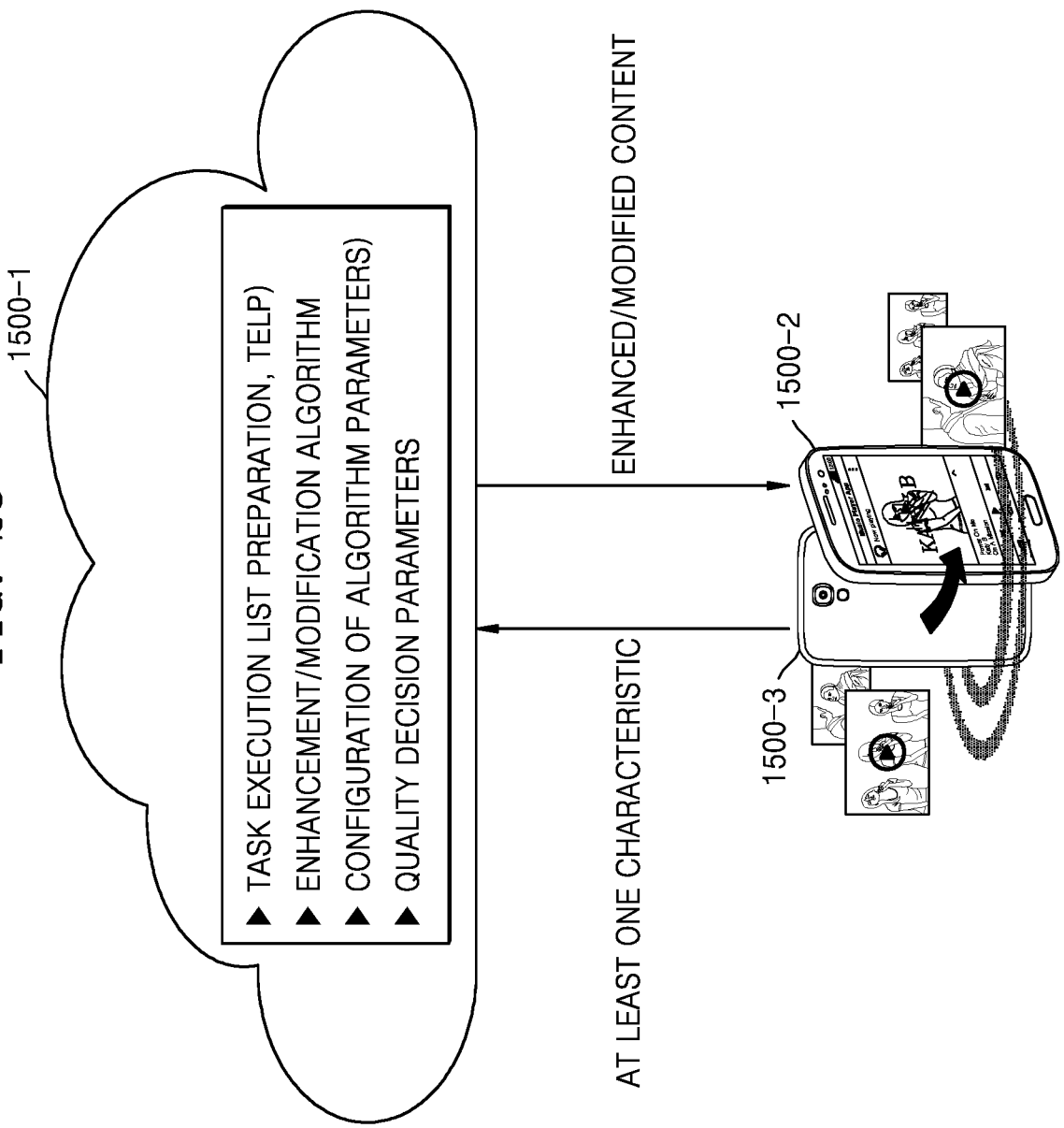
FIG. 25 is a diagram for describing content conversion through a cloud computing device during S-beam communication.

FIG. 25 is a diagram for describing content conversion through the cloud computing device 1500-1 during S-beam communication between the source device 1500-3 and the second device 1500-2, according to an exemplary embodiment. Here, the cloud computing device 1500-1 may determine conversion of content. Also, TELP may be performed by the cloud computing device 1500-1. S-beam according to an exemplary embodiment includes a concept of a near field communication for setting a Wi-Fi direct connection between a first device and a second device to transfer content. A function of the S-beam may result in a fast transfer speed between the first and second devices.

Figure 26:
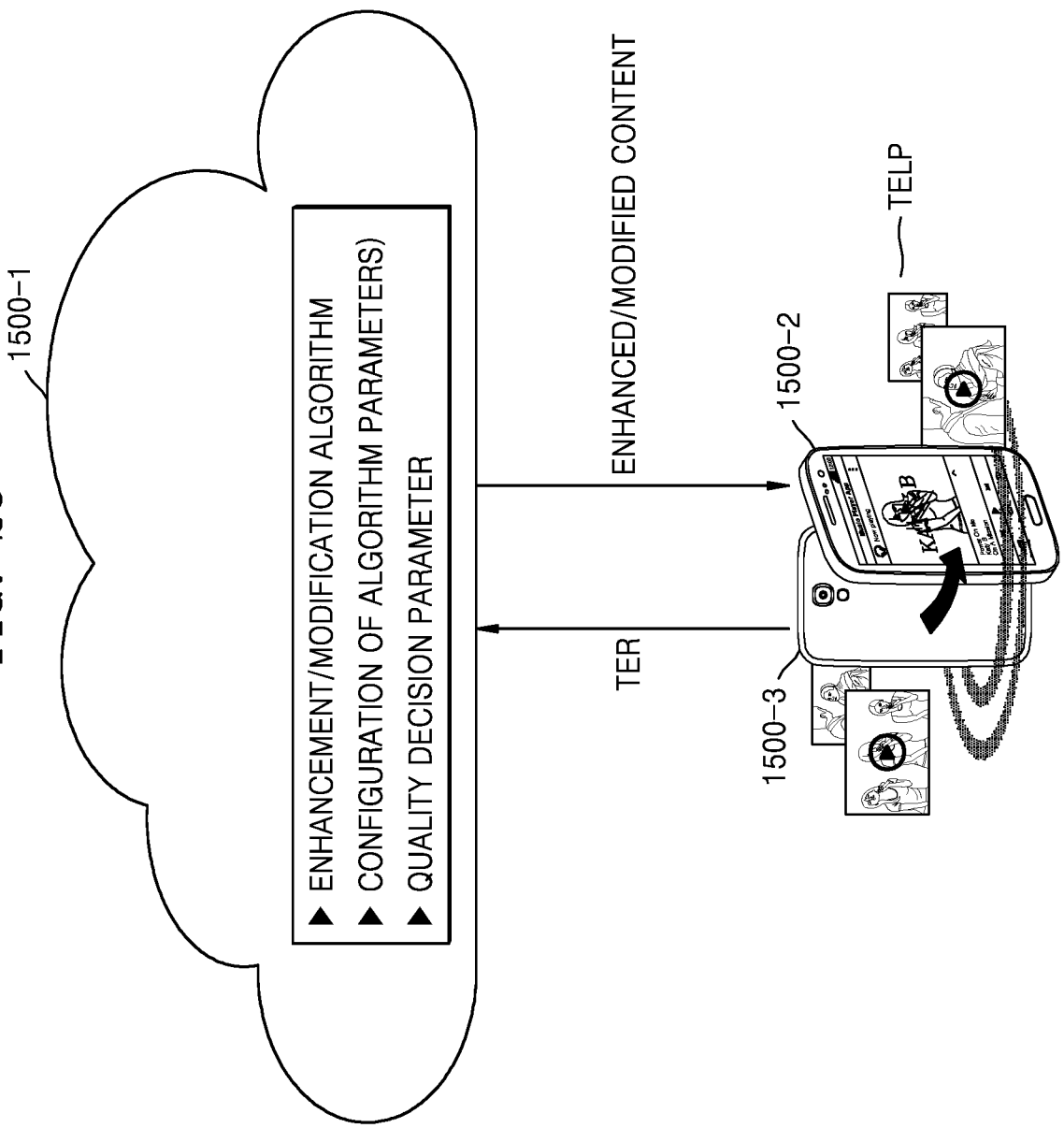
FIG. 26 is a diagram for describing content conversion through the cloud during S-beam communication, according to an exemplary embodiment.

FIG. 26 is a diagram for describing content conversion through the cloud computing device 1500-1 during S-beam communication between the source device 1500-3 and the target device 1500-2, according to another exemplary embodiment. Here, the target device 1500-2 may determine conversion of content. Also, TELP may be performed by the target device 1500-2.

Details of FIGS. 25 and 26 are the same as those of FIGS. 19 and 20 and FIGS. 23 and 24.

Figure 27:
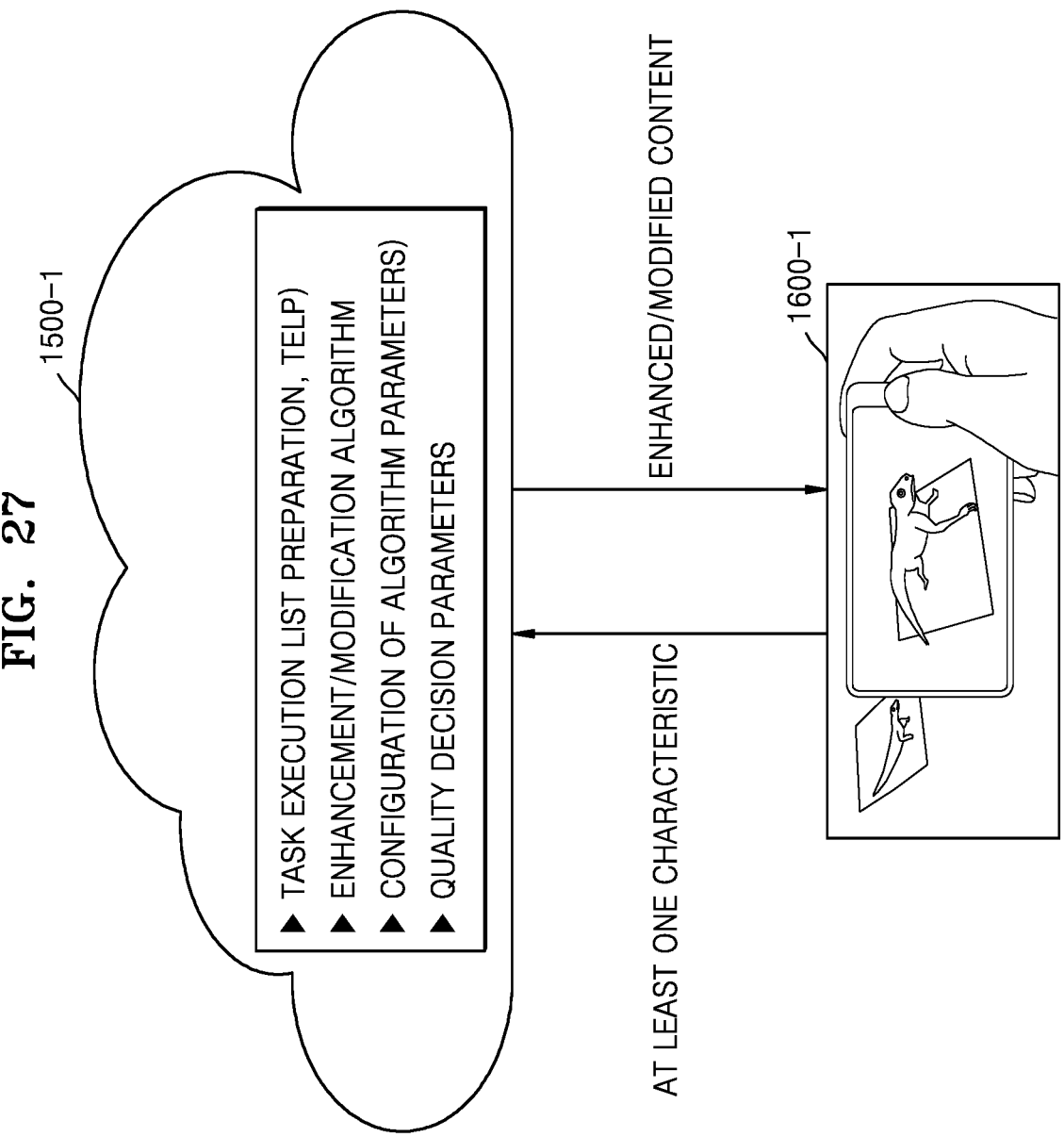
FIG. 27 is a diagram for describing conversion of camera-captured content using the cloud, according to an exemplary embodiment.

FIG. 27 is a diagram for describing conversion of camera-captured content using the cloud computing device 1500-1, according to an exemplary embodiment. According to an exemplary embodiment of FIG. 27, a user who uses a mobile/imaging device 1600-1 having low resolution may select, store, or reproduce an image or a video. In detail, quality of a selected or stored image or video may be enhanced using the cloud computing device 1500-1. In an on-the-fly mode, when the user selects, stores, or reproduces an image or a video, the selected or stored image or video is transmitted to the cloud computing device 1500-1, together with characteristic information. The cloud computing device 1500-1 may perform TELP based on the characteristic information, and may configure an appropriate algorithm for content conversion. Also, the cloud computing device 1500-1 may convert the content and transmit the converted content to the mobile/imaging device 1600-1. In a rest mode, the mobile/imaging device 1600-1 stores content in a memory, and transmits the content along with characteristic information to the cloud computing device 1500-1. In a no conversion mode, original content may be displayed and saved in default attributes.

When a user wants a particular theme, such as party mode or night mode, but the particular theme may not be available in a camera. In this case, to convert content according to the particular theme, the content according to the particular theme may be transmitted to the cloud computing device 1500-1.

Figure 28:
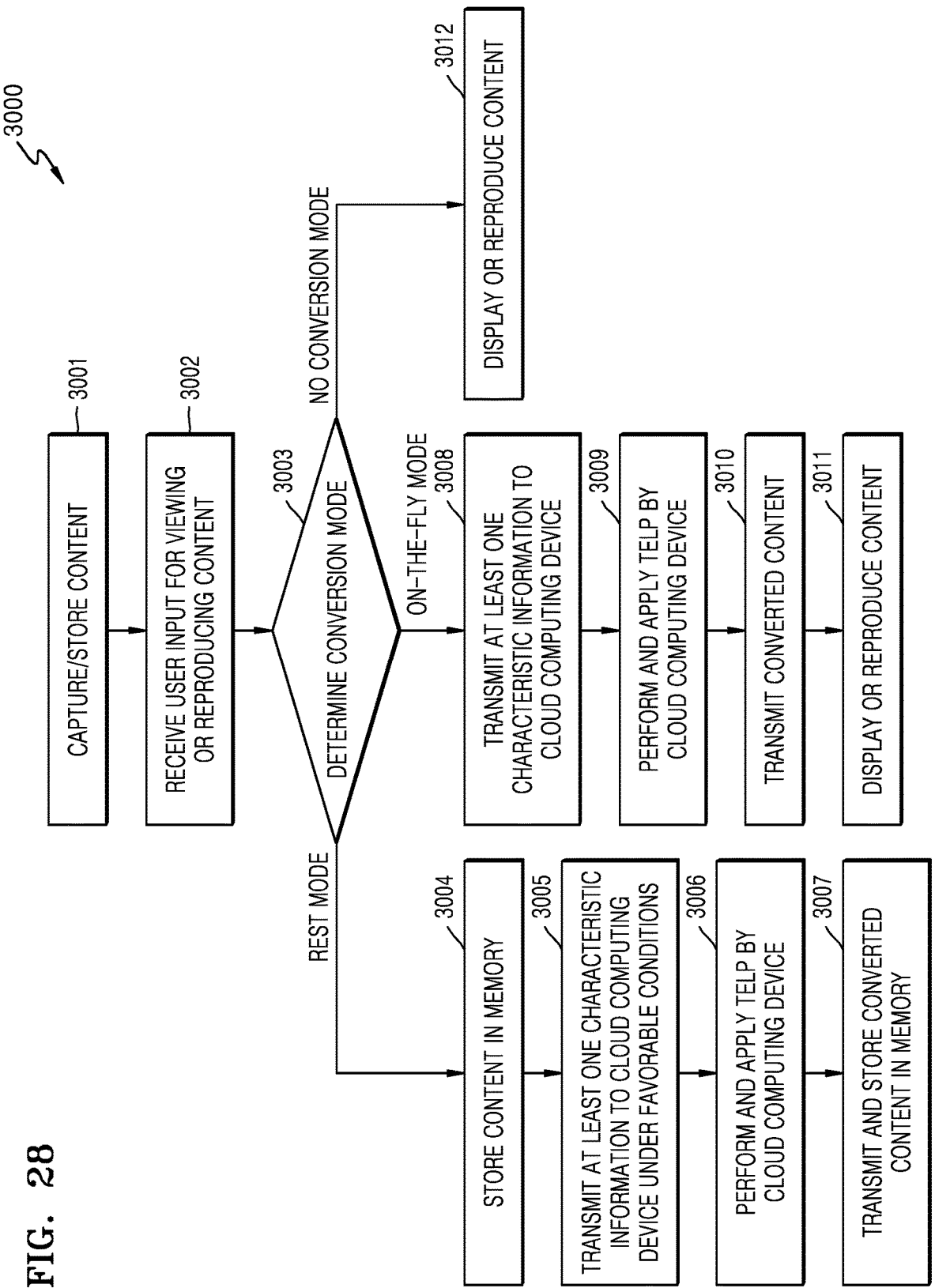
FIG. 28 is a flowchart for describing various conversion modes of content captured by an imaging device, according to an exemplary embodiment.

FIG. 28 is a flowchart 3000 for describing various conversion modes available while content is captured by a camera of the imaging device 1600-1 (for example, a low end mobile phone), according to an exemplary embodiment. The cloud computing device 1500-1 may determine conversion of content. In operation 3001, the imaging device 1600-1 may capture or store content, such as an image or video. In operation 3002, a user may select to view the image or reproduce the video. In operation 3003, the imaging device 1600-1 may determine a conversion mode. When a rest mode is determined, operations 3004 to 3007 may be performed. When an on-the-fly mode is determined, operations 3008 to 3011 may be performed. When no conversion mode (no enhancement or modification) is determined, operation 3012 may be performed.

In the rest mode, in operation 3004, the imaging device 1600-1 may store the content in a memory. In operation 3005, characteristic information may be transmitted along with the content to the cloud computing device 1500-1 under favorable conditions. In operation 3006, the cloud computing device 1500-1 may perform TELP and accordingly apply quality conversion techniques on the content. Then, in operation 3007, the converted content may be transmitted to the imaging device 1600-1 and stored in the memory.

The characteristic information according to an exemplary embodiment may include at least one of characteristic information of the imaging device 1600-1, content characteristic information, and user interest information in the imaging device 1600-1.

In the on-the fly mode, in operation 3008, the imaging device 1600-1 may transmit characteristic information along with the content to be converted to the cloud computing device 1500-1. In operation 3009, the cloud computing device 1500-1 may perform TELP and accordingly apply quality conversion techniques on the content. Then in operation 3010, the converted content may be transmitted to the imaging device 1600-1. In operation 3011, the converted content may be displayed on a screen or stored in the memory.

In no conversion mode, the imaging device 1600-1 may display or reproduce contents in operation 3012.

Figure 29:
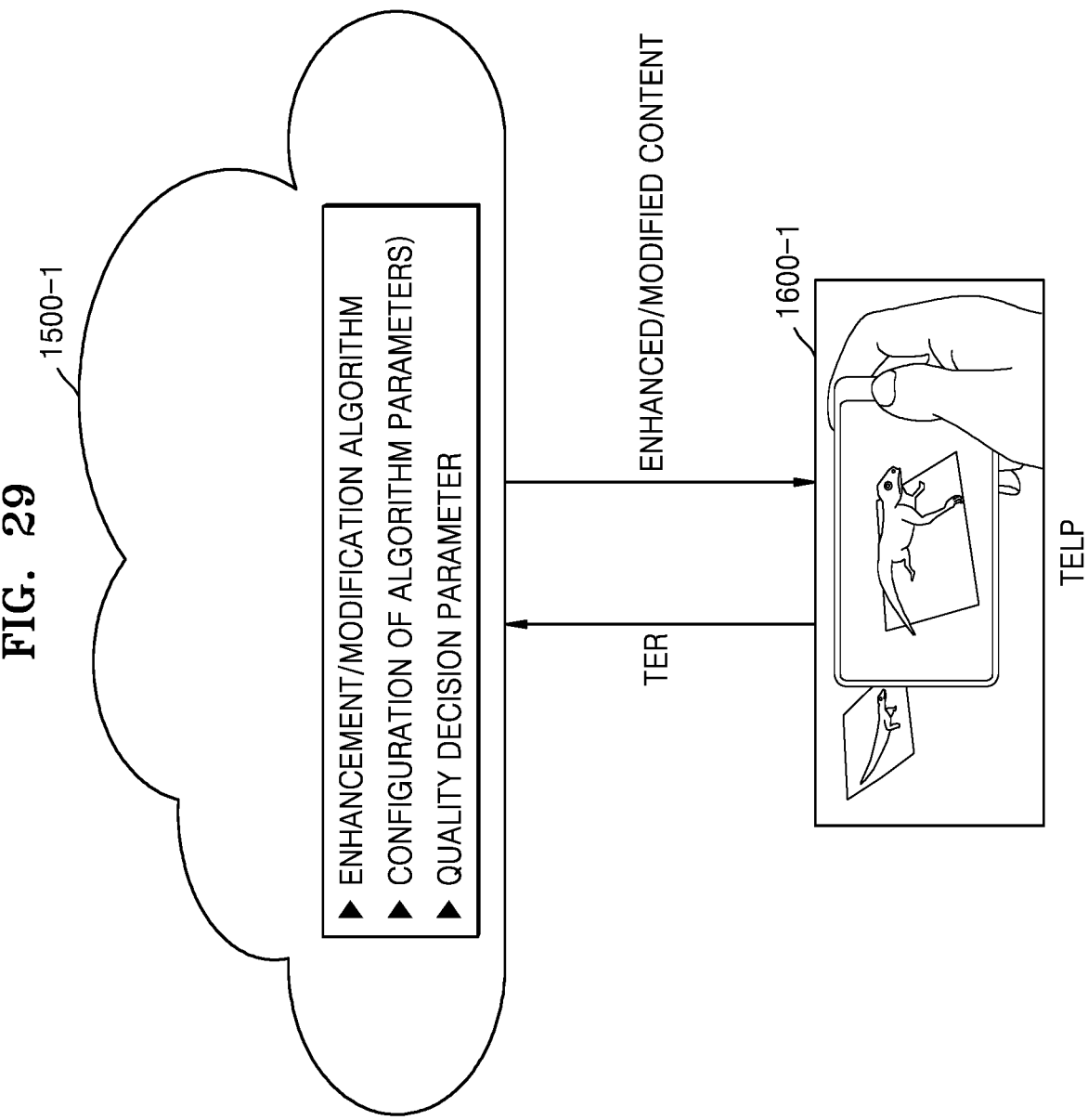
FIG. 29 is a diagram for describing conversion of camera-captured content using the cloud, according to another exemplary embodiment.

FIG. 29 is a diagram for describing conversion of camera-captured content using the cloud, according to another exemplary embodiment. The imaging device 1600-1 may determine conversion of content. When a user selects, stores, or reproduces content, such as an image or a video, the imaging device 1600-1 prepares a task execution list based on characteristic information, and transmits TER to the cloud computing device 1500-1 along with the content. Based on the received TER, the cloud computing device 1500-1 may configure suitable algorithms for content conversion. The cloud computing device 1500-1 then converts the content and transmits the converted content to the imaging device 1600-1. In a rest mode, the imaging device 1600-1 may store the content in a memory and transmit the content to the cloud computing device 1500-1 along with the TER when a camera is free from other priority tasks. In no conversion mode, original content may be displayed and stored in the imaging device 1600-1 as default attributes. When a user wants a particular theme, such as a party mode or a night mode, the camera may not support the particular theme. Here, to convert the content according to the particular theme, the content according to the particular theme may be transmitted to the cloud computing device 1500-1.

The characteristic information according to an exemplary embodiment may include at least one of characteristic information of the imaging device 1600-1, content characteristic information, and user interest information in the imaging device 1600-1.

Figure 30:
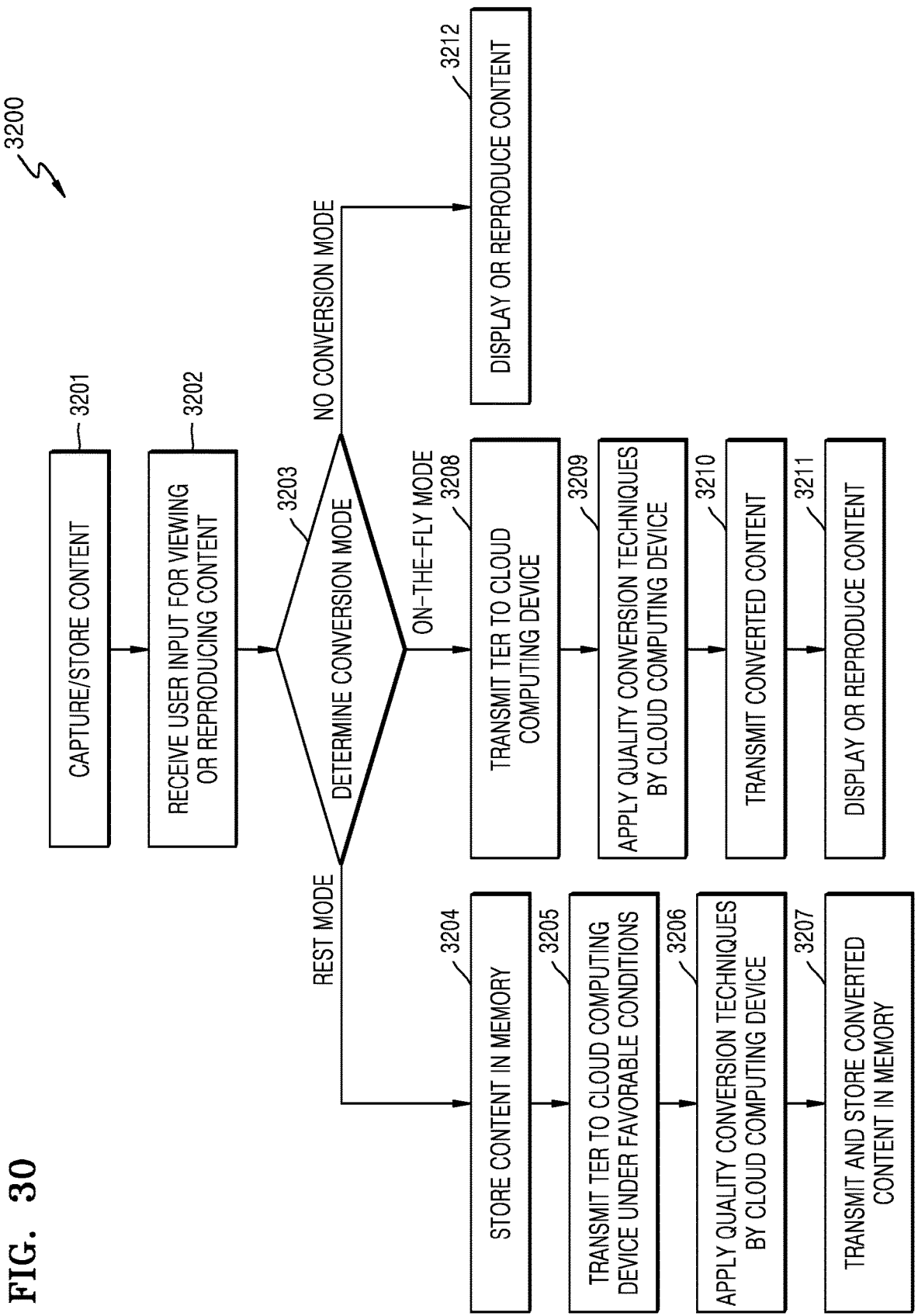
FIG. 30 is a flowchart for describing various conversion modes while content is captured by a mobile camera, according to an exemplary embodiment.

FIG. 30 is a flowchart 3200 for describing various conversion modes available while content is captured by a camera of the imaging device 1600-1 (for example, a low-end mobile phone), according to an exemplary embodiment. The imaging device 1600-1 may determine conversion of content. In operation 3201, the imaging device 1600-1 may capture or store content, such as an image or video. In operation 3202, a user may select to view the image or reproduce the video. In operation 3203, the imaging device 1600-1 may determine a conversion mode. When a rest mode is determined, operations 3204 to 3207 may be performed. When an on-the-fly mode is determined, operations 3208 to 3211 may be performed. When no conversion mode (no enhancement or modification) is determined, operation 3212 may be performed.

In the rest mode, in operation 3204, the imaging device 1600-1 may store the content in a memory. In operation 3205, TER may be transmitted together with content to be converted to the cloud computing device 1500-1 under favorable conditions. In operation 3206, the cloud computing device 1500-1 may apply quality conversion techniques on the content. Then, in operation 3207, the converted content may be transmitted to the imaging device 1600-1 and stored in the memory.

In the on-the fly mode, in operation 3208, the imaging device 1600-1 may transmit TER together with content to be converted to the cloud computing device 1500-1. In operation 3209, the cloud computing device 1500-1 may apply quality conversion techniques on the content. Then in operation 3210, the converted content may be transmitted to the imaging device 1600-1. In operation 3211, the converted content may be displayed on a screen or stored in the memory.

In no conversion mode, the imaging device 1600-1 may display or reproduce contents in operation 3212.

Figure 31:
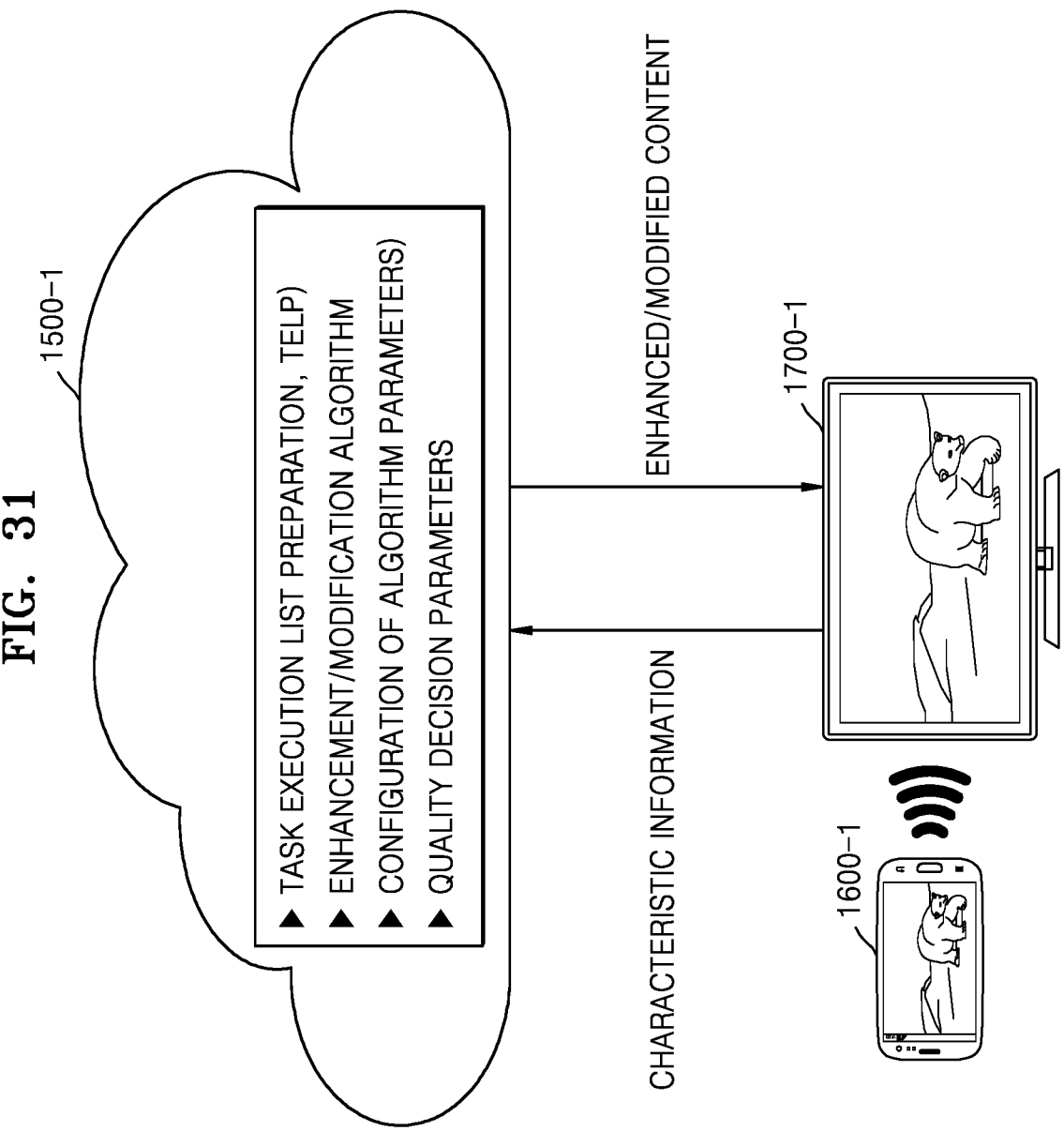
FIG. 31 is a diagram for describing on-the-fly conversion through the cloud while screen mirroring is performed, according to an exemplary embodiment.

FIG. 31 is a diagram for describing on-the-fly conversion through the cloud computing device 1500-1 while screen mirroring is performed between the imaging device 1600-1, such a mobile phone, and an electronic device 1700-1, such as a digital television (DTV), according to an exemplary embodiment. The cloud computing device 1500-1 may determine conversion of content. Generally, when a user mirrors mobile phone or any other compatible device on to DTVs wirelessly, content mirrored on the DTV is of the same quality as that of a mobile phone. In on-the-fly conversion, when the user mirrors the content on a screen, the mirrored content may be sent to the cloud computing device 1500-1 along with characteristic information. The cloud computing device 1500-1 may perform TELP based on above mentioned characteristic information and configure suitable algorithms for content conversion. The cloud computing device 1500-1 may then convert the content and transmit the converted content to the DTV. A rest mode is not applicable when the screen mirroring is performed. In no conversion mode, original mirrored content may be displayed and stored as default attributes.

The characteristic information according to an exemplary embodiment may include at least one of characteristic information of the mobile phone and DTV, content characteristic information, and user interest information in the mobile phone and DTV.

Figure 32:
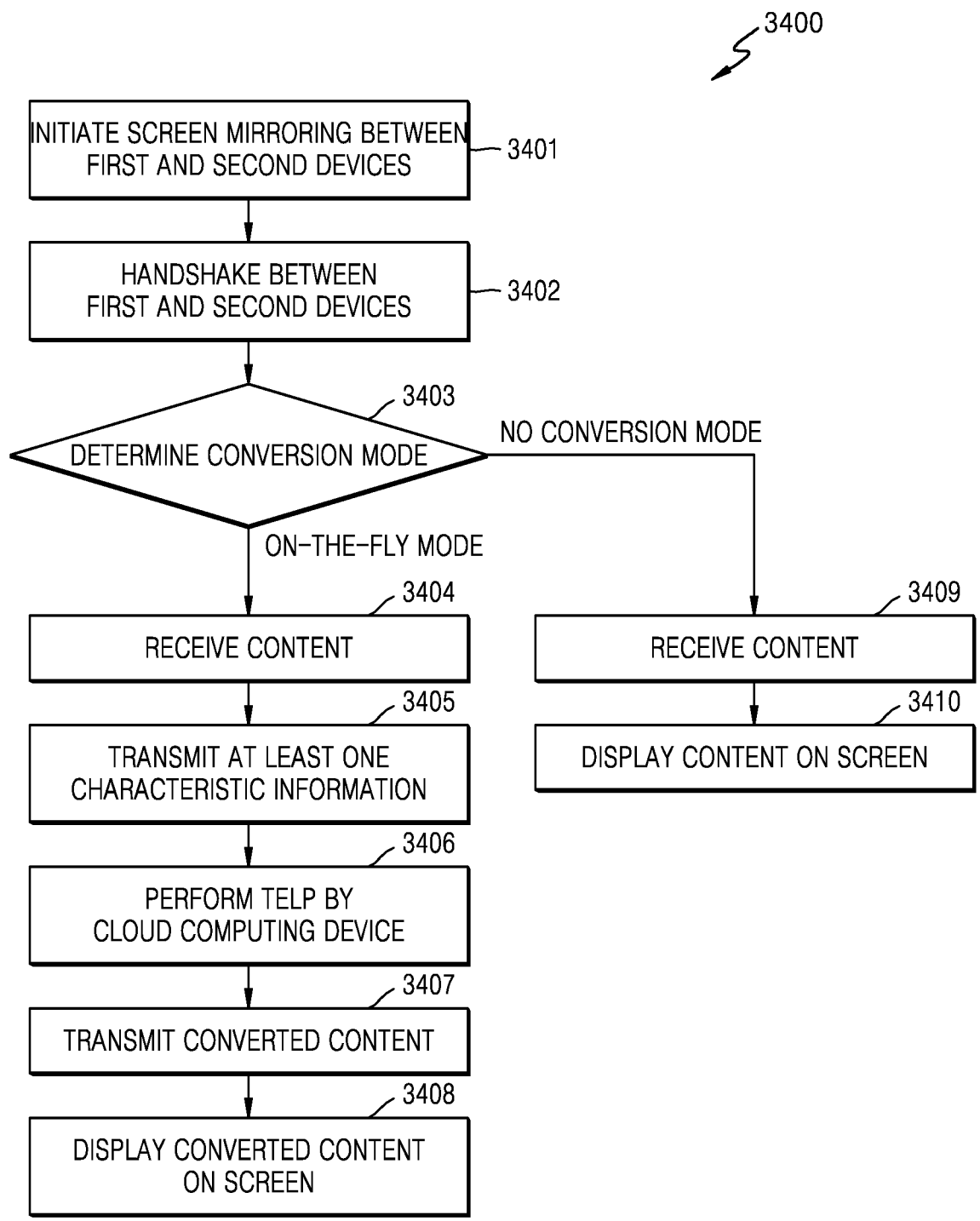
FIG. 32 is a flowchart for describing content conversion through the cloud while screen mirroring is performed between devices, according to an exemplary embodiment.

FIG. 32 is a flowchart 3400 for describing content conversion through the cloud computing device 1500-1 while screen mirroring is performed between devices, according to an exemplary embodiment. In operation 3401, a user may initiate the screen mirroring between a first device and second device. In operation 3402, the first and second devices perform a handshaking operation. In operation 3403, the second device may determine a conversion mode. When an on-the-fly mode is determined, operations 3404 to 3408 may be performed. When no conversion mode is determined, operations 3409 and 3410 may be performed.

In the on-the-fly mode, in operation 3404, the second device may start receiving the contents from the first device. In operation 3405, the second device may transmit characteristic information along with the content to be converted to the cloud computing device 1500-1. In operation 3406, the cloud computing device 1500-1 may perform TELP and accordingly apply quality conversion techniques on the content. Then, in operation 3407, the converted content may be transmitted to the second device. In operation 3408, the converted content may be displayed on the screen.

According to an exemplary embodiment, the characteristic information may include at least one of characteristic information of the first and second devices, content characteristic information, and user interest information in the first and second devices.

In the no conversion mode, in operation 3409, the second device may start receiving content from the first device. In operation 3410, the received content may be displayed on a screen if the second device as it is.

Figure 33:
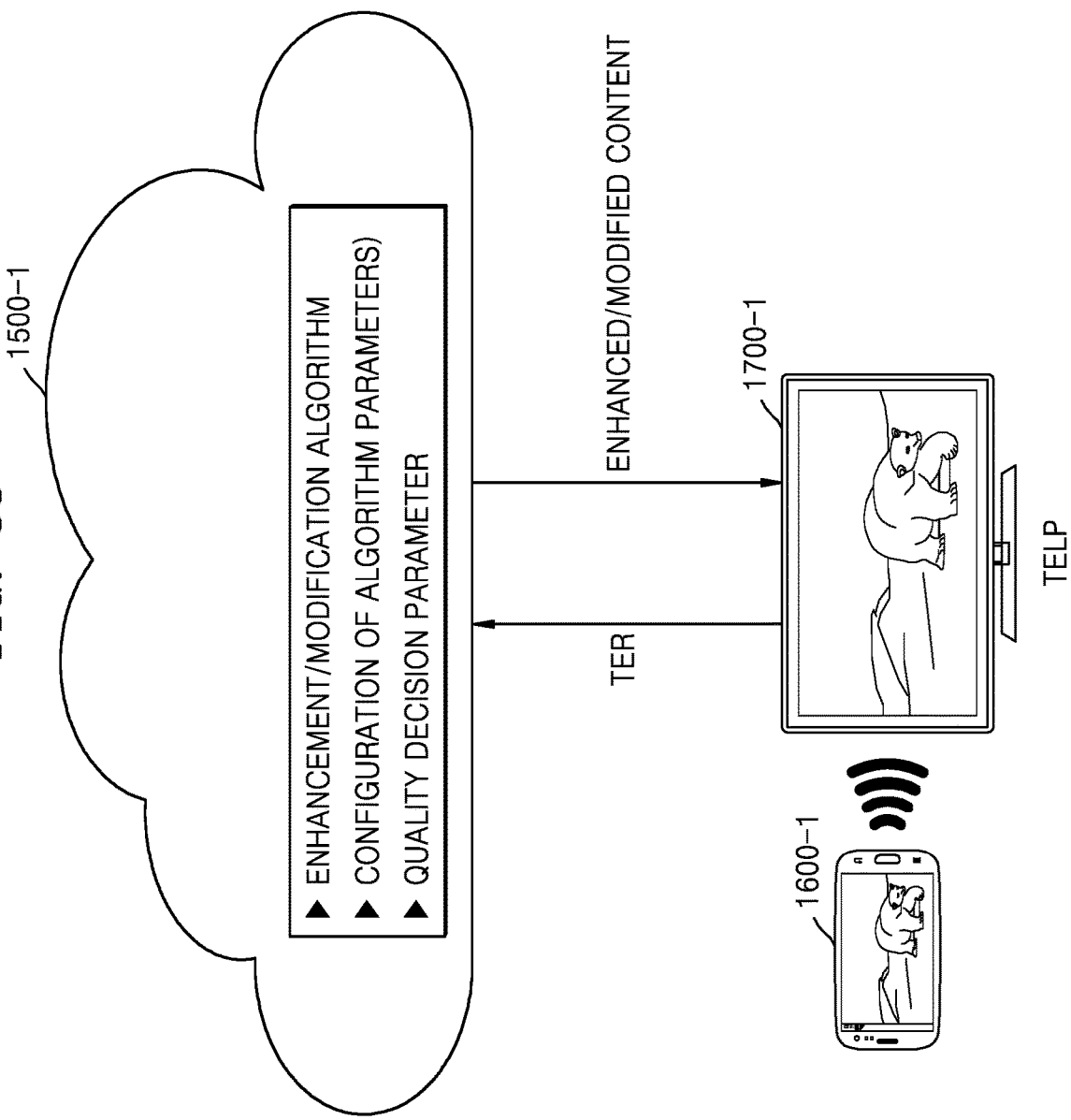
FIG. 33 is a diagram for describing on-the-fly content enhancement through the cloud while screen mirroring is performed, according to an exemplary embodiment.

FIG. 33 is a diagram for describing on-the-fly content enhancement through the cloud computing device 1500-1 while screen mirroring is performed between the imaging device 1600-1, such as a mobile phone, and the electronic device 1700-1, such as a DTV, according to an exemplary embodiment. The cloud computing device 1500-1 may determine whether conversion should occur. When content is mirrored at the DTV, the DTV may prepare a task execution list based on characteristic information and transmit TER to the cloud computing device 1500-1 along with the content. Based on the received TER, the cloud computing device 1500-1 may configure suitable algorithms for content conversion. The cloud computing device 1500-1 may then convert the content and transmit the converted content to the DTV. As described above, a rest mode is not applicable when the screen mirroring is performed between devices.

In no conversion mode, original transferred content may be displayed and stored as default attributes.

The characteristic information according to an exemplary embodiment may include at least one of characteristic information of the mobile phone and the DTV, content characteristic information, and user interest information in the mobile phone and the DTV.

Figure 34:
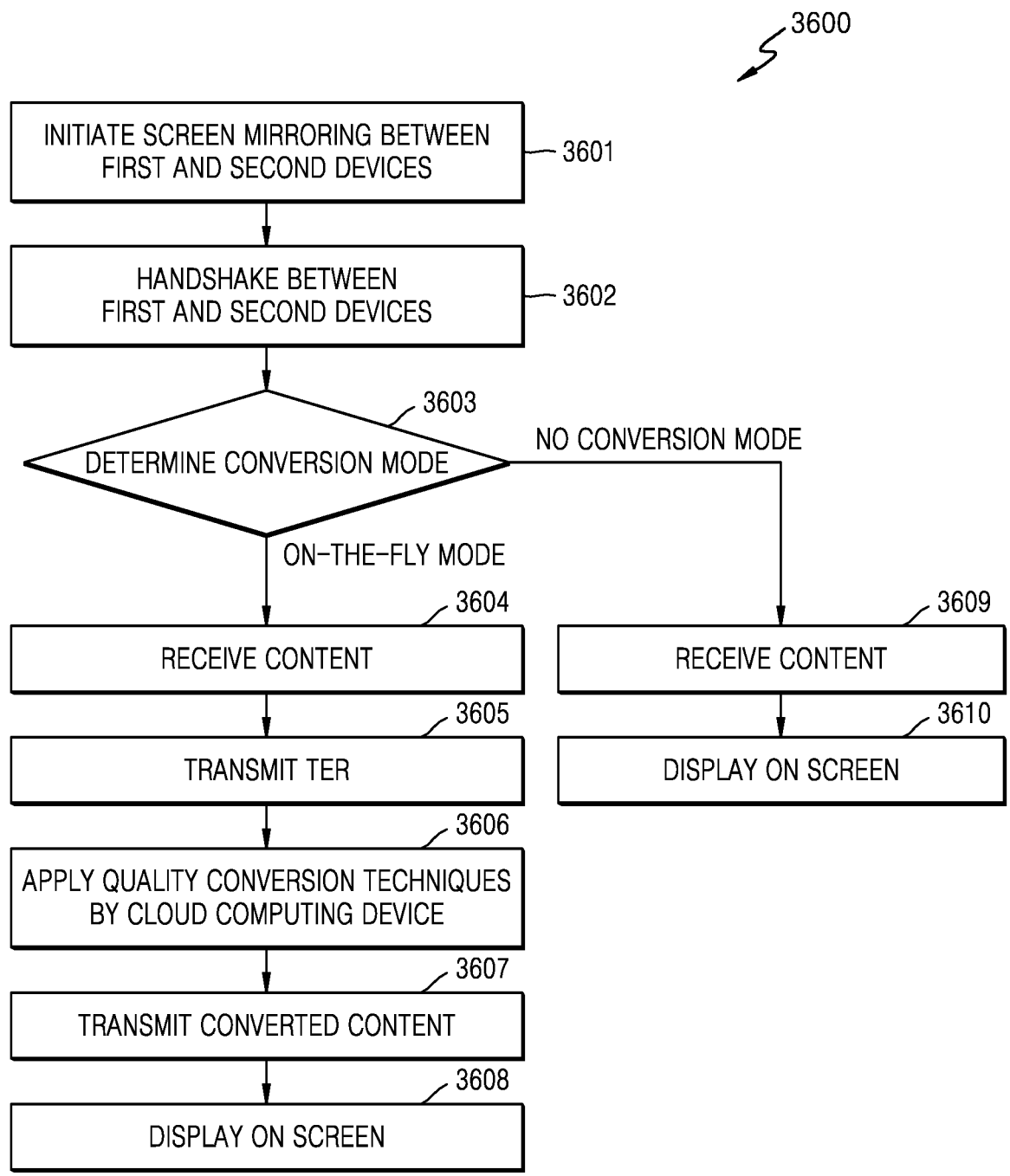
FIG. 34 is a flowchart for describing on-the-fly content enhancement through the cloud while screen mirroring is performed between devices, according to an exemplary embodiment.

FIG. 34 is a flowchart 3600 for describing on-the-fly content enhancement through cloud while screen mirroring is performed between first and second devices, according to an exemplary embodiment. The cloud computing device 1500-1 may determine conversion of content. In operation 3601, a user initiates the screen mirroring between the first device and the second device. In operation 3602, the first and second devices may perform a handshaking operation. In operation 3603, the second device may determine a conversion mode. When an on-the-fly mode is determined, operations 3604 to 3608 may be performed. When no conversion mode is determined, operations 3609 and 3610 may be performed.

In the on-the fly mode, in operation 3604, the second device may start receiving the contents from the first device. In operation 3605, the second device may transmit TER along with the content to be converted to the cloud computing device 1500-1. In operation 3606, the cloud computing device 1500-1 may apply quality conversion techniques on the content. Next, in operation 3607, the converted content may be transmitted to the second device. In operation 3608, the converted content may be displayed on a screen.

In the no conversion mode, in operation 3609, the second device may start receiving the contents from the first device. In operation 3610, the received content may be displayed on the screen as it is.

Figure 35:
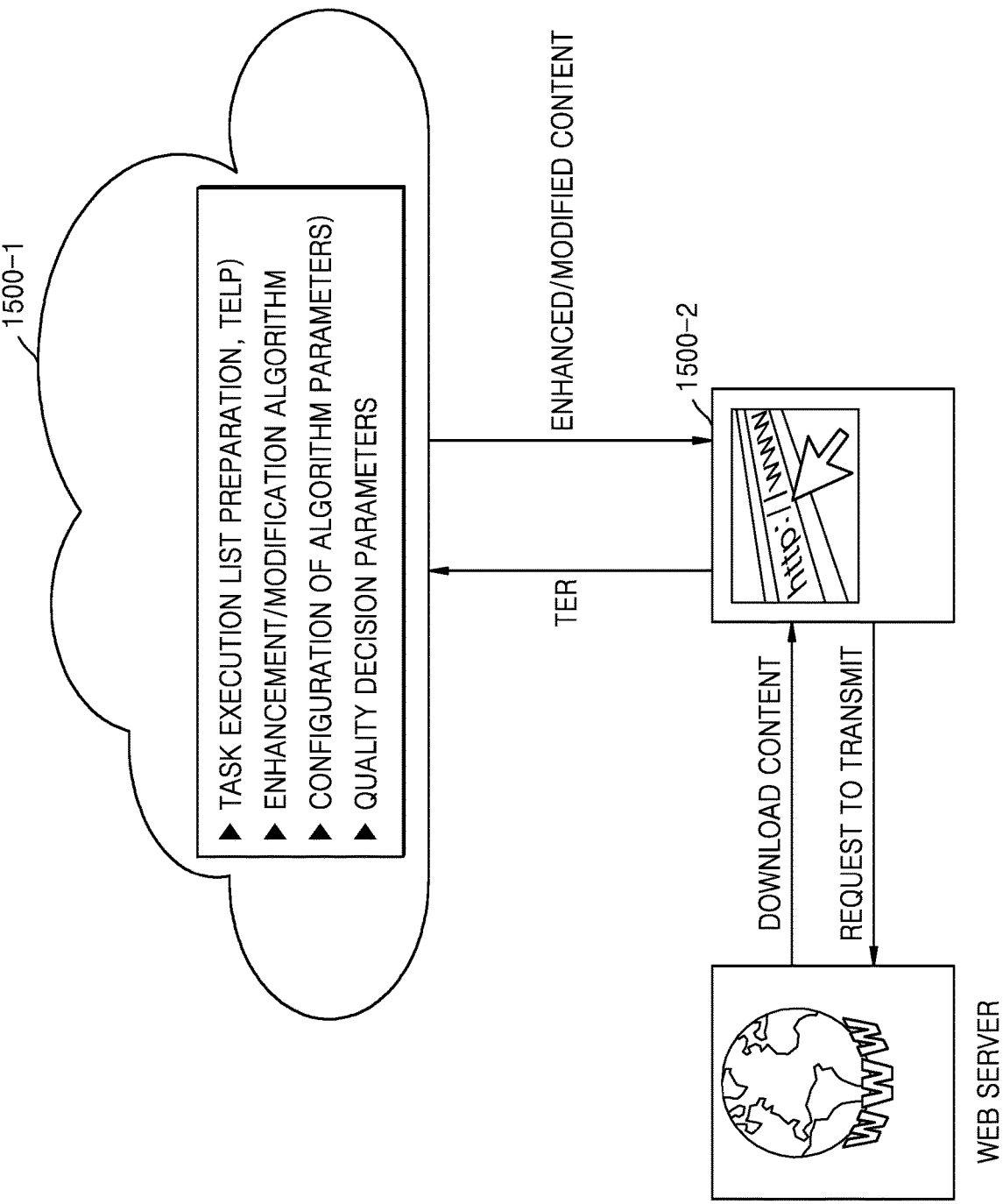
FIG. 35 is a diagram for describing content conversion through the cloud during web-based downloading, according to an exemplary embodiment.

FIG. 35 is a diagram for describing content conversion through the cloud computing device 1500-1 during web-based downloading, according to an exemplary embodiment. The cloud computing device 1500-1 may determine whether conversion of content should occur. According to an exemplary embodiment, content downloaded from a web server may be converted. Due to high bandwidth availability, a user may transmit a content transmit request to the web server from a user device. Then, the user may download the content to the target device 1500-2 of the user that is at the receiving end, from the web server. In on-the-fly conversion, the content downloaded from the web server is transmitted to the cloud computing device 1500-1, together with characteristic information. The cloud computing device 1500-1 may perform TELP based on the characteristic information, and configure suitable algorithms for content conversion. The cloud computing device 1500-1 may convert the content and transmit the converted content to the target device 1500-2. In a no conversion mode, original transferred content may be displayed and stored in default attributes.

The characteristic information according to an exemplary embodiment may include at least one of characteristic information of the target device 1500-2, content characteristic information, and user interest information in the target device 1500-2.

Figure 36:
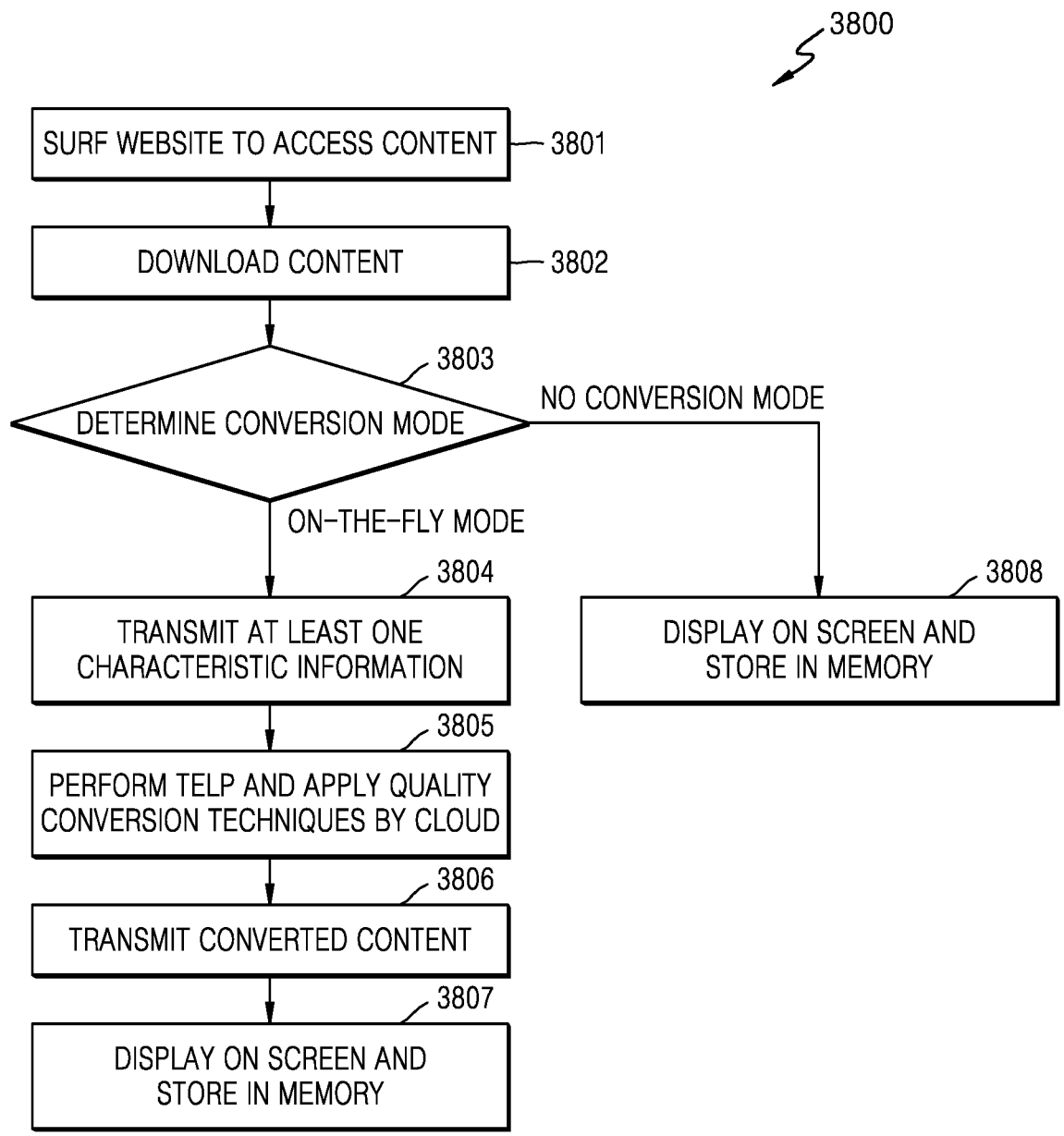
FIG. 36 is a flowchart for describing content conversion through the cloud during web-based downloading, according to an exemplary embodiment.

FIG. 36 is a flowchart 3800 for describing content conversion through cloud during web-based downloading, according to an exemplary embodiment. The cloud may determine conversion of content. In operation 3801, a user may surf a website to access content. In operation 3802, the user may download the content from a web server. In operation 3803, a device may determine a mode of enhancement or type of modification for the content. When an on-the-fly mode is determined, operations 3804 to 3807 may be performed. When no conversion mode is determined, operation 3808 may be performed.

In the on-the-fly mode, in operation 3804, the device may transmit characteristic information along with the content to be converted to the cloud. In operation 3805, the cloud may perform TELP and accordingly apply quality conversion techniques on the content. Then, in operation 3806, the converted content may be transmitted to the device. In operation 3807, the converted content may be displayed on the screen and/or stored in memory.

In the no conversion mode, in operation 3808, the received content may be displayed on the screen as it is.

The characteristic information according to an exemplary embodiment may include at least one of characteristic information of the device, content characteristic information, and user interest information in the device.

Figure 37:
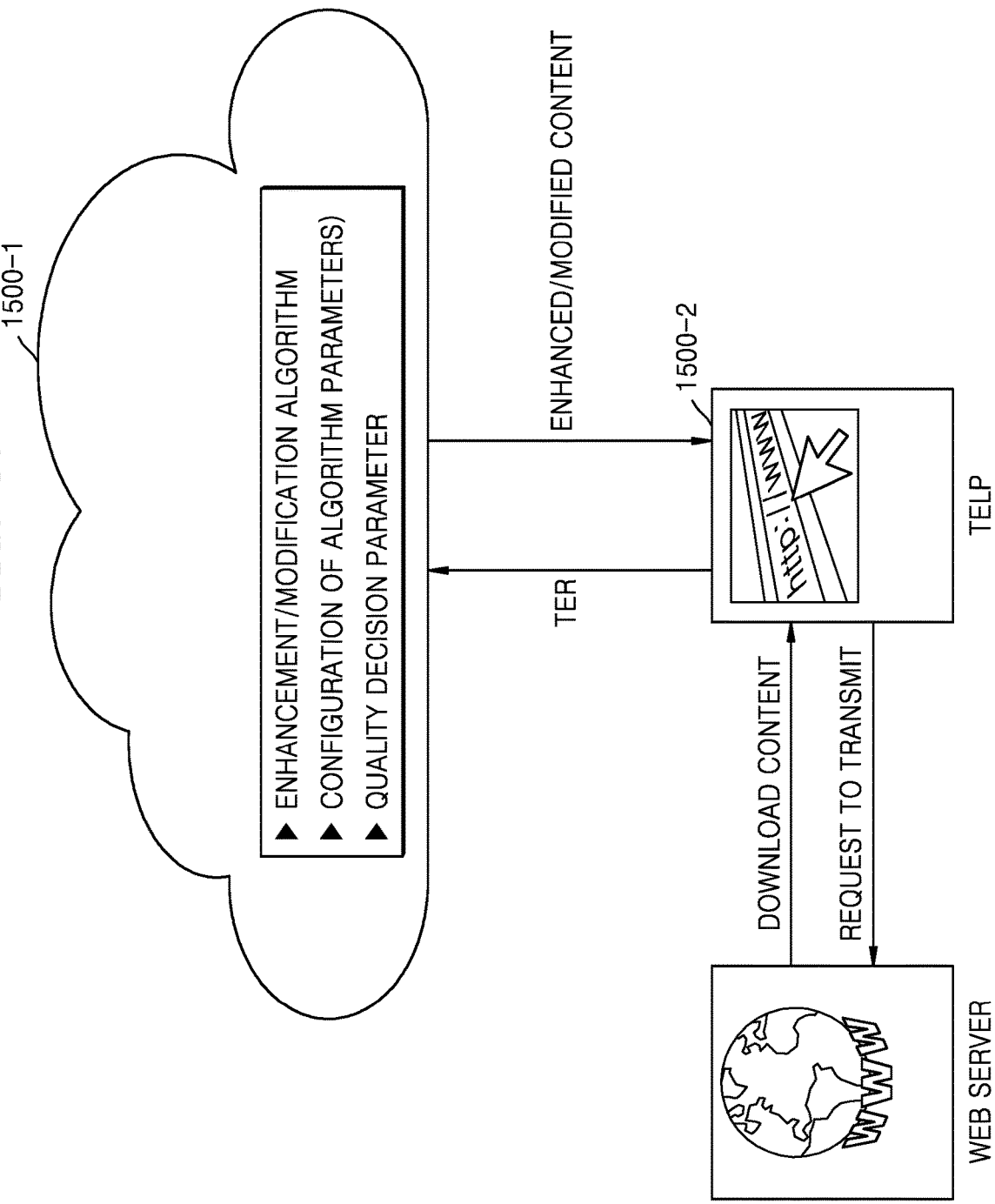
FIG. 37 is a diagram for describing content conversion through the cloud during web-based downloading, according to another exemplary embodiment.

FIG. 37 is a diagram for describing content conversion through the cloud computing device 1500-1 during web-based downloading at the target device 1500-2, according to an exemplary embodiment. The target device 1500-2 may determine whether conversion of content should occur and ensure that the process ensues. When a web user downloads content from a web server, the target device 1500-2 may prepare a task execution list based on characteristic information. The downloaded content may be transmitted to the cloud computing device 1500-1 along with TER prepared by the target device 1500-2. Based on the received TER, the cloud computing device 1500-1 may configure suitable algorithms for content conversion. The cloud computing device 1500-1 may convert content and transmit the converted content to the target device 1500-2. In a no conversion mode, original transferred content may be displayed and stored according to default attributes.

The characteristic information according to an exemplary embodiment may include at least one of characteristic information of the target device 1500-2, content characteristic information, and user interest information in the target device 1500-2.

Figure 38:
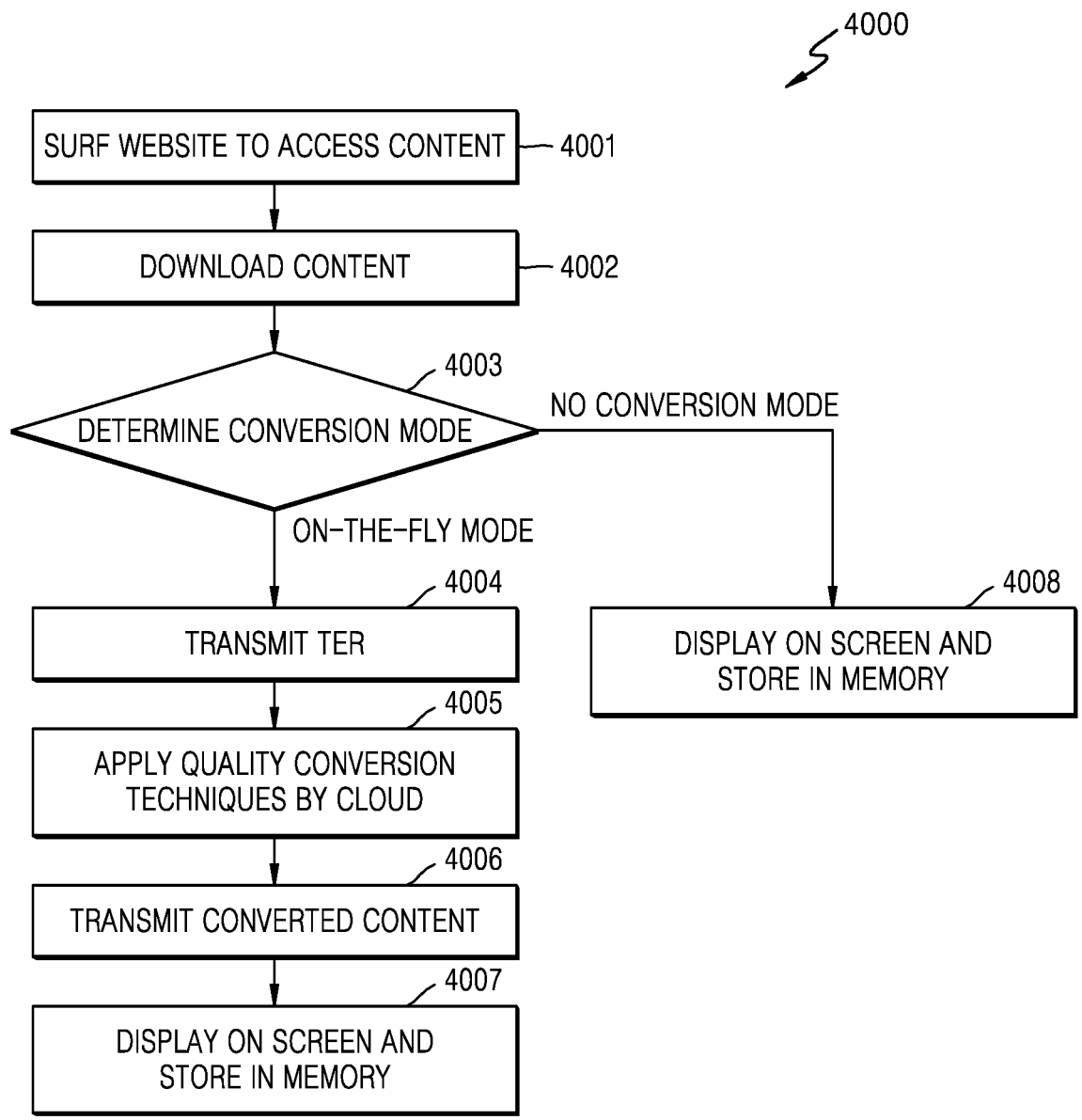
FIG. 38 is a flowchart for describing content conversion through the cloud during web-based downloading, according to another exemplary embodiment.

FIG. 38 is a flowchart 4000 for describing content conversion through the cloud during web-based downloading, according to another exemplary embodiment. A device may determine conversion of content. In operation 4001, a user may surf a website to access content. In operation 4002, the user may download the content from a web server. In operation 4003, the device may determine a conversion mode of the content. When an on-the-fly mode is determined, operations 4004 to 4007 may be performed. When no conversion mode is determined, operation 4008 may be performed.

In the on-the-fly mode, in operation 4004, the device may transmit TER along with content to be converted. In operation 4005, the cloud may apply quality conversion techniques on the content. Next, in operation 4006, the converted content may be transmitted to the device. In operation 4007, the converted content may be displayed on the screen and/or stored in memory.

In the no conversion mode, in operation 4008, the received contents may be displayed on the screen as it is.

Figure 39:
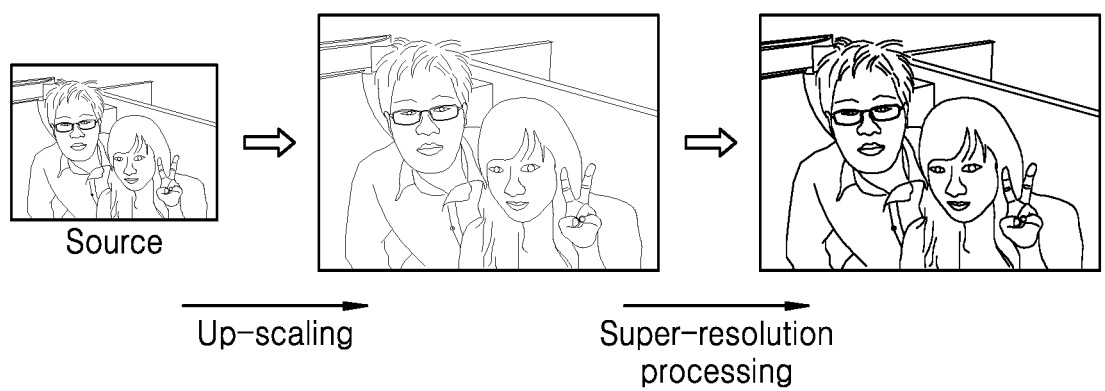
FIG. 39 is a diagram for describing a single image super resolution process according to an exemplary embodiment.

FIG. 39 is a diagram for describing a single image super resolution (SR) process according to an exemplary embodiment. SR image reconstruction is a process of combining one or more low resolution (LR) images into a single higher resolution image. There is a driving need for digital images of higher resolution and quality. However, there is a limit to spatial resolution that may be stored by any digital device. Growing interests in SR reconstruction of video sequences and closely related problems of construction of SR still images from image sequences has led to the emergence of several competing SR reconstruction methodologies. SR has many applications in the consumer products such as cell phone, webcam, high-definition television (HDTV), closed circuit television (CCTV) etc.

For example, a SR technique may be applied to improve the quality of LR images and videos taken by mobile phones. Use of interpolation techniques at a display device to improve the image quality of a digital television (DTV) signal has a drawback of blurred edges. Hence, using SR methods according to an exemplary embodiment of FIG. 39, a battery image quality may be obtained.

To save a storage space and a communication bandwidth, thereby reducing a download time, a low-resolution image may be downloaded. Techniques under single image super resolution may be widely categorized as: (1) Interpolation-based—usually applies an interpolation kernel to estimate pixels in an SR grid; (2) Reconstruction-based—applies a certain prior knowledge to make SR estimation; and (3) Example-based—typically synthesizes an SR image by mapping a relationship between LR and HR image pairs.

Figure 40:
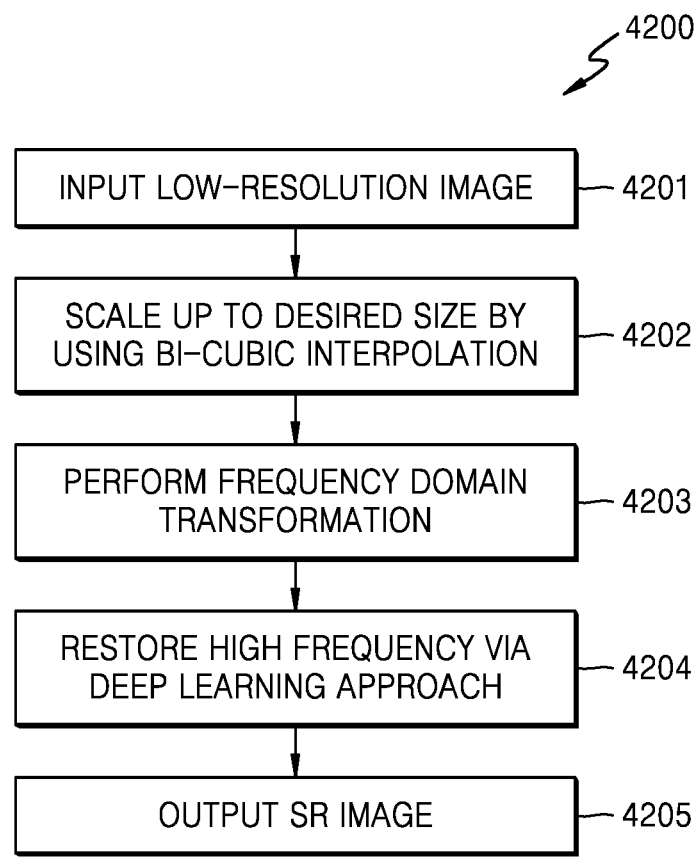
FIG. 40 is a flowchart for describing a super resolution approach according to an exemplary embodiment.

FIG. 40 is a flowchart 4200 for describing a super resolution processing according to an exemplary embodiment. The super resolution processing may restore missing high frequencies due to bi-cubic interpolation based on a deep learning approach method. According to the deep learning approach method, a low-resolution image may be first received in operation 4201. Then, the low-resolution image may be scaled up to the desired size by using bi-cubic interpolation in operation 4202. Next, frequency domain transformation may be applied to the scaled-up image in operation 4203, and high-frequency information may be restored as a result of the deep learning approach method, in operation 4204. The deep learning approach method may be performed by only using high resolution image patches in a multiple-layer-wise unsupervised manner, to establish deep relational connections between low-frequencies and high frequencies. In operation 4205, an SR image may be output.

Figure 41:
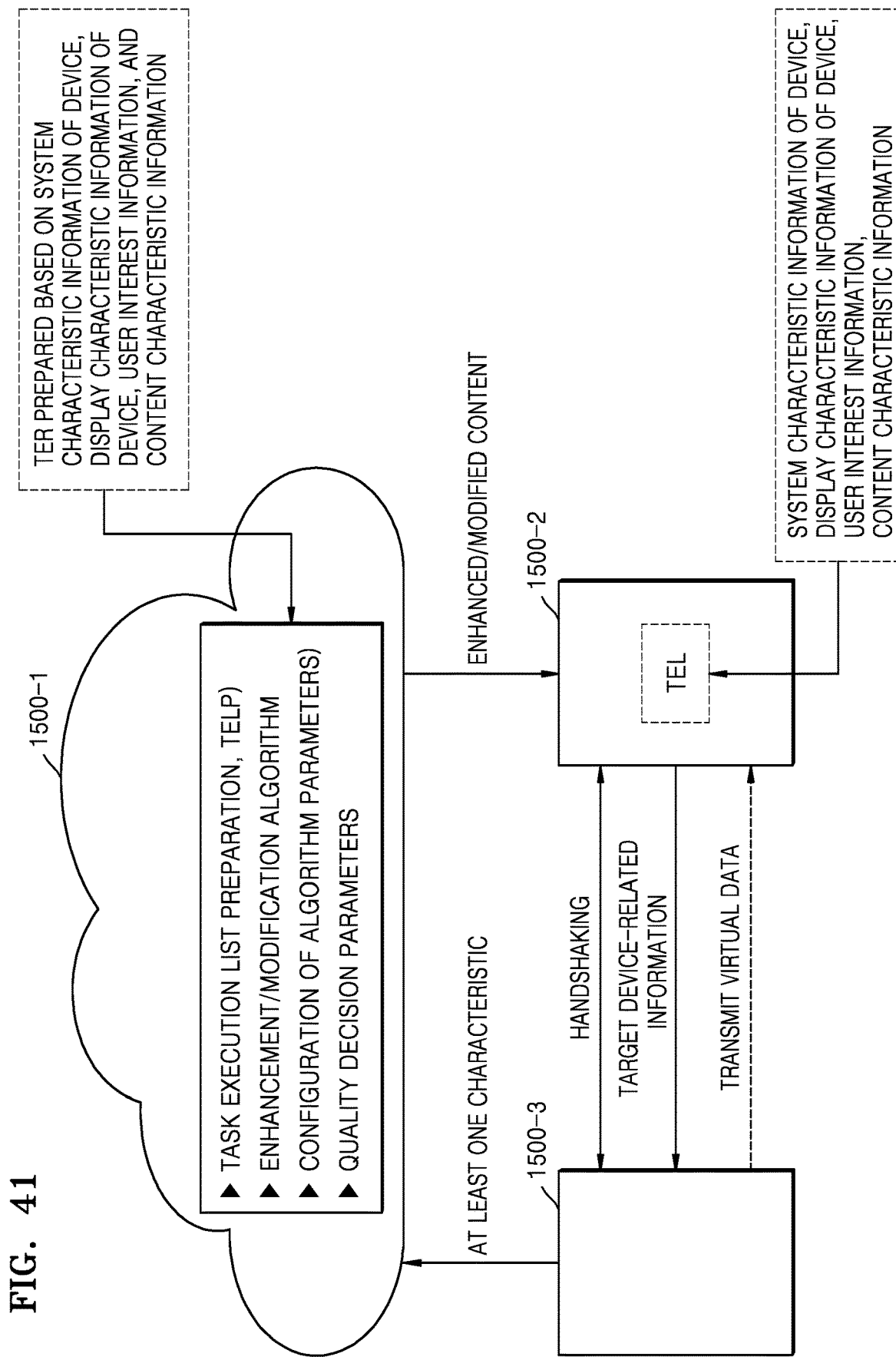
FIG. 41 is a diagram for describing on-the-fly content conversion through the cloud while content is transferred between two devices, according to another exemplary embodiment.

FIG. 41 is a diagram for describing on-the-fly content conversion through the cloud computing device 1500-1 while content is transferred between the target device 1500-2 and the source device 1500-3, according to another exemplary embodiment. The cloud computing device 1500-1 may determine conversion of content. When handshaking between the source and target devices 1500-3 and 1500-2 is established, the target device 1500-2 may transmit target device-related information to the source device 1500-3. The source device 1500-3 may then transmit (or share) characteristic information and content with the cloud computing device 1500-1 for conversion. The cloud computing device 1500-1 may perform TELP based on above mentioned characteristic information and configure suitable algorithms for content conversion. The various suitable quality decision parameters PSNR, SNR, SSIM, RMSE, NRCQA, BRISQUE, etc. are available on the cloud computing device 1500-1 to ensure the best content quality. The converted content may be transmitted to target device 1500-2.

The target device-related information according to an exemplary embodiment may include characteristic information of the target device 1500-2 and user interest information in the target device 1500-2.

The characteristic information according to an exemplary embodiment may include at least one of characteristic information of the source device 1500-3, content characteristic information, and user interest information in the source device 1500-3.

Figure 42:
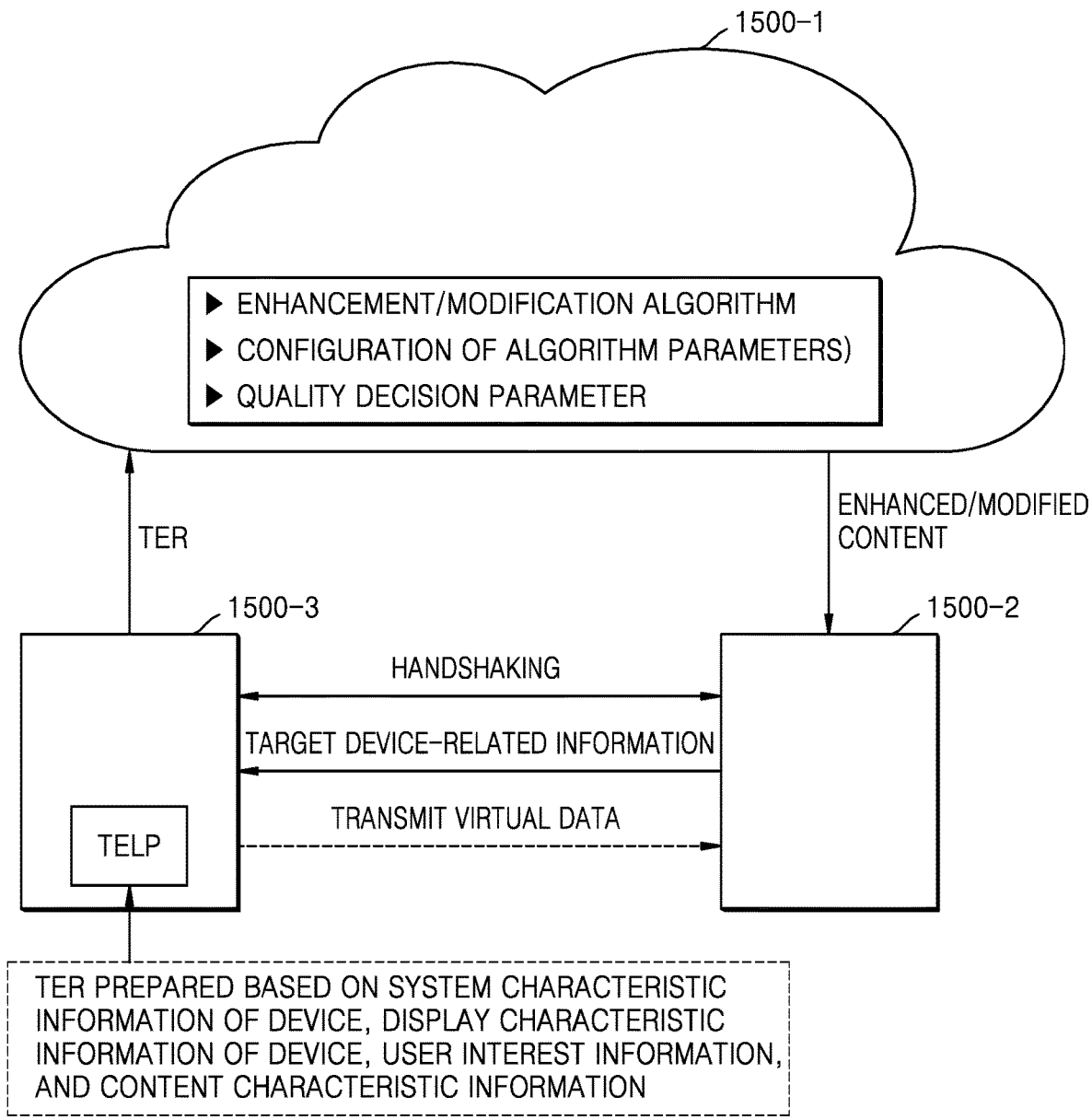
FIG. 42 is a diagram for describing on-the-fly content conversion through the cloud while content is transferred between two devices, wherein a conversion decision is obtained by a target entity, according to an exemplary embodiment.

FIG. 42 is a diagram for describing on-the-fly content conversion through the cloud computing device 1500-1 while content is transferred between two devices, according to an exemplary embodiment. The target device 1500-2 may determine conversion of content. When handshaking between the source device 1500-3 and the target device 1500-2 is established, the target device 1500-2 may transmit target device-related information to the source device 1500-3. The source device 1500-3 may perform TELP by considering at least one of characteristic information of the source device 1500-3, target device 1500-2, content characteristic information, and user interest information in the source device 1500-3 or target device 1500-2, and transmit TER along with the contents to the cloud computing device 1500-1 for conversion. The cloud computing device 1500-1 may perform conversion based on the received TER and configure suitable algorithms for content conversion. The various suitable quality decision parameters, PSNR, SNR, SSIM, RMSE, NRCQA, BRISQUE, etc. are available on the cloud computing device 1500-1 to ensure the best content quality. The converted content may be transmitted to target device 1500-2.

The target device-related information according to an exemplary embodiment may include characteristic information of the target device 1500-2 and user interest information in the target device 1500-2.

According to an exemplary embodiment, during on-the-fly content conversion, content may be transferred between two devices. Cloud or target device may determine conversion of content.

Figure 43:
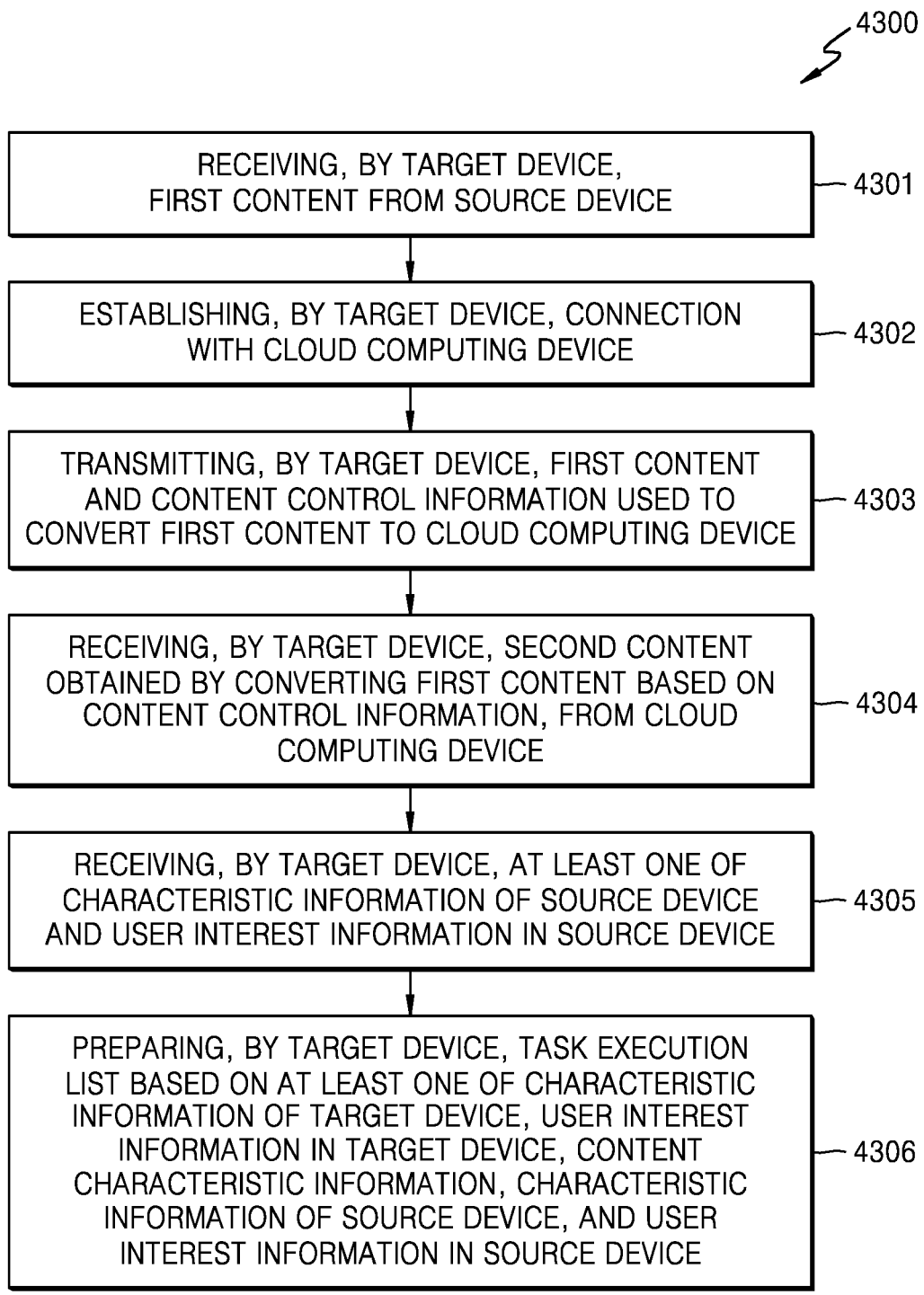
FIG. 43 is a flowchart of a method of providing, by a target device, converted content, according to an exemplary embodiment.

FIG. 43 is a flowchart of a method 4300 of providing, by a target device, converted content, according to an exemplary embodiment. The method 4300 according to an exemplary embodiment may include: receiving, by the target device, first content from a source device (operation 4301); establishing, by the target device, a connection with a cloud computing device (operation 4302); transmitting, by the target device, the first content and content control information used to convert the first content, to the cloud computing device (operation 4303); and receiving, by the target device, second content obtained by converting the first content based on the content control information, from the cloud computing device (operation 4304).

According to some exemplary embodiments, converting of content may include modifying or enhancing of the content, as described above with reference to FIGS. 1 through 42. In other words, converted content may be enhanced content or modified content.

The content control information according to an exemplary embodiment may include at least one of characteristic information of the target device, user interest information in the target device, content characteristic information, characteristic information of the source device, and user interest information in the source device.

The characteristic information of the target device, according to an exemplary embodiment, may include at least one of display characteristic information of the target device, display characteristic information of the target device, network heuristic information of the target device, battery condition information of the target device, offline/online mode information of the target device, internet billing cycle information of the target device, 3D view capability information, hardware component status information of the target device, hardware configuration information of the target device, application information operated on the target device, sensor information related to the target device, ambient information, orientation information, and multiview-related information.

The display characteristic information of the target device, according to an exemplary embodiment, may include at least one of information about resolution, about size of a display, and about a number of colors of the display.

The content according to an exemplary embodiment may include an image, a video, audio, a digital file, or a combination thereof.

The method 4300 according to an exemplary embodiment may further include receiving, by the target device, at least one of characteristic information of the source device and user interest information in the source device (operation 4305).

The characteristic information of the source device, according to an exemplary embodiment, may include at least one of network heuristic information of the source device, battery condition information of the source device, offline/online mode information of the source device, internet billing cycle information of the source device, display characteristic information of the source device, user profile information, 3D view capability information, sensor information related to the source device, ambient information, orientation information, and multiview-related information.

The user interest information according to an exemplary embodiment may include language information, format information, size information, processing time information, aspect ratio information resolution information of content, 2D or 3D format-related information, quality information of the content, and a combination thereof.

Here, operation 4303 may be optionally performed based on network heuristic status information, user selected network mode information, battery condition information, internet billing cycle information, and user profile information.

The content control information according to an exemplary embodiment may include a task execution request, and the task execution request may be generated based on at least one of the characteristic information of the target device, the user interest information in the target device, the content characteristic information, the characteristic information of the source device, and the user interest information in the source device.

The method 4300 may further include preparing, by the target device, a task execution list based on at least one of the characteristic information of the target device, the user interest information in the target device, the content characteristic information, the characteristic information of the source device, and the user interest information in the source device.

The task execution request according to an exemplary embodiment may be categories to identify an essential task and a non-essential task.

Details related to the content control information and information included in the content control information, according to an exemplary embodiment, have been described above with reference to FIGS. 1, 2, 4, and 20.

Figure 44:
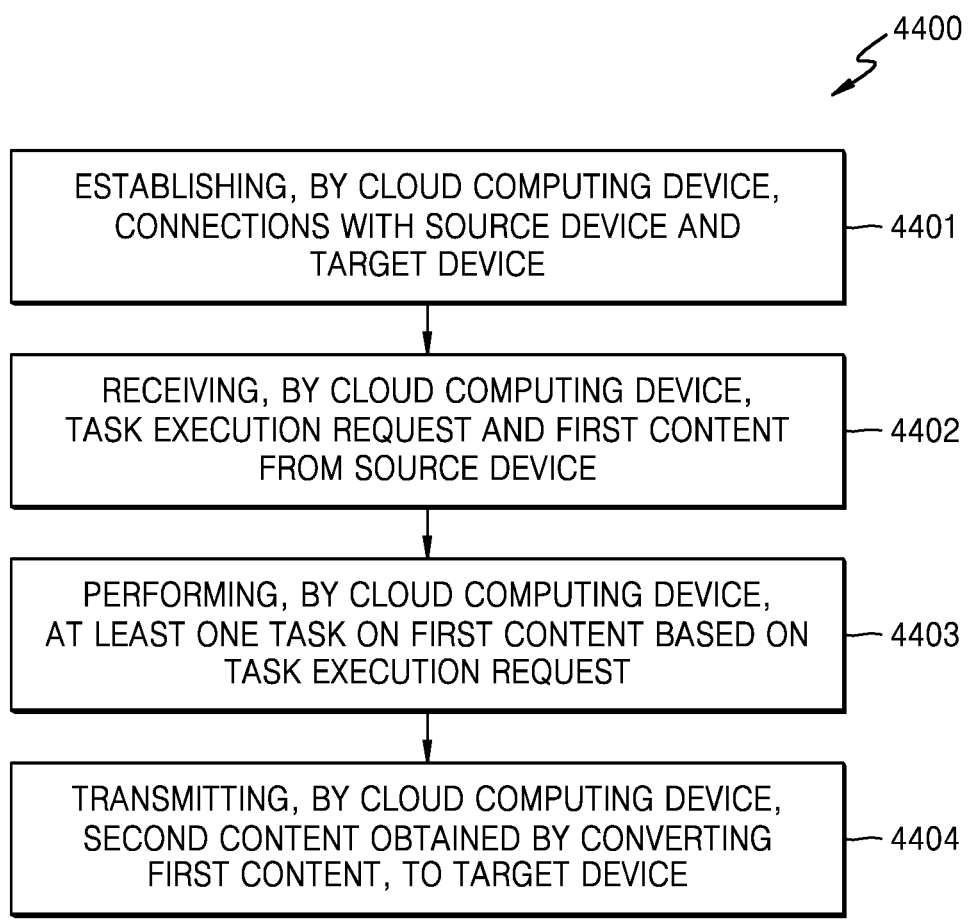
FIG. 44 is a flowchart of a method of providing, by a cloud computing device, converted content, according to an exemplary embodiment.

FIG. 44 is a flowchart of a method 4400 of providing, by a cloud computing device, converted content, according to an exemplary embodiment.

The method 4400 according to an exemplary embodiment may include establishing, by the cloud computing device, connections with a source device and a target device (operation 4401), receiving, by the cloud computing device, a task execution request and first content from the source device (operation 4402), performing, by the cloud computing device, at least one task on the first content based on the task execution request (operation 4403), and transmitting, by the cloud computing device, second content obtained by converting the first content, to the target device (operation 4404).

Operation 4403 according to an exemplary embodiment may further include performing at least one of a file format conversion operation, a noise reduction operation, a blur reduction operation, a contrast enhancement operation, a reconstruction operation, a resolution modification operation, a 2D to 3D conversion operation, an ambient information inclusion operation, an annotation operation, a tagging operation, a sub-title inclusion operation, a text language translation operation, a plagiarism confirmation operation, an audio language translation operation, an audio noise reduction operation, a harmonic fidelity reconstruction operation, and a dynamic gain boost operation.

Operation 4403 according to an exemplary embodiment may further include selecting at least one processing method, and selecting at least one quality decision parameter for obtaining the second content.

Operation 4403 according to an exemplary embodiment may be selectively performed based on at least one pre-set condition.

The at least one pre-set condition according to an exemplary embodiment may include network heuristic status information, user selected network mode information, battery condition information, internet billing cycle information, and user profile information.

Details related to the content control information and information included in the content control information, according to an exemplary embodiment, have been described above with reference to FIGS. 1, 2, 4, and 20.

Figure 45:
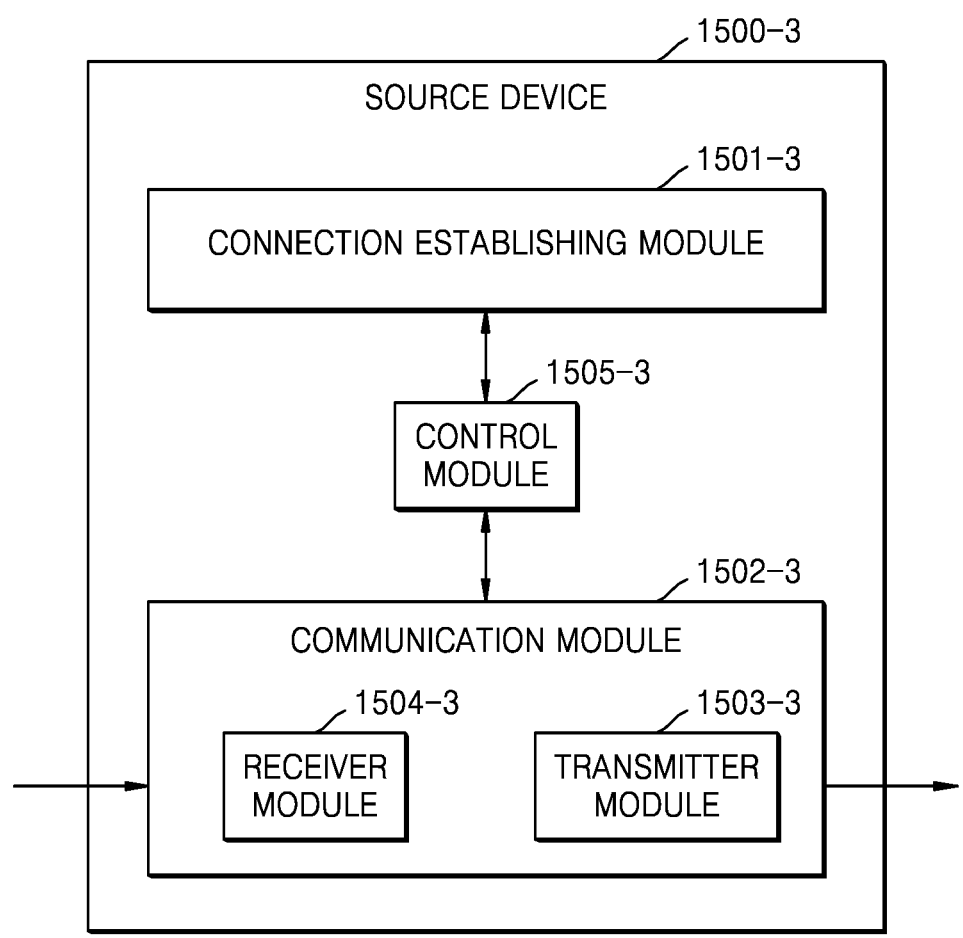
FIG. 45 is a block diagram of a source device providing content, according to an exemplary embodiment.

FIG. 45 is a block diagram of the source device 1500-3 providing converted content, according to an exemplary embodiment.

The source device 1500-3 according to an exemplary embodiment may include a connection establishing module 1501-3 for establishing a connection with a cloud computing device, a communication module 1502-3 for transmitting content and content control information to the cloud computing device, and at least one control module 1505-3 for controlling the connection establishing module 1501-3 and the communication module 1502-3.

The control module 1505-3 according to an exemplary embodiment may be referred to as a processor.

The source device 1500-3 according to an exemplary embodiment may further include a memory (not shown) for storing information.

The source device 1500-3 according to an exemplary embodiment may perform the same operations as the computing device 1500 of FIG. 15 operating as a source device.

Figure 46:
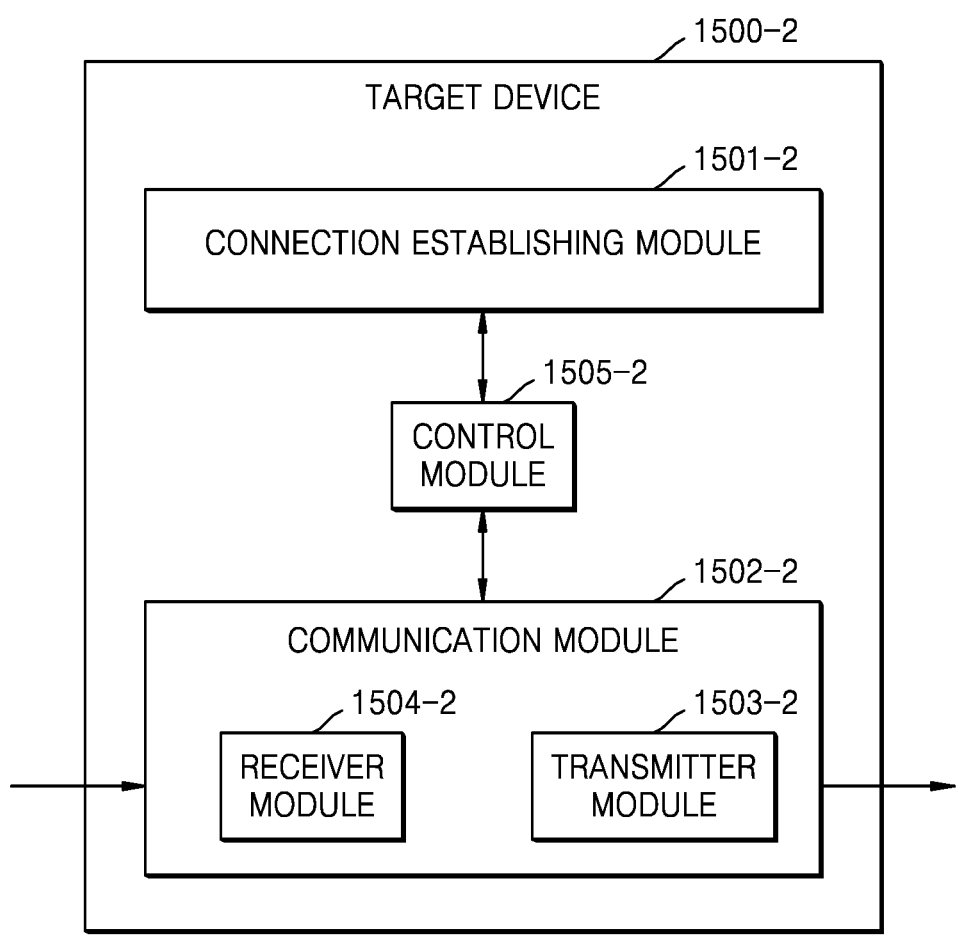
FIG. 46 is a block diagram of a target device providing content, according to an exemplary embodiment.

FIG. 46 is a block diagram of the target device 1500-2 providing converted content, according to an exemplary embodiment.

The target device 1500-2 according to an exemplary embodiment may include a connection establishing module 1501-2 for establishing a connection with a cloud computing device, a control module 1505-2 for generating a task generating request, a transmitter module 1503-2 for transmitting a task execution request and content to the cloud computing device, and a receiver module 1504-2 for receiving converted content from the cloud computing device.

A control module 1505-2 according to an exemplary embodiment may be referred to as a processor.

The transmitter module 1503-2 and the receiver module 1504-2 according to an exemplary embodiment are classified according to functions, and thus one communication module 1502-2 may perform receiving or transmitting operation.

The target device 1500-2 according to an exemplary embodiment may further include a memory (not shown) for storing information.

The target device 1500-2 according to an exemplary embodiment may perform the same operations as the computing device 1500 of FIG. 15 operating as a target device.

Details related to the content control information and information included in the content control information, according to an exemplary embodiment, have been described above with reference to FIGS. 1, 2, 4, and 20.

Figure 47:
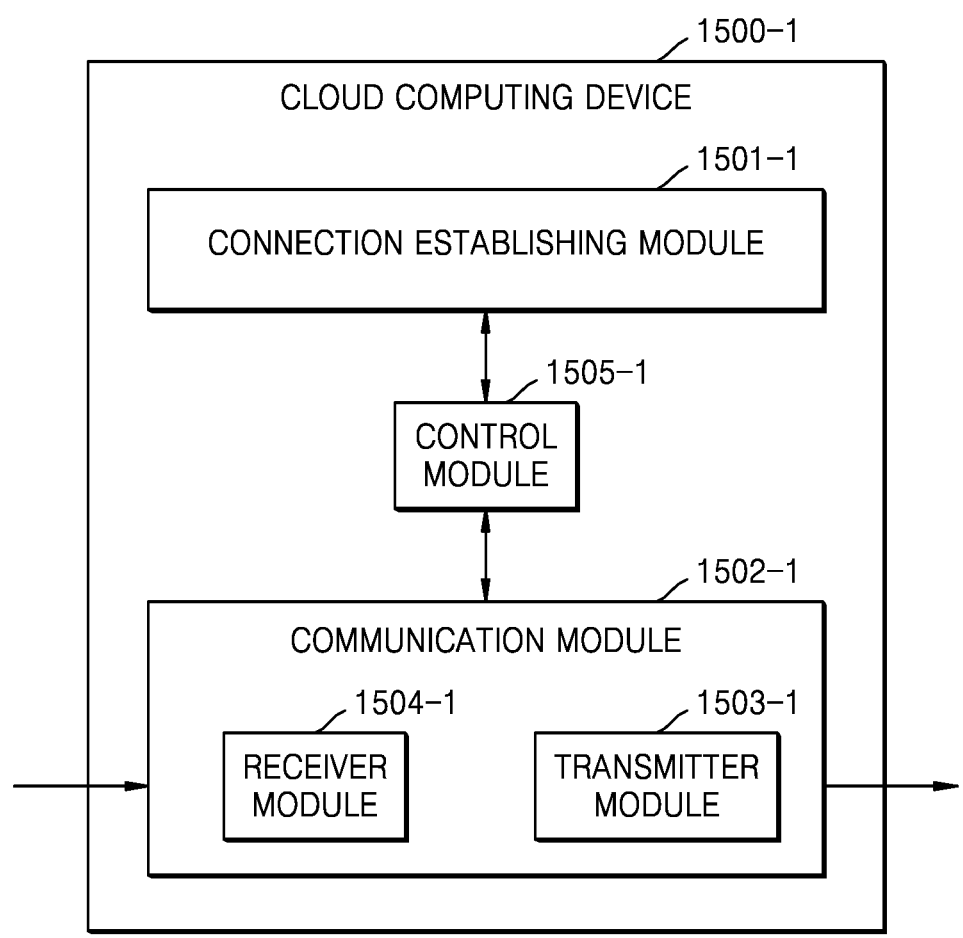
FIG. 47 is a block diagram of a cloud-based computing device providing content according to an exemplary embodiment.

FIG. 47 is a block diagram of the cloud computing device 1500-1 providing content according to an exemplary embodiment.

The cloud computing device 1500-1 according to an exemplary embodiment may include a connection establishing module 1501-1 for establishing connections with a source device and a target device, a receiver module 1504-1 for receiving content and content control information used to convert the content, a control module 1505-1 generating a task execution list based on the content control information, and a transmitter module 1503-1 for transmitting converted content to the target device.

The content control information according to an exemplary embodiment may include characteristic information of the target device, user interest information in the target device, content characteristic information, characteristic information of the source device, and user interest information in the source device, wherein the characteristic information of the target device and the user interest information in the target device are received from the target device, and the characteristic information of the source device and the user interest information in the source device are received from the source device. Also, the characteristic information of the target device may include display characteristic information of the target device and the content characteristic information may include resolution or format information of the content.

The control module 1505-1 according to an exemplary embodiment may also be referred to as a processor.

The transmitter module 1503-1 and the receiver module 1504-1 according to an exemplary embodiment are classified according to functions, and thus one communication module 1502-1 may perform receiving or transmitting operation.

According to an exemplary embodiment, the control module 1505-1 may perform at least one task on the content according to the task execution list to obtain converted content.

The cloud computing device 1500-1 according to an exemplary embodiment may further include a memory (not shown) for storing information.

The cloud computing device 1500-1 according to an exemplary embodiment may perform the same operations as the computing device 1500 of FIG. 15 operating as a cloud computing device.

Details related to the content control information and information included in the content control information, according to an exemplary embodiment, have been described above with reference to FIGS. 1, 2, 4, and 20.

While certain exemplary embodiments have been illustrated and described herein, it is to be understood that the invention is not limited thereto, but may be otherwise variously embodied and practiced within the scope of the following claims.

One or more exemplary embodiments may also be embodied as computer-readable codes on a computer-readable recording medium. The computer-readable recording medium is any data storage device that may store programs or data which may be thereafter read by a computer system.

Examples of the computer-readable recording medium include read-only memory (ROM), random-access memory (RAM), CD-ROMs, magnetic tapes, floppy disks, optical data storage devices, etc. The computer-readable recording medium may also be distributed over network coupled computer systems so that the computer-readable code is stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A method of providing content, the method comprising:
receiving, by a target device, an initiation request for screen mirroring from a source device;
establishing, by the target device, a handshaking with the source device;
receiving, by the target device, a characteristic information of the source device and first content from the source device;
determining, by the target device, a conversion mode or a non-conversion mode with respect to the first content, based on a characteristic information of the target device and the characteristic information of the source device;
in response to determining the conversion mode, receiving, by the target device, the first content corresponding to the screen mirroring with the source device;
establishing, by the target device, a connection with a cloud computing device;
transmitting, by the target device, the first content received from the source device and content control information related to the target device and the source device, to the cloud computing device; and receiving, by the target device, from the cloud computing device, second content obtained by converting the first content based on the content control information;

displaying, by the target device, the second content on the display, in response to determining the non-conversion mode, displaying, by the target device, the first content on the display, wherein the second content is obtained by performing at least one task on the first content based on the content control information, the content control information including characteristic information of the first content, the characteristic information of the target device, and the characteristic information of the source device.

2. The method of claim 1, wherein the content control information further comprises at least one from among characteristic information of the target device, characteristic information of the first content, characteristic information of the source device, and user interest information on the source device.

3. The method of claim 2, wherein the characteristic information of the target device comprises at least one from among display characteristic information of the target device, network heuristic information of the target device, battery condition information of the target device, offline/online mode information of the target device, internet billing cycle information of the target device, 3-dimensional (3D) viewing capability information, hardware component status information of the target device, hardware configuration information of the target device, application information executed in the target device, sensor information related to the target device, ambient information, orientation-related information, and multiview-related information.

4. The method of claim 3, wherein the display characteristic information of the target device comprises at least one from among information about resolution, information about a size of a display, and information about a number of colors of the display.

5. The method of claim 1, wherein the first content comprises an image, a video, an audio, a digital file, or a combination of the image, the video, the audio and the digital file.

6. The method of claim 1, further comprising receiving, by the target device, user interest information in the source device.

7. The method of claim 2, wherein the characteristic information of the source device comprises at least one from among network heuristic information of the source device, battery condition information of the source device, offline/online mode information of the source device, internet billing cycle information of the source device, display characteristic information of the source device, user profile information, 3D viewing capability information, sensor information related to the source device, ambient information, orientation-related information, and multiview-related information.

8. The method of claim 2, wherein the user interest information comprises at least one from among language information, format information, size information, processing time information, aspect ratio information, resolution information of the first content, 2D or 3D format-related information, quality information of the first content, and a combination of the language information, the format information, the size information, the processing time information, the aspect ratio information, the resolution information of the first content, the 2D or 3D format-related information, the quality information of the first content.

9. The method of claim 1, wherein the transmitting is selectively performed based on network heuristic information, user selected network mode information, battery condition information, internet billing cycle information, and user profile information.

10. The method of claim 1, wherein the content control information comprises a task execution request, wherein the task execution request is generated based on at least one from among characteristic information of the target device, user interest information in the target device, characteristic information of the first content, characteristic information of the source device, and user interest information in the source device.

11. The method of claim 10, further comprising preparing, by the target device, a task execution list based on at least one from among the characteristic information of the target device, the user interest information in the target device, the content characteristic information, the characteristic information of the source device, and the user interest information in the source device.

12. The method of claim 10, wherein the task execution request is categorized to identify an essential task and a non-essential task.

13. A target device for providing converted content, the target device comprising:
a display;
a memory configured to store information; and
at least one processor configured to:
receive an initiation request for screen mirroring with a source device;
establish a handshaking with the source device;
receive a characteristic information of the source device and first content from the source device,
determine a conversion mode or a non-conversion mode with respect to first content, based on a characteristic information of the target device and the characteristic information of the source device;
in response to determining the conversion mode, receive the first content corresponding to the screen mirroring with the source device;
establish a connection with a cloud computing device;
generate a task execution request;
transmit the task execution request, content received from a source device, and content control information related to the target device and the source device, to the cloud computing device; and
receive the content from the cloud computing device,
display, by the target device, second content on the display,
in response to determining the non-conversion mode, display the first content on the display,
wherein the content is obtained by performing at least one task on the first content based on the content control information, the content control information including characteristic information of the first content, the characteristic information of the target device, and the characteristic information of the source device.

* * * * *